US008923186B1

(12) United States Patent
daCosta

(10) Patent No.: US 8,923,186 B1
(45) Date of Patent: Dec. 30, 2014

(54) CHIRP NETWORKS

(71) Applicant: Francis daCosta, Santa Clara, CA (US)

(72) Inventor: Francis daCosta, Santa Clara, CA (US)

(73) Assignee: Dynamic Mesh Networks, Inc., Santa Clara, CA (US)

( * ) Notice: Subject to any disclaimer, the term of this patent is extended or adjusted under 35 U.S.C. 154(b) by 0 days.

(21) Appl. No.: 13/627,883

(22) Filed: Sep. 26, 2012

Related U.S. Application Data

(63) Continuation-in-part of application No. 13/541,446, filed on Jul. 3, 2012, and a continuation-in-part of application No. 12/696,947, filed on Jan. 29, 2010, and a continuation-in-part of application No. 11/084,330, filed on Mar. 17, 2005, now abandoned, and a continuation-in-part of application No. 10/434,948, filed on May 8, 2003, now Pat. No. 7,420,952, application No. 13/627,883, which is a continuation-in-part of application No. 12/352,457, filed on Jan. 12, 2009, which is a continuation-in-part of application No. 11/266,884, filed on Nov. 4, 2005, now Pat. No. 7,583,648, application No. 13/627,883, which is a continuation-in-part of application No. 13/571,294, filed on Aug. 9, 2012.

(60) Provisional application No. 61/555,400, filed on Nov. 3, 2011, provisional application No. 61/615,802, filed on Mar. 26, 2012, provisional application No. 61/621,926, filed on Apr. 9, 2012, provisional application No. 61/148,803, filed on Jan. 30, 2009.

(51) Int. Cl.
*H04H 20/71* (2008.01)

(52) U.S. Cl.
USPC .......................................................... 370/312

(58) Field of Classification Search
USPC ................ 370/312, 315, 321, 328, 327, 340, 370/400–401, 445–448, 537
See application file for complete search history.

(56) References Cited

U.S. PATENT DOCUMENTS

| 7,738,402 | B2* | 6/2010 | Feldman et al. ............... 370/254 |
| 2002/0137459 | A1* | 9/2002 | Ebata et al. ..................... 455/16 |
| 2002/0191573 | A1* | 12/2002 | Whitehill et al. ............. 370/338 |
| 2003/0115282 | A1* | 6/2003 | Rose .............................. 709/214 |
| 2004/0095900 | A1* | 5/2004 | Siegel ........................... 370/328 |
| 2004/0100929 | A1* | 5/2004 | Garcia-Luna-Aceves .... 370/338 |
| 2007/0183346 | A1* | 8/2007 | Thubert et al. ................ 370/254 |
| 2009/0304381 | A1* | 12/2009 | Muppidi et al. ................ 398/34 |

* cited by examiner

*Primary Examiner* — Peter Cheng
(74) *Attorney, Agent, or Firm* — Cherskov Flaynik & Gurda, LLC

(57) ABSTRACT

A system of aggregating messages utilizing at least one device transmitting at least one short communication message wherein said short communication message comprises a terse command or status message; at least one network router comprising a means of receiving the short communication messages; wherein said means receives said short communication message without interrupting other communications; and an uplink from the at least one router to an external ip-based network wherein said router aggregates said short communication messages and forwards the aggregated messages via the uplink to the external ip-based network wherein said external ip-based network comprises a tree-based logical network comprising wireless nodes.

3 Claims, 42 Drawing Sheets

Floating Network Sub Tree Merges with Floating Network Sub Tree Per Policy Directives

DISTRIBUTED DHCP SERVICE WITH INHERENT CONFLICT RESOLUTION

ASSUME A FIXED SUBNET MASK OF 255.0.0.0 IS USED

- IP ADDRESSES OF THE FORM A.x.y.k where
- A defines the *CUSTOMER-NETWORK-ID* 16 bit (0 -255)
- k is *CLIENT BASED ID* 16 bit (0-255)
- x, y are each 16 bit : $2^{32}$ unique networks each with up 255 clients possible

POLICY DIRECTIVE: SPLIT UP ADDRESS SPACE BETWEEN STATIC and MOBILE networks

- Assign 15 bits to distributed DHCP services for floating networks
- Let NODES CHOOSE A RANDOM 15-bit NUMBER 'R' AT STARTUP and
  1. LET 'M' BE THE DECIMAL EQUIVALENT OF THE 7-MSBs OF 'R'
  2. LET 'N' THE DECIMAL EQUIVALENT OF THE 8-LSBs OF 'R'

THE DHCP ADDRESS SPACE OF THE NODE WOULD BE

A.255-M.N.0 to A.255-M.N.254 where 0<=M<=127 and 0<=N<=255

FIGURE 29

CHIRP NETWORKS

CROSS REFERENCES

The instant application claims priority as a non-provisional utility application of Provisional U.S. Patent Application Ser. No. 61/555,400 filed on Nov. 3, 2011, and Provisional U.S. Patent Application Ser. No. 61/615,802, filed on Mar. 26, 2012, and Provisional U.S. Patent Application Ser. No. 61/621,926, filed on Apr. 9, 2012, the contents of which are hereby incorporated by reference.

The instant application claims priority as a continuation in part of U.S. patent application Ser. No. 13/571,294, filed on Aug. 9, 2012, presently pending, the contents of which are hereby incorporated by reference.

The instant application claims priority as a continuation in part of U.S. application Ser. No. 13/541,446 filed on Jul. 3, 2012, presently pending, the contents of which are hereby incorporated by reference.

The instant application claims priority as a continuation in part of U.S. patent application Ser. No. 12/696,947, filed on Jan. 29, 2010, presently pending which in turn claimed priority as a non-provisional of U.S. application Ser. No. 61/148,803 filed on Jan. 30, 2009, and also as a continuation in part of the U.S. Utility application Ser. No. 11/084,330 filed Mar. 17, 2005, currently abandoned which in turn is a continuation-in-part of U.S. Utility application Ser. No. 10/434,948, filed on May 8, 2003, patented as U.S. Pat. No. 7,420,952 on Sep. 2, 2008, the contents of which are hereby incorporated by reference, including Appendix A.

The instant application further claims priority as a continuation in part of U.S. Utility application Ser. No. 12/352,457, filed on Jan. 12, 2009, presently pending, which in turn claimed priority to U.S. application Ser. No. 11/266,884, filed on Nov. 4, 2005, and issued as U.S. Pat. No. 7,583,648, the contents of which are hereby incorporated by reference.

FIELD OF THE INVENTION

This invention relates to the field of computer networks and machine communications and, more particularly to a network system and method for facilitating large scale messaging.

BACKGROUND OF THE INVENTION

Over the next decade, most devices connected to the Internet or other global network will not be used by people in the familiar way that personal computers, tablets and smart phones are. Billions of interconnected devices will be monitoring the environment, structures, transportation systems, factories, farms, forests, utilities, soil and weather conditions, oceans and resources. Many of these sensors and actuators will be networked into autonomous sets, with much of the information being exchanged machine-to-machine directly and without human involvement Machine-to-machine communications are typically terse. Most sensors and actuators will report or act upon small pieces of information—"chirps." Burdening these devices with current network protocol stacks is inefficient, unnecessary and unduly increases their cost of ownership.

The architecture of the Internet of Things necessarily entails a widely distributed topology incorporating simpler chirp protocols towards at the edges of the network. Intermediate network elements perform information propagation, manage broadcasts, and provide protocol translation. Another class of devices house integrator functions providing higher-level analysis, for both near-edge analytics and broader-scope analysis. Small chirp data will feed "big data" systems.

The propagation of pollen and the interaction of social insects are relevant to the emerging architecture of the Internet of Things described in the instant application. Pollen is lightweight by nature, to improve its reach. It is inherently secure, only the receiver can decode its message. Nature's design is very different from today's traditional large packet and sender-oriented network traffic.

This application describes reasons why we must rethink current approaches to the Internet of Things. Appropriate architectures are described that will coexist with existing incumbent networking protocols. An architecture comprised of integrator functions, propagator nodes, and end devices, along with their interactions, is explored. Example applications are used to illustrate concepts and draw on lessons learned from Nature.

Certain aspects of the embodiments disclosed in the present application are extensions or additional uses of the methods and systems disclosed in the referenced earlier applications and patents. For instance, in the referenced patent applications, a method to change the network topology by employing multiple radios is described in U.S. application Ser. No. 10/434,948, filed May 8, 2003 in FIGS. 1, 2, 3, 4, 5, 6, 7, 8.

FIG. 18 in that same application depicts a two-radio mesh network, with one radio for the backhaul and another servicing clients and providing the backhaul to other nodes of the network. As described in that application and in the instant system, extensions of the logical two-radio approach include three and four radios.

There is increasing interest in employing one network to support video, voice and data traffic. Currently, the video, voice and data networks are often kept on distinct networks with either physical or logical separation since each addresses differing latency and bandwidth requirements. The challenge lies in providing—within the same network—the ability to address potentially conflicting latency and throughput needs of diverse applications.

For example, voice needs to be transmitted with low delay (latency). Occasionally lost voice packets, while undesirable, are not fatal for voice transmissions. Conversely, data transmissions mandate delivery of all packets and while low latency is desirable it is not essential. In essence transmission across the wireless network should (ideally) be driven by the needs of the application.

Building a reliable wireless network comes with other constraints specific to wireless. Some routing paths may be best for voice, others for data. In Wired LAN applications separate routing paths are more easily accomplished since each port on the LAN is connected to one client machine. Each node may be configured to provide the performance characteristics required by that application. If all computing devices were wired, each could have different Quality of Service (QoS) settings.

This level of granularity is not possible in wireless networks. Radio is a shared medium. It is prone to interference from other radio transmissions in the vicinity. A direct repercussion of radio interference is that a separate Access Point (AP) for each client machine is not practical. An AP can interfere with other APs and there are not enough non-interfering channels to go around. Further, while each additional radio may increase bandwidth capacity, it may also cause more interference between radios—perhaps even reducing the overall capacity of the network Controlling Network Topology. The challenge lies in enabling each Access Point node to support differing application requirements and ensuring that the aggregate demand of each Access Point be addressed without an appreciable loss in performance for individual clients. Additionally, if the network configuration needs to change then changes to network topology must occur in a stable and scalable manner.

Aggregate demand may be expressed as a range of acceptable latency and throughput values. Note that latency and throughput are often conflicting objectives. Low latency (least number of hops) may cause low throughput. High throughput may require increased latency.

In the patent application Ser. No. 10/434,948, filed May 8, 2003, a method to change the network topology by employing multiple radios is described and the changes in mesh topology is illustrated by FIGS. 1, 2, 3, 4, 5, 6, 7, 8. FIG. 1 shows how the latency/throughput gradually changes with network topology.

FIG. 1 is made up of four individual sections, labeled 1 through 4. In each of these sections, the main area shows a number of radio devices configured in a specific mesh topology. The radio devices are part of the backhaul—each of them is therefore both an Access Point (AP) and a bridge to the backhaul, through other APs. Each node in the figure represents a 2-radio system where one interface is "down" providing connectivity to client stations and other APs connecting to the backhaul through it. The second radio provides the backhaul path "up" to the wired backbone.

The AP/bridge connected to the wired backbone is labeled, the "Root". (There is only one root in this topology, though that is not a requirement. All that is required is that the number of root be greater than or equal to one.) The other nodes must transmit their packets to the root in order to have them placed onto the wire. The solid lines between nodes and the root represent the mesh topology.

Each of the four sections also is labeled with the "Backhaul throughput"—which for the simulation is measured as an inverse relationship to proximity. The relationship between throughput and proximity is modeled as in inverse square law based on experimental data. The curve is shown in the lower left hand corner of section 4 in FIG. 2. The simulation environment includes the ability to change the throughput-distance relationship for differing radios and wireless cards.

Each section is also labeled with the "backhaul number of hops", which represents the average number of hops that a packet in that network will have to make in order to reach the root. The sections should be examined beginning in the upper left, and proceeding clockwise. The important results are:

In section 1, the network is configured in order to optimize latency, that is, in order to minimize the total number of hops that packets will need to make. All nodes transmit their packets directly to the root. However, of all the possible configurations this has the lowest total throughput, because some of this one-hop links will be of low data rate due to physical separation between the nodes.

In section 2, a tradeoff is starting to be made between latency (hops) and throughput. As the network is directed to emphasize throughput, it begins to make changes to the topology such that a larger number of hops is used in order to make sure that each mesh connection is at a higher data rate. A single change has been made in this case, as shown by the solid red line. Data from this node must now pass through an intervening node before reaching the root.

Section 3 shows even more of an emphasis on throughput, with an additional node now using a two hop path to the root, and the throughput rate increasing from 55 to 59.

Section 4 shows a mesh topology with a high emphasis on throughput, less on latency. Five of the nodes are now using two hop paths to reach the route, increasing the throughput to 64, but increasing to latency as well, since the average number of hops is now 1.6

Logical 2-Radio Mesh Backhauls

The network topology control system described in U.S. application Ser. No. 10/434,948, filed May 8, 2003 is based on a 2-Radio system shown in FIG. 18 in that application and included as FIG. 4 in this application. There are two radios in each mesh node, for the uplink and downlink support. Radio 010 is upward facing and connects to the downlink (labeled 020) of its parent radio. Thus, a chain of connectivity is formed as shown by labels 040-050-060. In addition to providing a chain of connectivity, the downward facing radios (020) also provide connectivity to clients (such as laptops) shown as triangles. One such client is labeled 030.

There is a cloud surrounding each mesh node. This is the coverage area of the radio signal for the downward facing radio. They are colored differently to depict that each is operating on a different channel than other radios in its vicinity. Thus each radio belongs to a different Basic Service Set (BSS) or sub domain of the network. As such the system resembles a wired network switch stack. A wired network switch stack also has a similar tree structure with similar uplinks, and downlink connections. See FIG. 4. Labels 040-050-060 form a functionally identical chain of connectivity. Also, each switch in a network switch stack operates on a separate sub-domain of the network.

Why Logical 2-Radio Mesh Backhauls are Needed.

Serious bandwidth degradation effects occur with single radio mesh networks. The LHS diagram on FIG. 2 depicts a typical 2 radio mesh network. One radio (010) provides services to clients while another radio (020) is part of an Ad Hoc Mesh—where all radios are operating on the same channel as depicted by the same color clouds (030)

In contrast FIG. 2 RHS depicts a logical 2-Radio where each mesh radio (025) is part of a distinct sub domain of the network, depicted by different color clouds (035).

Returning to the LHS of FIG. 2, all the backhaul radios (020) are on the same channel and thus are all part of the same network. In essence they form the wireless equivalent of a network hub.

Network hubs are not scalable because there is too much interference between all the members of the hub as the hub becomes larger. Exactly the same problem exists with conventional mesh networks. After 1-2 hops the co-channel interference between the mesh nodes (020) no longer allow high bandwidth transmissions.

There is another issue with single radio mesh backhauls which prevents scalability. Bandwidth degradation occurs with each hop—typically 50% per hop with single radio mesh backhauls. Refer to FIG. 3. On the left hand side is a single radio backhaul. If it is part of a relay path then every packet it receives must be re-transmitted on the same radio: Label 010. This with each hop the effective throughput reduces by 50% from the previous hop. This makes bandwidth available at the end of the 3rd hop ⅛ of the available bandwidth. This is unacceptable for high performance requirements in either enterprise infrastructure networks or mission critical application requirements e.g. emergency response systems.

On the RHS FIG. 3, Labeled 020, there are two radios—one to receive data and another to retransmit. Now, the effective throughput is not compromised because there are two radios, operating on non-interfering channels. Simultaneous send and receive is now possible.

Single radio mesh backhauls do not present a scalable solution to addressing high bandwidth requirements for a mission critical network.

SUMMARY OF THE INVENTION

Accordingly, there exists a need to support the performance requirements of mission critical mesh networks in multi-hop situations. FIG. 4 shows the infrastructure mesh in a topology with a 2-radio unit in a multiple hop wireless network. The rectangular icons in this figure represent the APs, which have formed a mesh in order to support clients. The triangular icons represent these clients. At the top of the figure are the root Access Points or APs (two, in this example) that have a direct connection to the wired backbone. Each of these APs creates a separate BSS using a separate RF channel.

The BSSs (Basic Service Sets) are labeled as BSS [hops], [index], so BSS 1,1 indicates that this is the first BSS for which one hop is needed to reach the wired backbone. For the non-root APs, one radio serves as an AP to its clients; the other radio acts as a backhaul.

The radio interface—labeled 010—acts as a connection to the "Parent"—the backhaul. It operates in station mode: it appears as a client, no different from other clients shown as triangles. The backhaul and AP radio, colored gray—labeled 020—operates in AP mode: it services clients, including other Access Points accessing it as clients, through their second radio operating in station mode. In the lower layers, a description such as BSS 2,3 mean that this is the third AP for which two hops are required to reach the wire. Triangles denote client radios (see Label 030).

Radio is a shared medium where only one device can be "talking" at a time. As networks grow, performance degrades rapidly as the same AP services more clients. The AP's BSS becomes unmanageable. The need to split up the network into smaller groups becomes essential to the health of a network.

A classic solution is to split up the wireless network into smaller groups (BSS), each of which is operating on a non-interfering channel with other groups (BSS). Simultaneous "conversations" are now possible in each BSS. This solution, however, is not available in an ad-hoc (peer-to-peer) mesh solution, because such a solution must, by definition, create a single, large, BSS.

Each BSS shown in the infrastructure mesh of FIG. 4, however, is not interfering with other transmission channels allocated to neighboring BSSs. Channel Interference is contained and spatial re-use is possible. Two-radio solutions are therefore more impervious to noise than their 1-radio counterparts. Channels can automatically be re-allocated to avoid unpredictable sources of interference such as radar or unauthorized transmissions that may be present in emergency or military situations.

The Logical 2-Radio Concept is distinct from conventional Mesh.

The Logical 2-Radio concept must not be confused with other mesh approaches that may also use 2 (or more) physical radios. This is referred to as a "Dual-radio" mesh and shown on the LHS of FIG. 2.

FIG. 2, LHS shows that one radio services client while the other forms an ad hoc mesh. Separating the service from the backhaul improves performance when compared with conventional ad hoc mesh networks. But a single radio ad hoc mesh is still servicing the backhaul—since only one radio communicates as part of the mesh. Packets traveling toward the Internet share bandwidth at each hop along the backhaul path with other interfering mesh backhauls—all-operating on the same channel.

Such systems are not scalable since the backhaul is still as single radio and suffers from the bandwidth degradation with each hop, endemic to single radio backhauls, see FIG. 2 label 010. In contrast, the Logical 2-Radio concept described in this document focuses on a multiple radio backhaul as shown in FIG. 3, Label 020.

It should also be noted that regardless of the number of radios allocated to the backhaul and those allocated in service of clients, the system resembles a wired switch stack from a logical perspective. Other mesh architectures resemble a hub.

Adding more Physical Radios

The logical 2 radio approach forms a network having a tree-shape hierarchical arrangement as shown in FIG. 4. One radio provides the uplink to a parent radio and another to the downlink to child nodes. Thus the 2-Radio mesh node labeled 040 is a parent to mesh Node labeled 050. The mesh Node labeled 050 is a parent to mesh node labeled 060.

Mesh node labeled 050 also has two client radios, shown as triangles, one of which is labeled 030. Lack of a separate radio to service clients limits the effective backhaul bandwidth for the network, since clients are sharing bandwidth on the backhaul. It also prevents the use of proprietary but more efficient transmission protocols on the radios, since those radios also have to "talk" with client radios that demand a non-proprietary and less efficient protocol.

An extension of the logical 2-radio functionality is to use three radios with two separate radios for the (high speed) backhaul and one more radio for separate (slower) service to clients, as depicted in FIG. 6. As shown there, in one embodiment the network also uses the tree like structure. But this time the two backhauls are dedicated radios (labels 010, 020) and there is a separate radio (025) to service clients (030) only. The chain of connectivity (040-050-060) has not changed.

Note that while more (physical) radios have been employed, FIGS. 5 and 6 are functionally identical. In both cases, one the functionality of uplink and downlink are separate. In FIG. 5, the downlink supports both client and mesh nodes. In FIG. 6, the radio (020) providing downlink connectivity is now dedicated to backhaul services while another radio (025) services clients (030). There is performance improvement of shifting the slower traffic from clients to another radio so the backhaul can operate in the "fast lane" but beyond this implementation improvement FIG. 6 and FIG. 4 are functionally identical.

This invention addresses multiple embodiments of the logical 2 radio approach depicted in FIG. 4 provides solutions that address a variety of networking applications. These embodiments are shown in FIGS. 5, 6, 7, 8, 9. Extensions to support voice and video in mission critical public safety networks are described in FIGS. 10, 11, 12. Lastly, this invention addresses how combining the logical radio embodiments may be dynamically reconfigured—in the field and on the fly—to support both infrastructure style mesh networks and conventional ad hoc mesh networks. Hybrid mesh networks for military and public safety applications are discussed and shown in FIGS. 13, 14, 15.

BRIEF DESCRIPTION OF DRAWINGS

In order to more fully describe embodiments of the present invention, reference is made to the accompanying drawings. These drawings are not to be considered limitations in the scope of the invention, but are merely illustrative.

In FIG. 7, there is one service radio to service both voice and data customers. However voice and data traffic has different performance requirements. By having different Access Point radios service the voice and data clients, the contention between voice and data packets attempting to gain access to the same medium is reduced. Also, with different radios servicing the data and voice clients, the voice and data packets can now be treated differently. The Access Point radios servicing the voice clients could therefore be operating in TDMA (time division multiple access) mode while the AP radio servicing the data clients operates in CSMA (Collision Sense Multiple Access) mode. The two radios (032) and (034) thus provide different functionality. VoIP devices such as phones connect to the former, data devices such as laptops to the latter.

Salient portions include the Packet classifier (labeled 010) that recognizes voice packets based on size and regularity of transmissions, the VOIP concatenation engine (labeled 020) that "container-izes" small voice packets into a larger "container" packet for more efficient transportation, Real time extensions (labeled 030) to the Linux kernel enable the system to provide near real time performance regarding sending and receiving the latency sensitive VOIP container packets through the network—regardless of what the Operating System is doing at the time.

Figure 13:
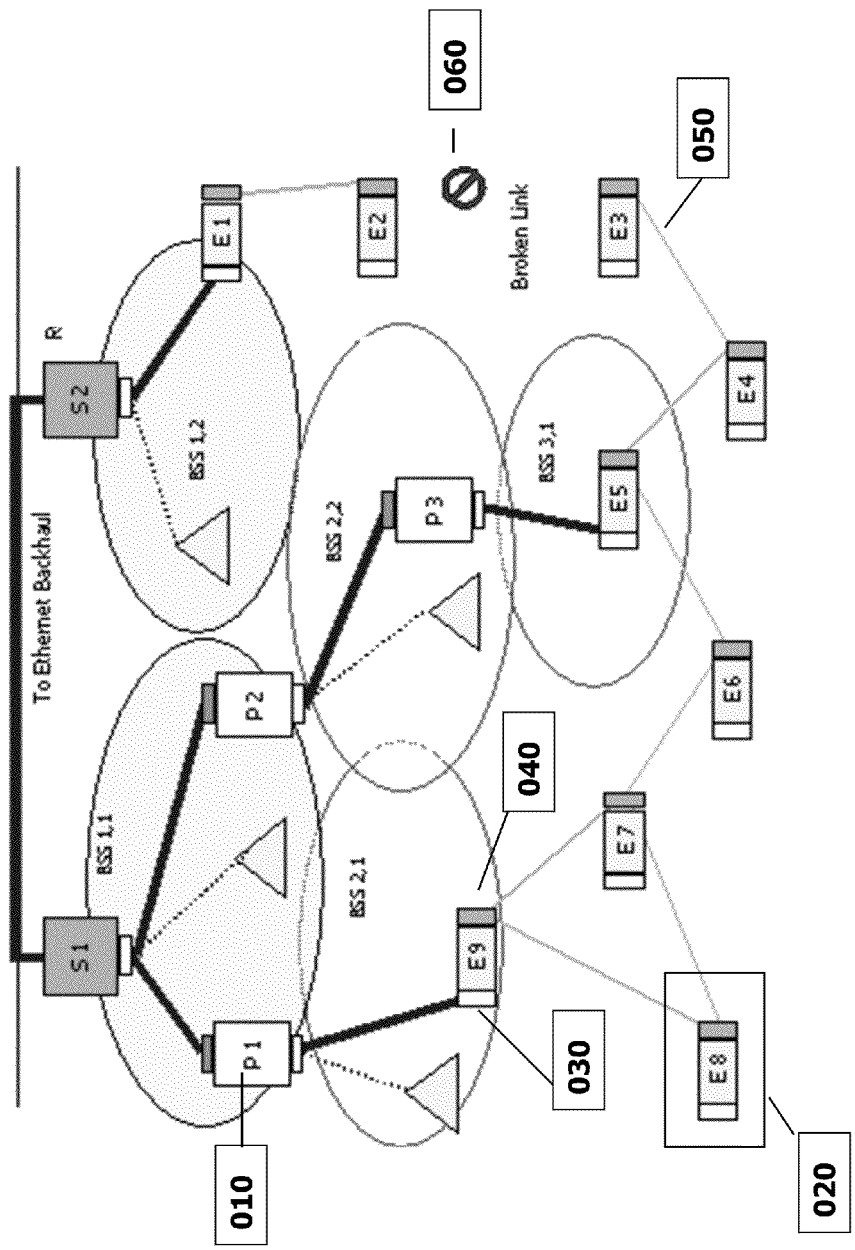

FIG. 13 shows the concept of a "Hybrid Mesh network" where 2 radio systems provide two types of service. In one case, they are part of an infrastructure mesh as shown by the 2-radio mesh node labeled 010. In another embodiment, the same node may be dynamically reconfigured to support ad hoc peer-to-peer connectivity. The node labeled 020 (marked as E8) has two radios. One is intended for client radio connection to infrastructure mesh nodes—see the radio labeled 030 on the unit marked E9. The other provides a peer-to-peer mesh capability, as shown by radio labeled 040. Depending on the needs of the network, the 2-radio units are dynamically re-configured to support either need, infrastructure mesh (010) or backhaul support to ad hoc mesh (020). Labels 050 and 060 designate connected and broken ad hoc mesh links.

Figure 14:
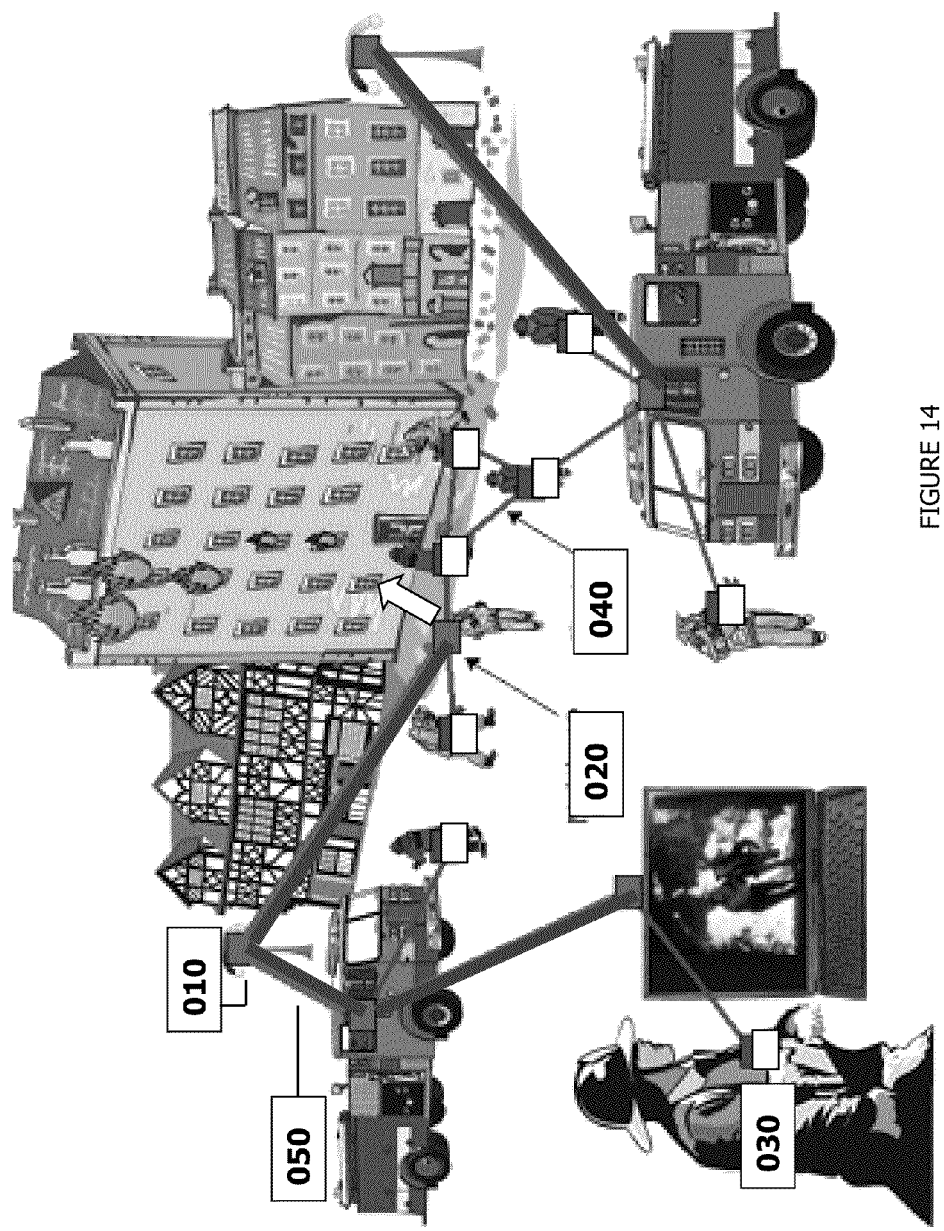

FIG. 14 is an application of the Hybrid Mesh concept to a Public Safety embodiment. The node labeled 010 is a Stationary node on top of a light pole, in this embodiment. A mobile embodiment shown as labeled 020 is entering the building (arrow) such as when carried by firefighters. These mobile units are also called "breadcrumb" routers. The Mobile Mesh nodes provide connectivity to two-radio portable units worn by the firefighters in this picture. All firefighters are thus connected to themselves through a peer-to-peer mesh network shown as a thin line. They are also connected to the Infrastructure mesh backhaul through one or more connect points. This ensures redundancy in network connectivity. The broken link (labeled 060, FIG. 13) is avoided.

Figure 15:
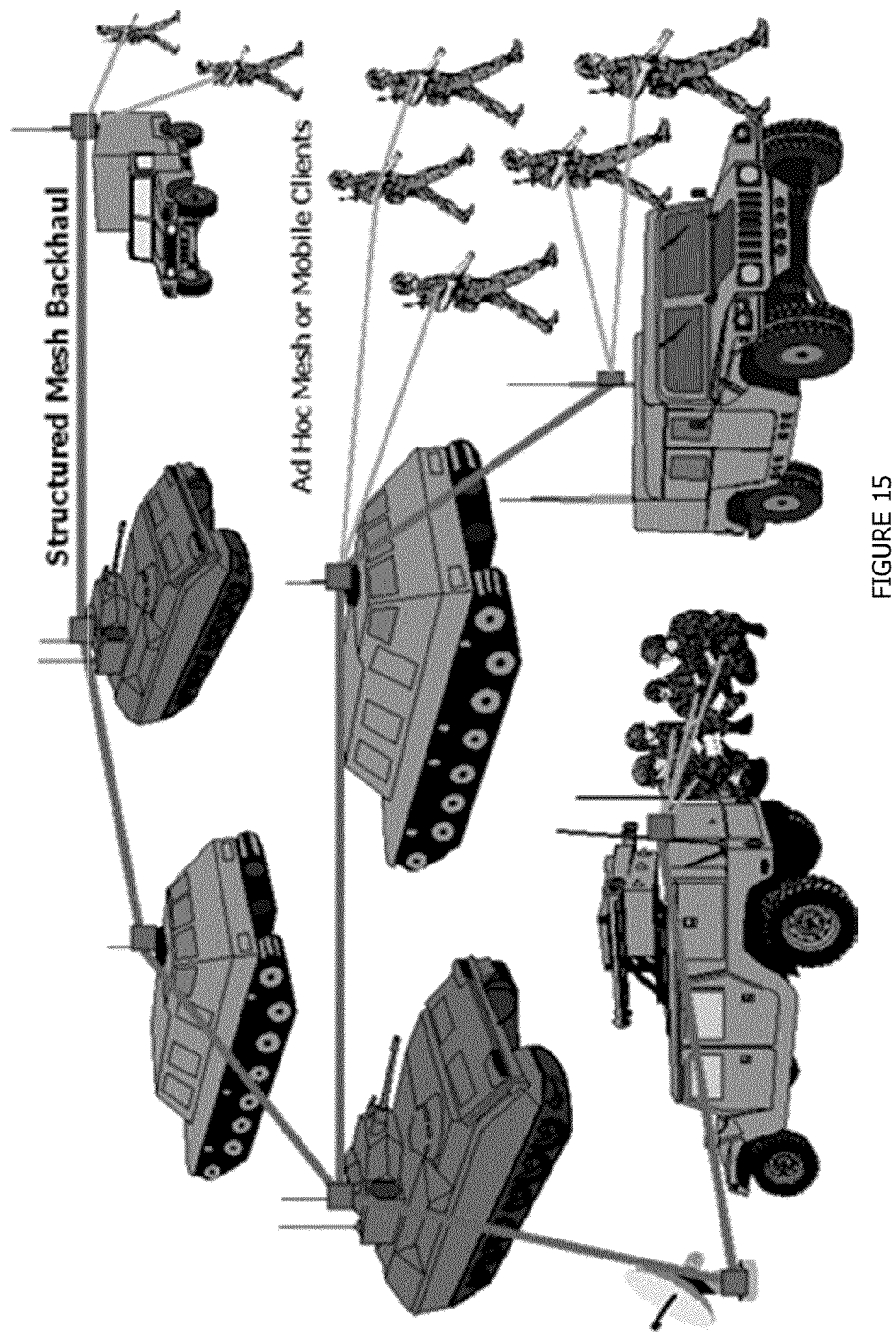

FIG. 15 is an application of the Hybrid Mesh concept related to a Battle Force Protection embodiment.

Figure 16:
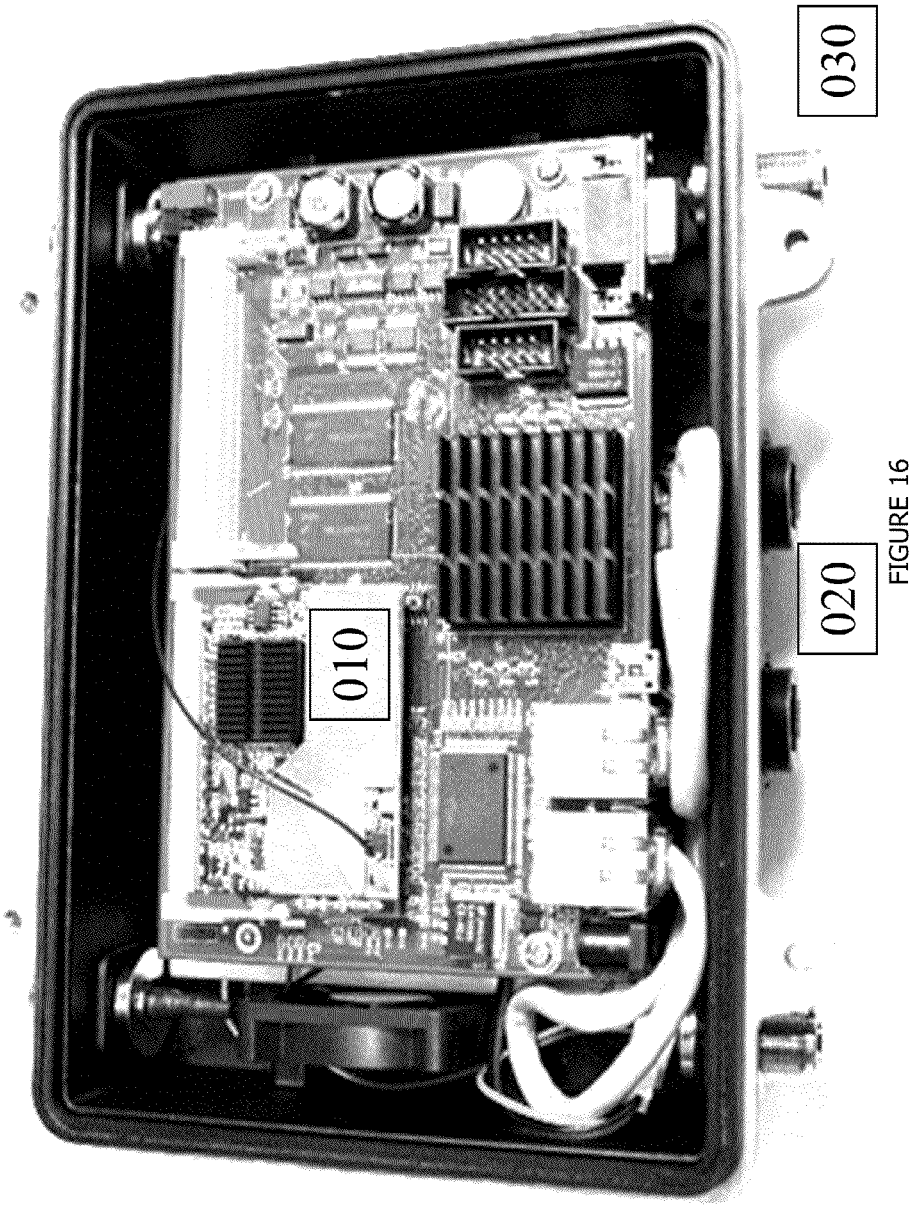

FIG. 16 shows a production version of the two-logical radio system with support for up to four physical radios that can support a variety of configurations in a modular fashion, in one embodiment.

Figure 17:
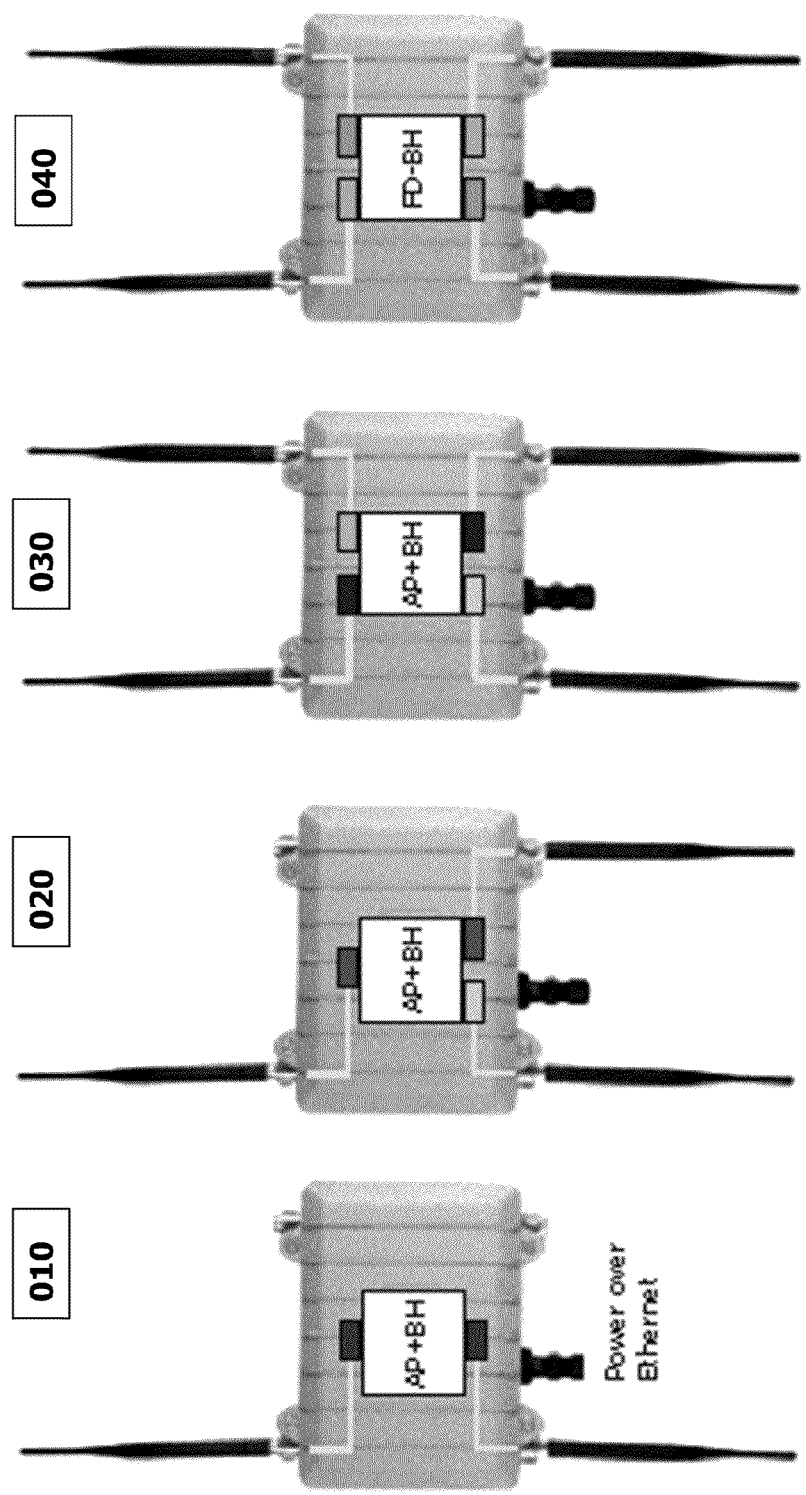

FIG. 17 depicts some of the configurations possible in an embodiment with a four physical radio unit such as shown in FIG. 16.

Figure 18:
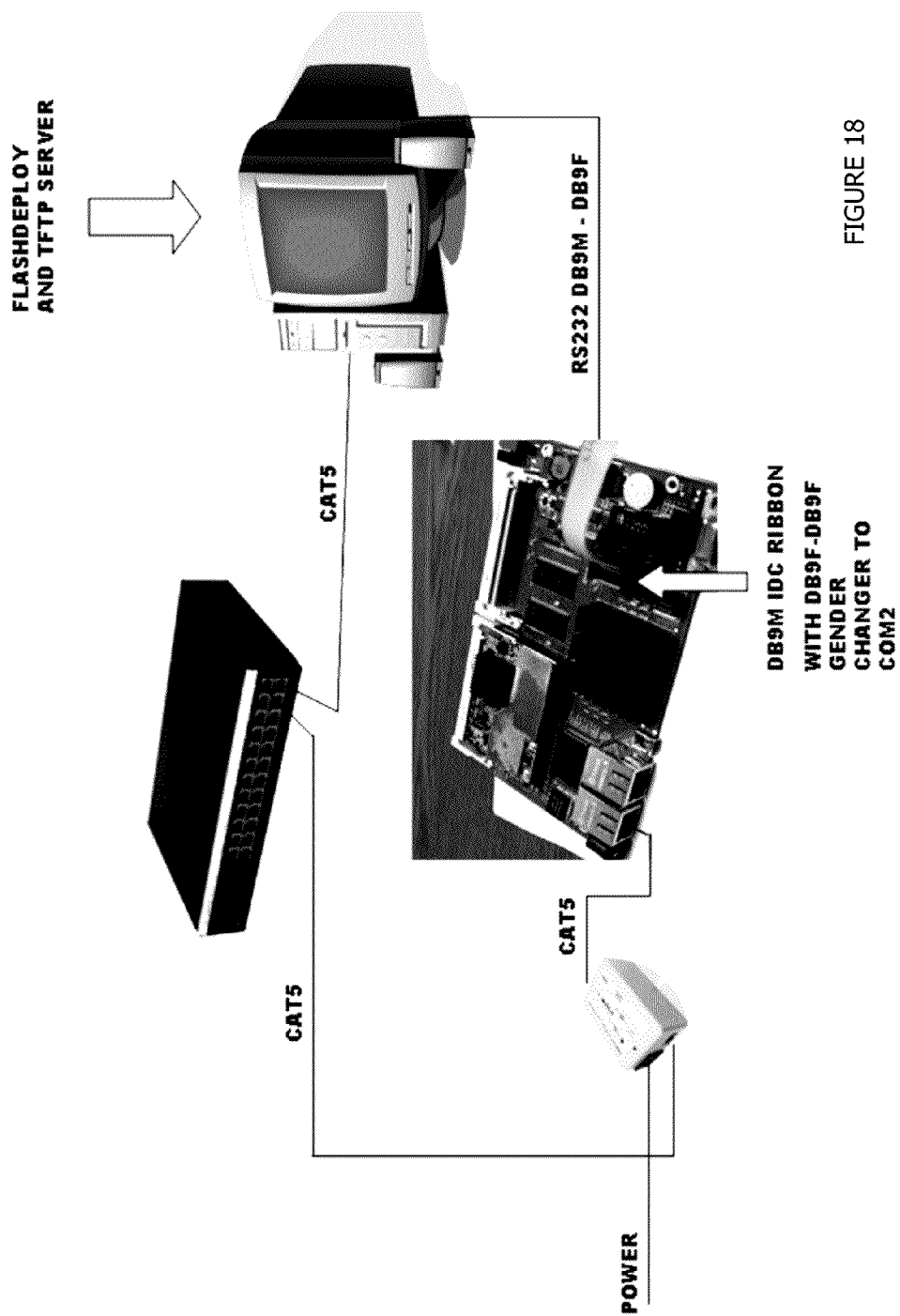

FIG. 18 depicts how the installation software is tagged to both the radios and board characteristics. It shows a serial line connected to load the boot loader program, after which the Ethernet port is used to complete the software installation and branding process. Compiling the install program on the board it is intended to run on performs this function, thus creating a unique software image.

Figure 19:
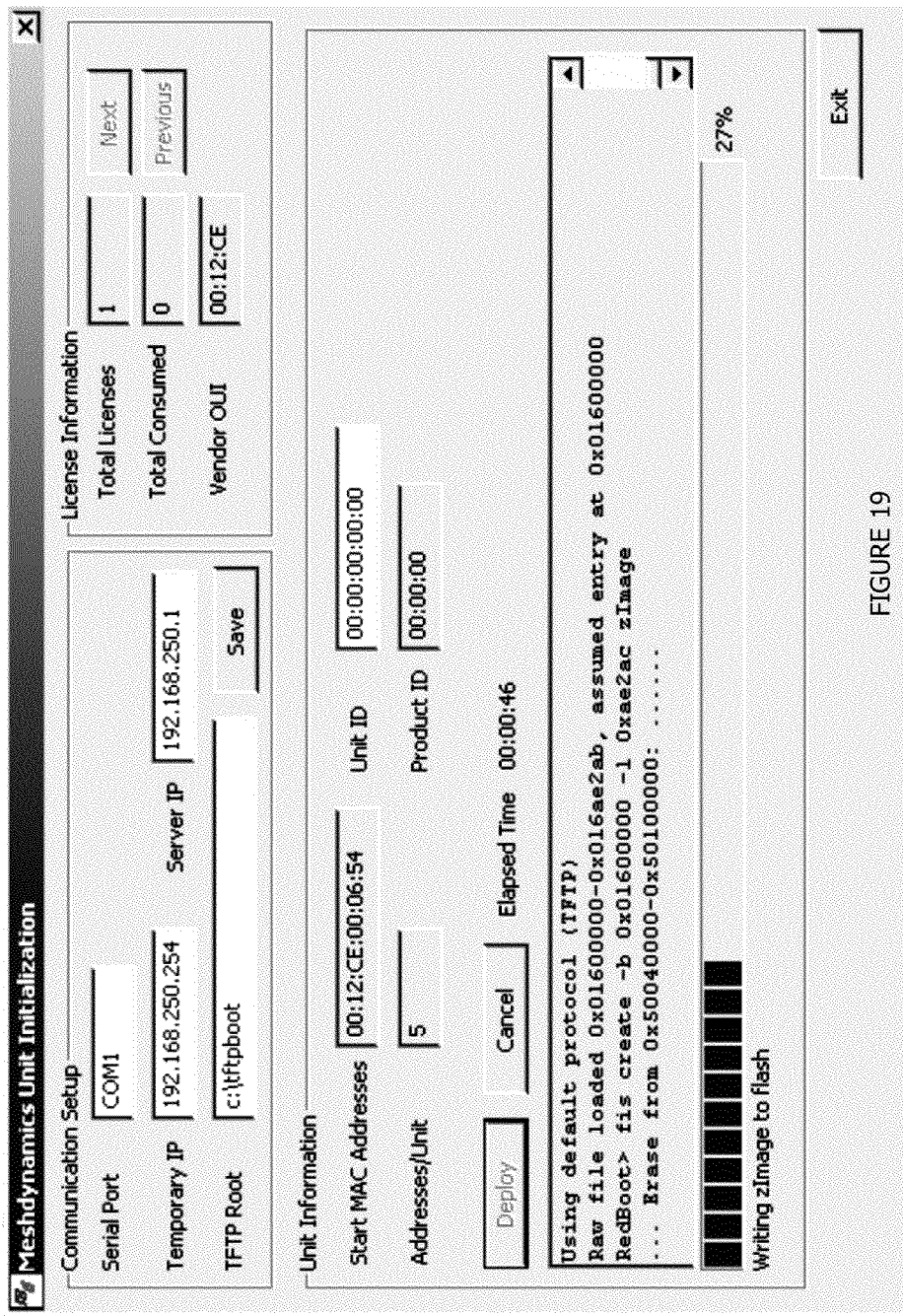

FIG. 19 is a screen dump of the Flash Deployment software developed and implemented to ensure that software generated for the install of this board cannot be used by another mesh node. When the software installation process begins, the software is compiled on the board it is intended for and the compilation process is unique since it is based on a number of unique factors. The software is generated on the board that it is intended to run on—to ensure that the software image cannot be used to run on another board, thus preventing both software privacy and dissuading theft of the mesh nodes.

Figure 20:
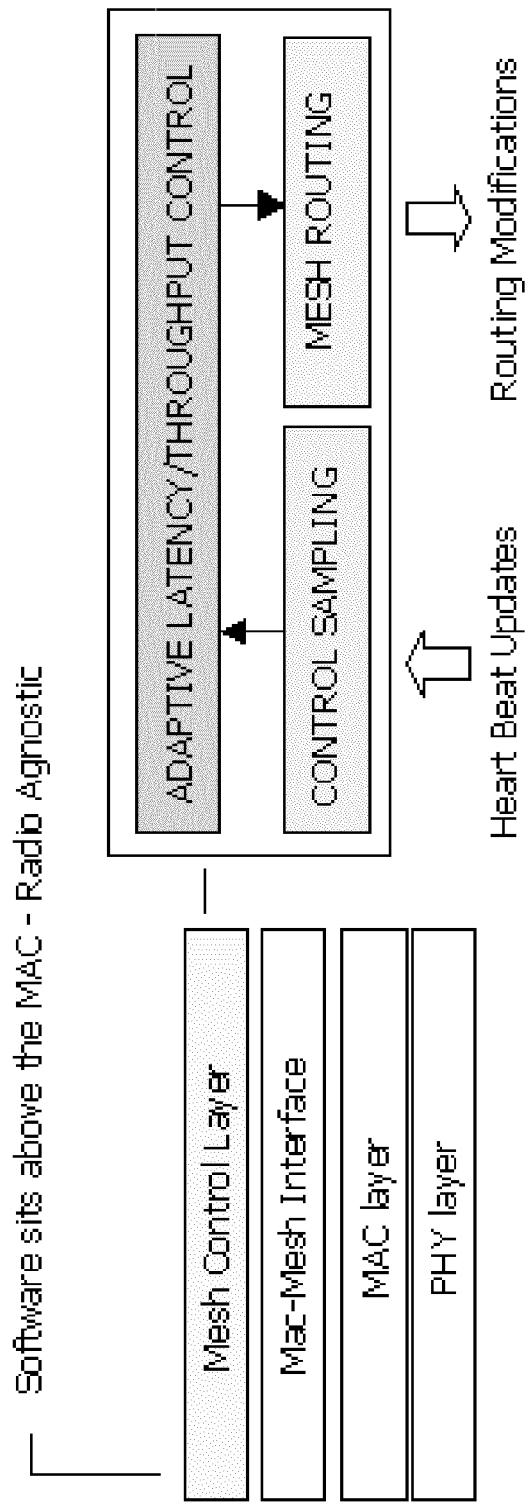

FIG. 20 shows that the Mesh Control Software sits above the Media Access Control (MAC) of the radio. As such it is radio and protocol agnostic, in one embodiment.

Figure 21:
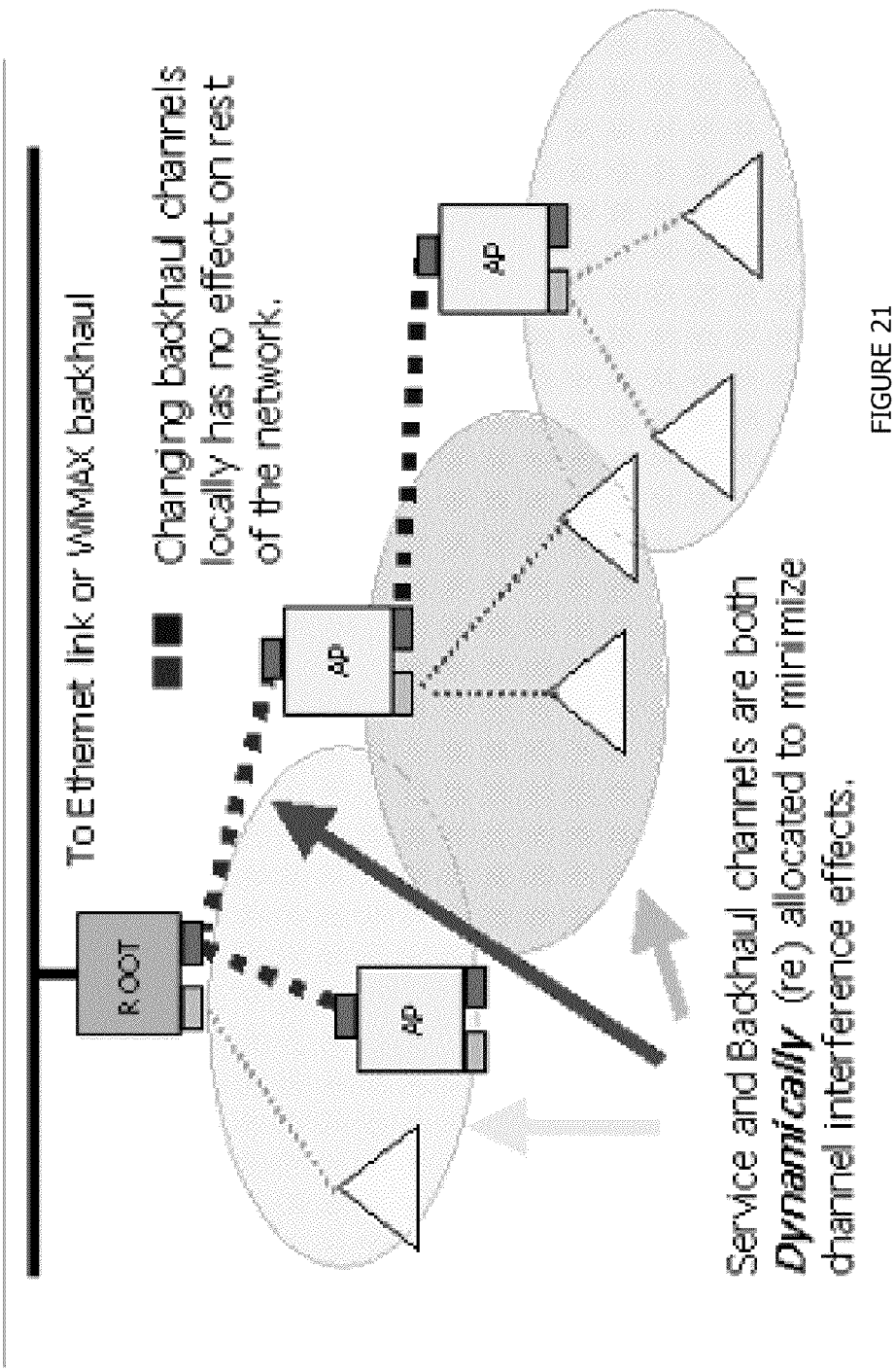

FIG. 21 shows how channel interference is dynamically managed in the logical two-radio system.

Figure 22:
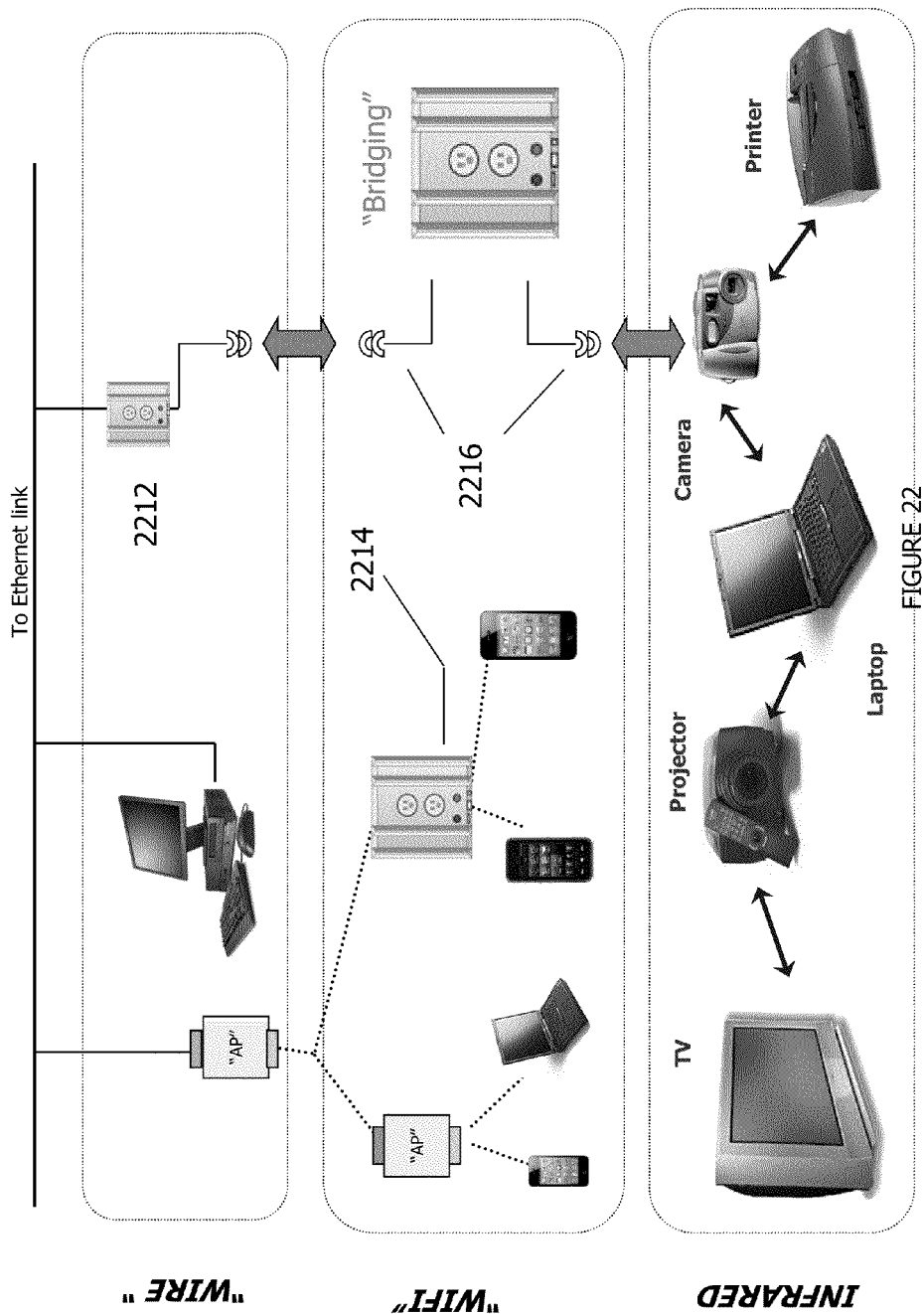
Figure 23:
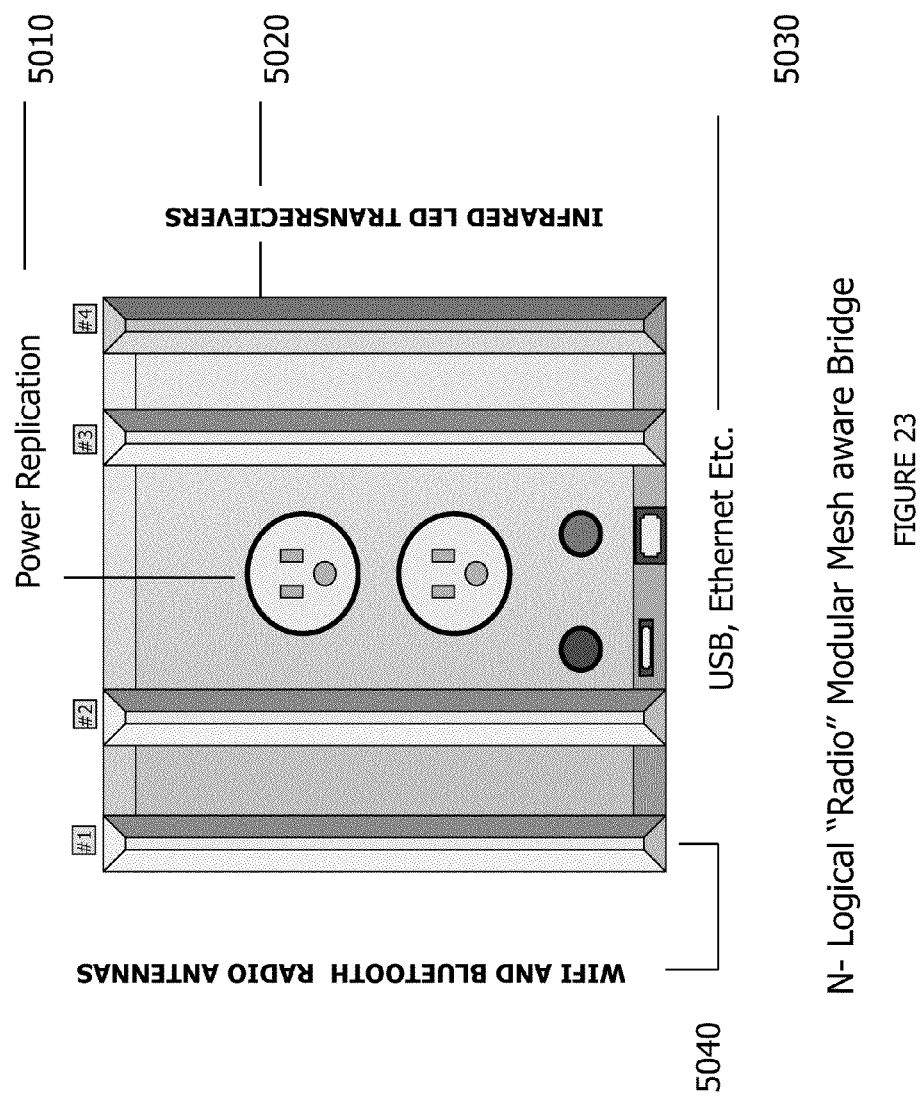

FIGS. 22 and 23 introduce an embodiment bridging across diverse wireless medium using the example of an N-Logical wireless medium bridge, referred to as the "nightlight" In one embodiment, the nightlight serves as both range extender and intermediary between device "chirps" and more conventional, IP based, communication devices and protocols.

Figure 24:
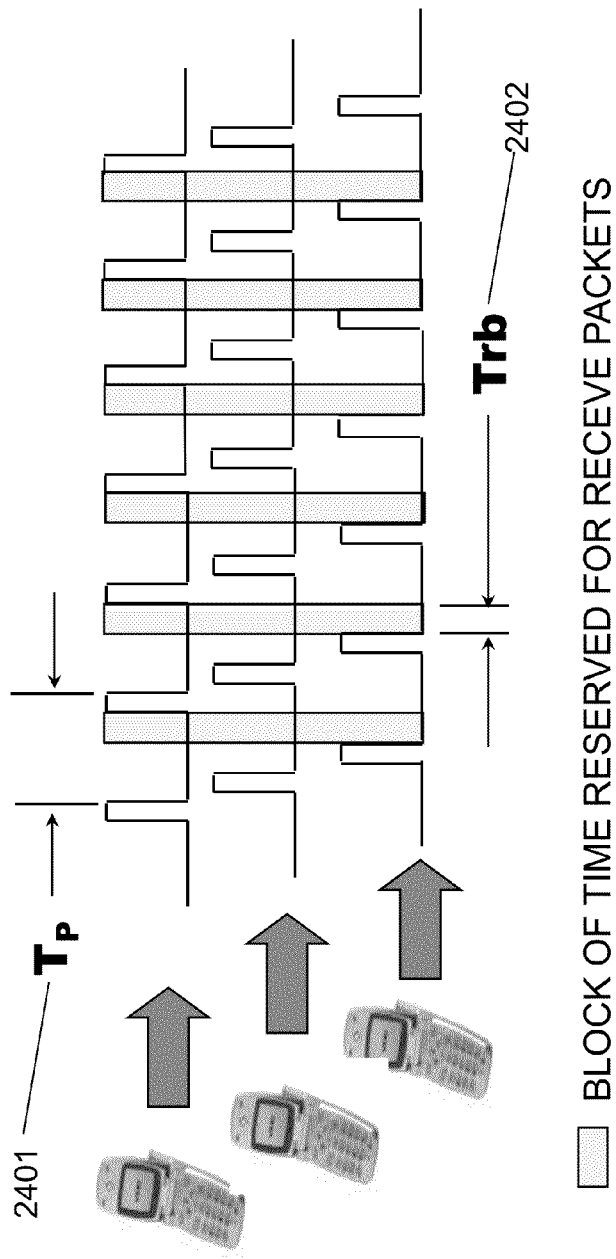

FIG. 24 shows the synchronization of multiple voice devices accessing the same wireless medium with a focus on the time for bulk receipt of packets that are shared among the separate devices.

Figure 25:
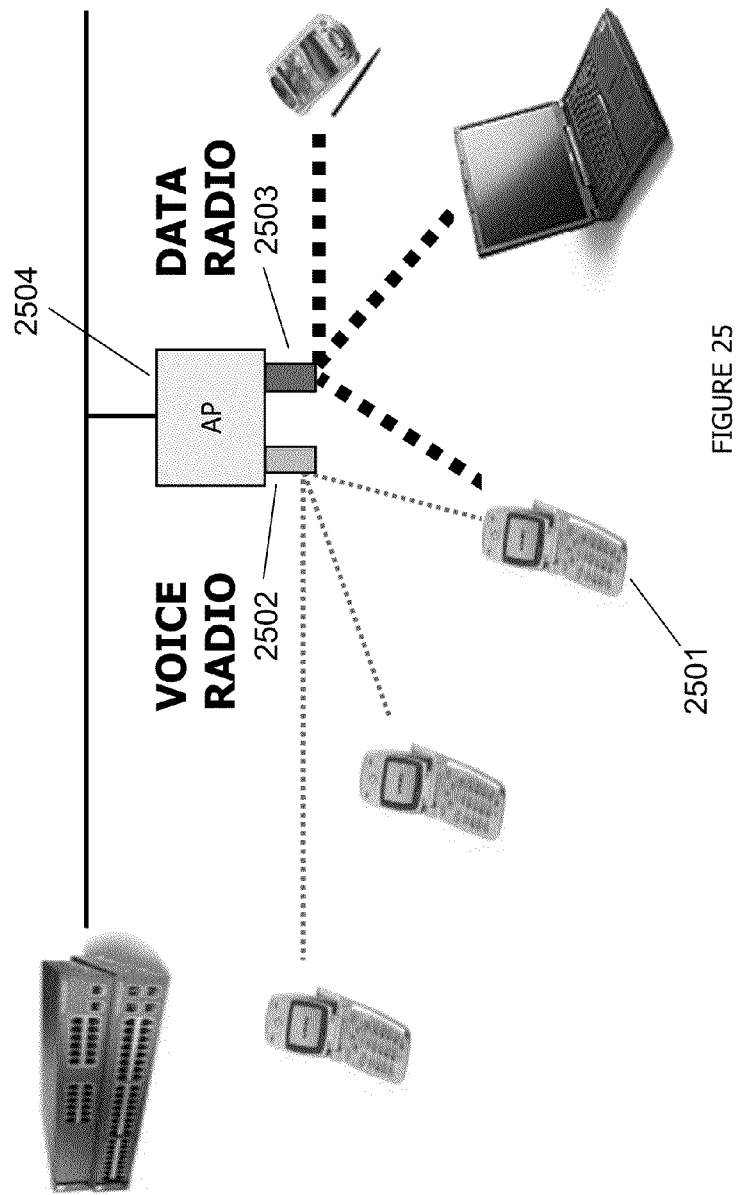

FIG. 25 shows a voice device talking to a dedicated voice radio and data devices taking to a data radio, with one phone 2501, capable of taking to both 2502 and 2503 in one embodiment. The night light embodiment 2504 manages both voice and data transceivers, in the depicted embodiment.

Figure 26:
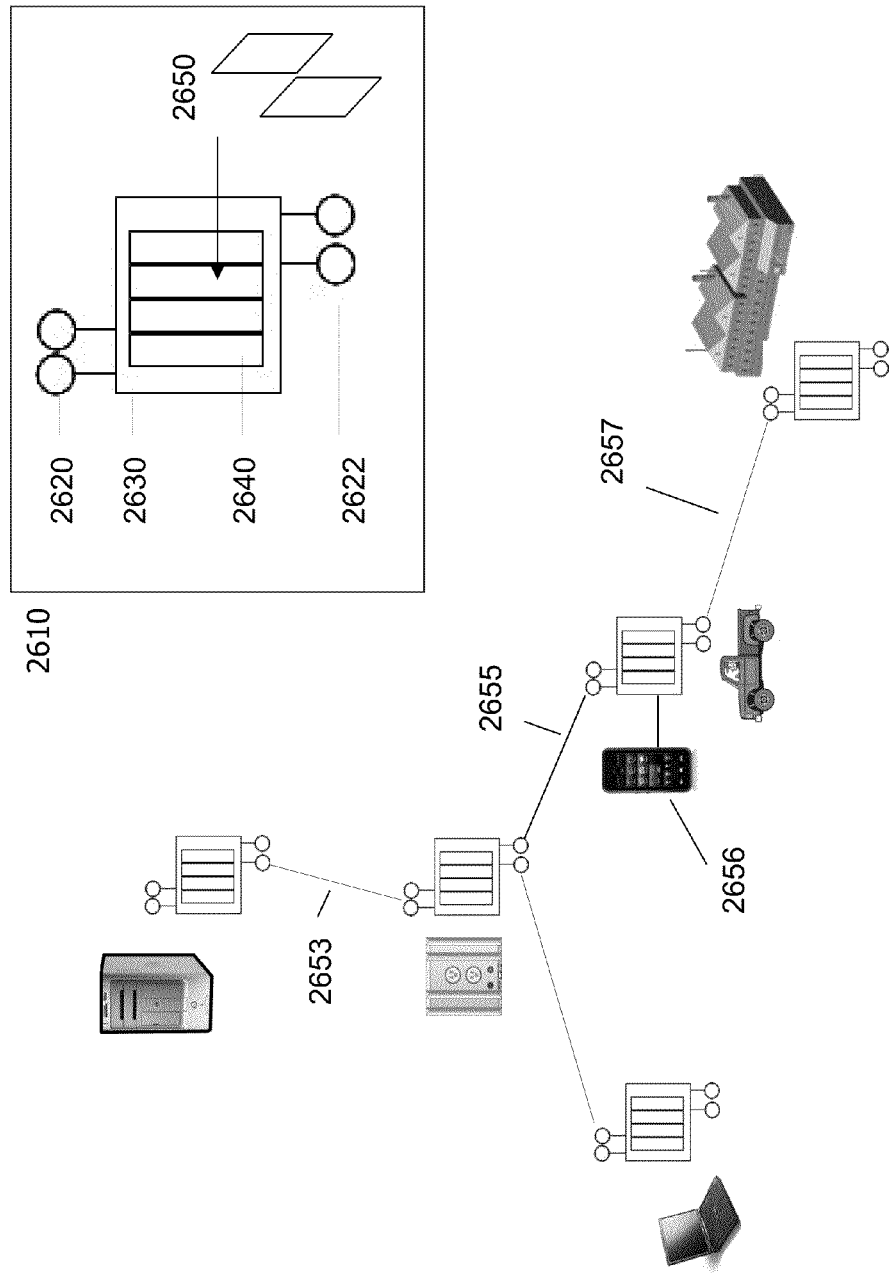

FIG. 26 depicts the dynamic collaboration tree for an exemplary supply chain application.

Figure 27:
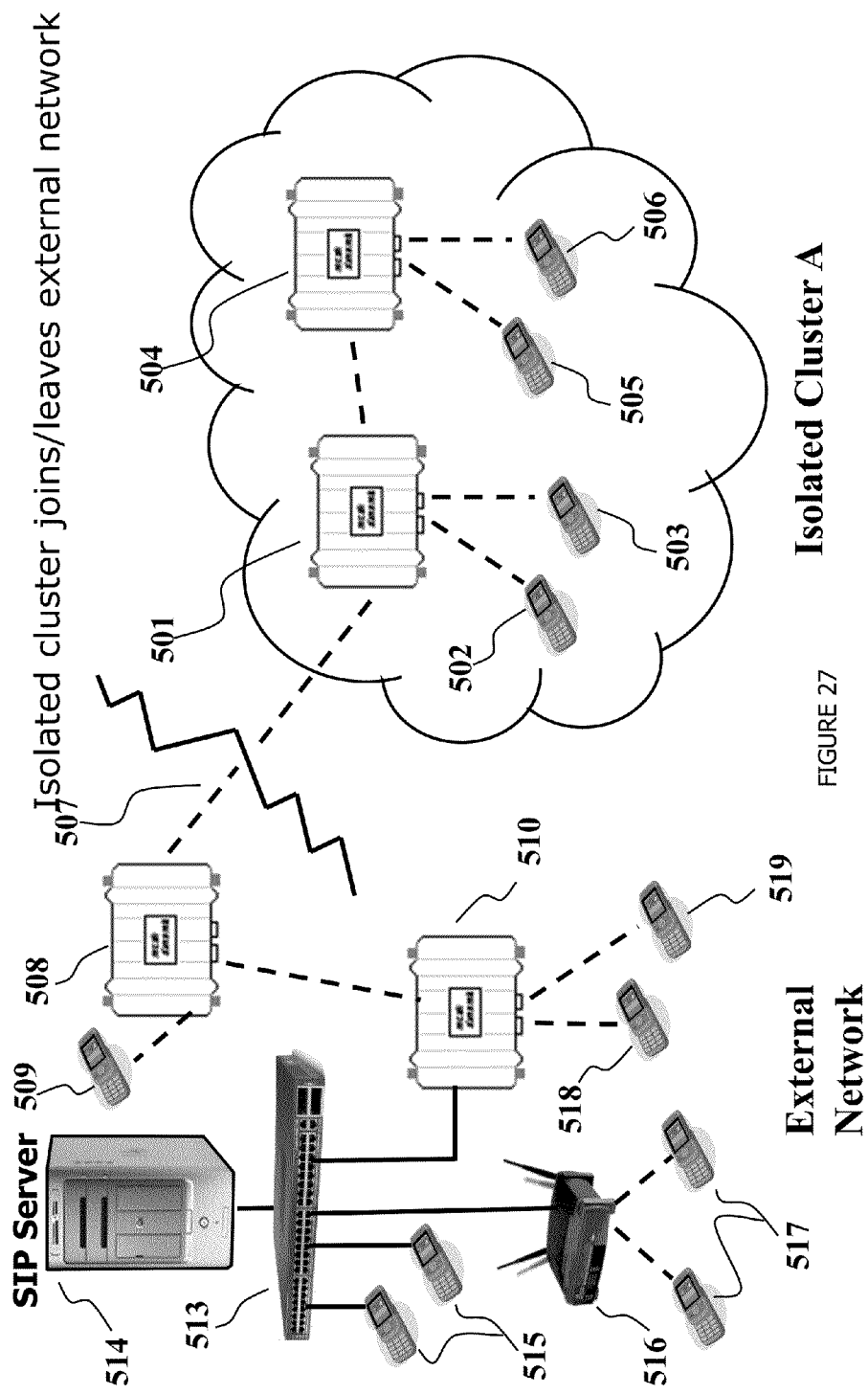

FIG. 27 shows an isolated mobile network cluster and communication within it using VOIP phones.

Figure 28:
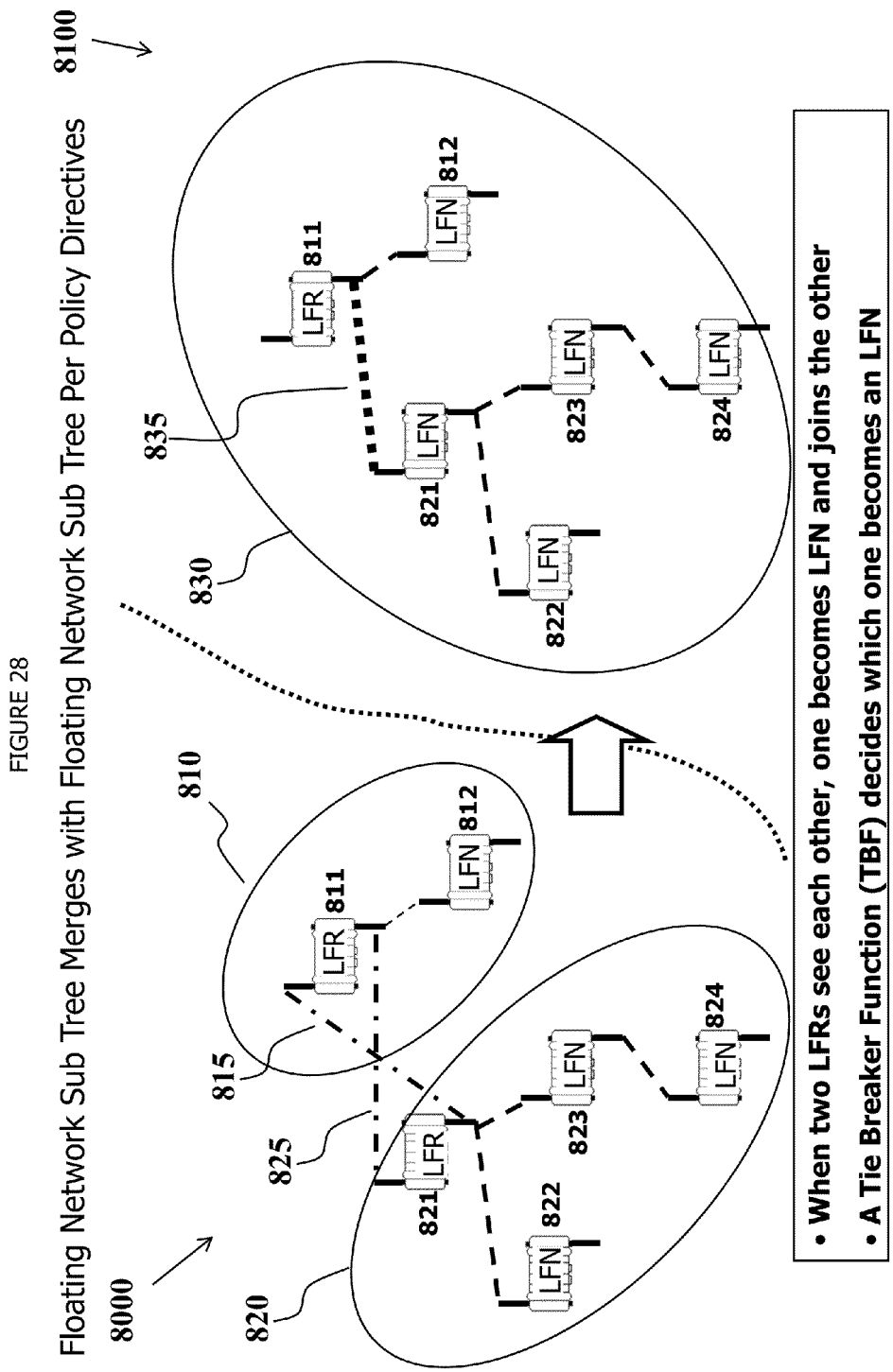

FIG. 28 through 29 describes an embodiment wherein isolated network clusters may converge with distributed DHCP services and inherent conflict resolution using randomized sub net address ranges.

Figure 30:
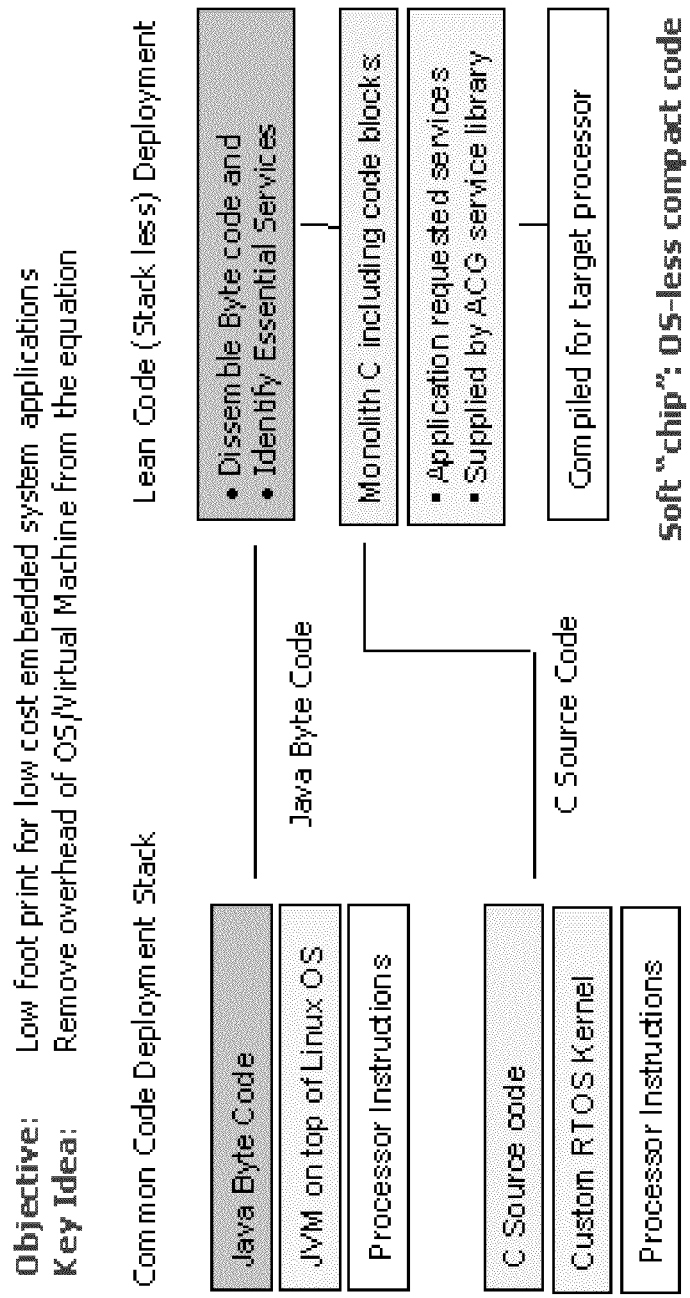
Figure 31:
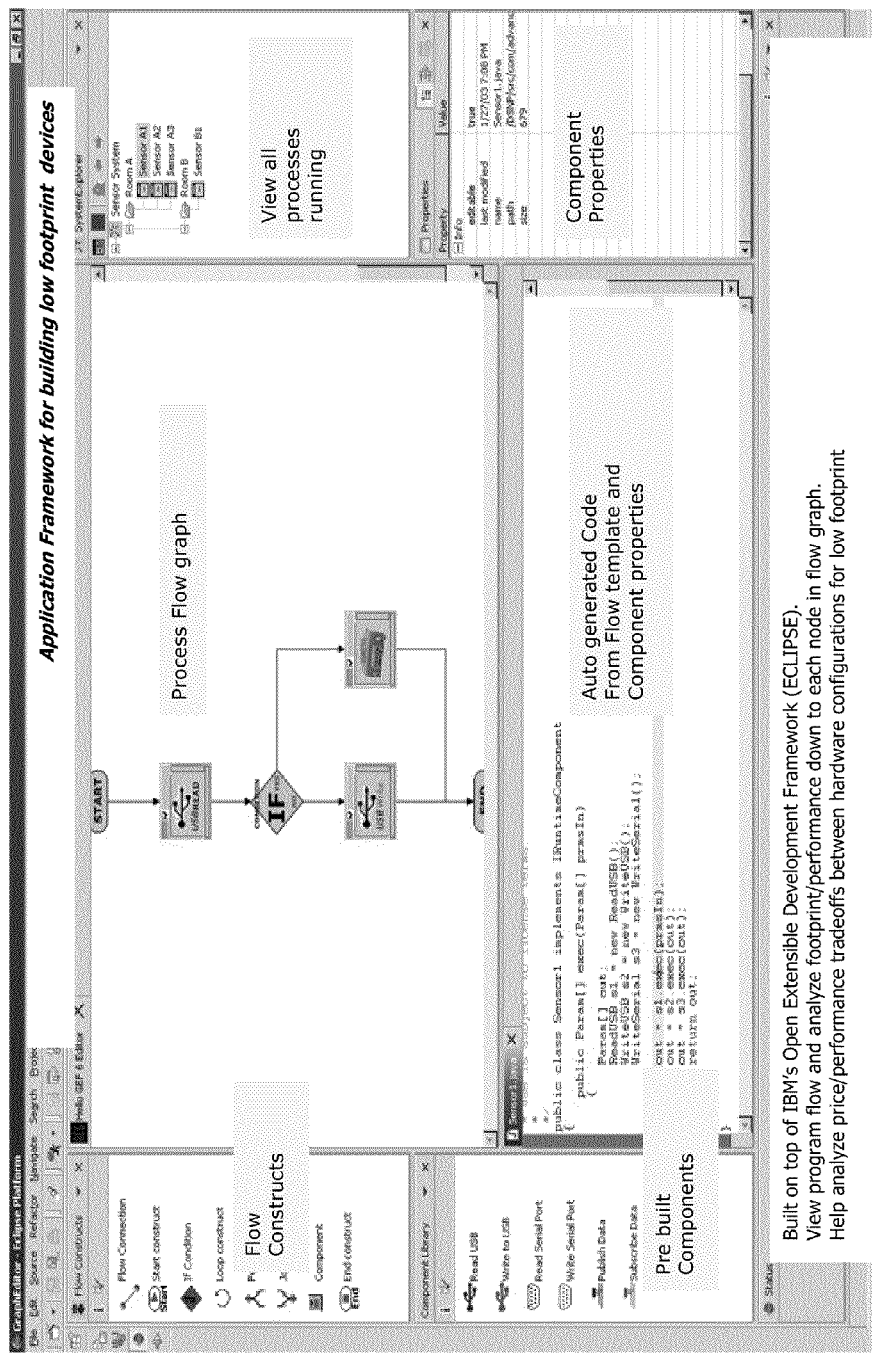

FIG. 30 through 31 depict the process of generating an OS less image for secure small footprint devices and an exemplary graphical programming environment for simple sensory devices, in one embodiment.

Figure 32:
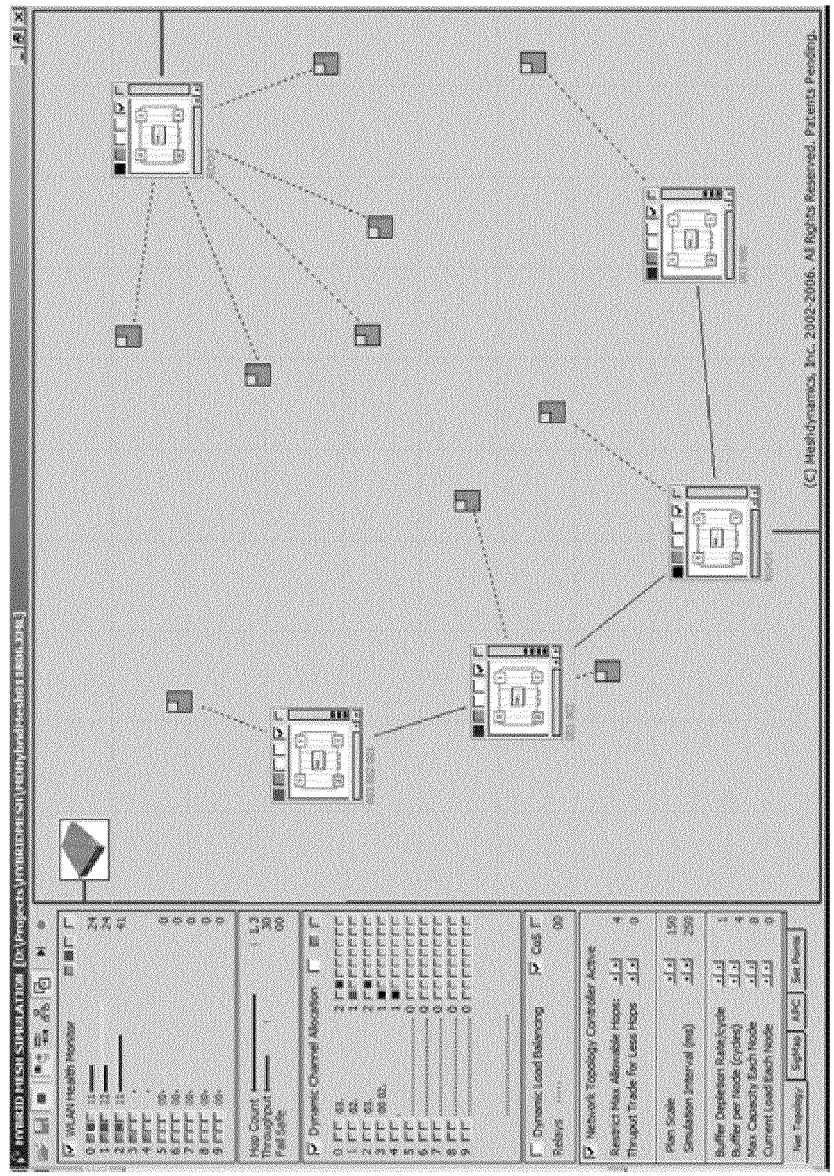
Figure 33:
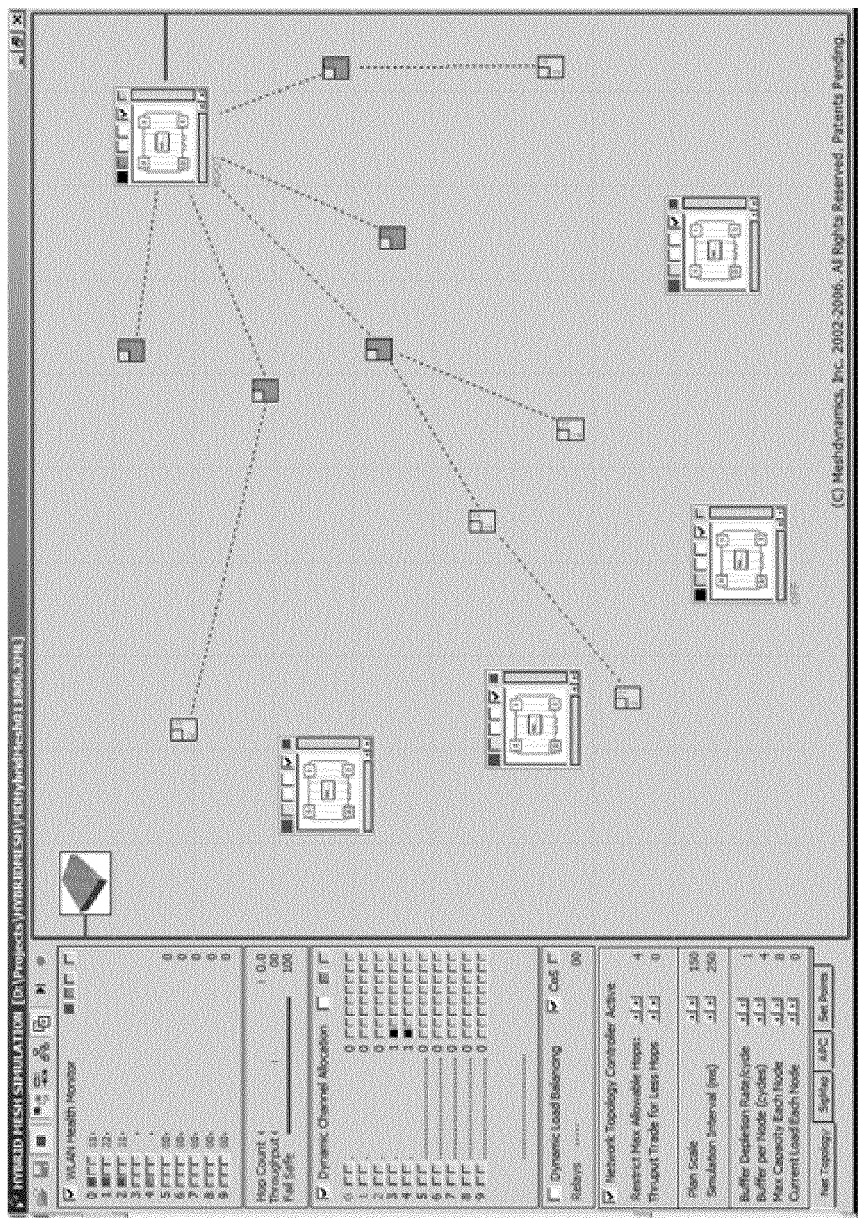

FIGS. 32 and 33 depict device repeaters and range extenders. Conceptually these devices are similar to clients, such as the soldiers shown in FIG. 15. They provide blind repeating and therefore range extension for remote devices. They also serve as a redundant path, similar to FIG. 13 but employing a single physical radio. Thus, in chirp language, they are birds that repeat and relay a bird song in string of pearl configurations.

Figure 34:
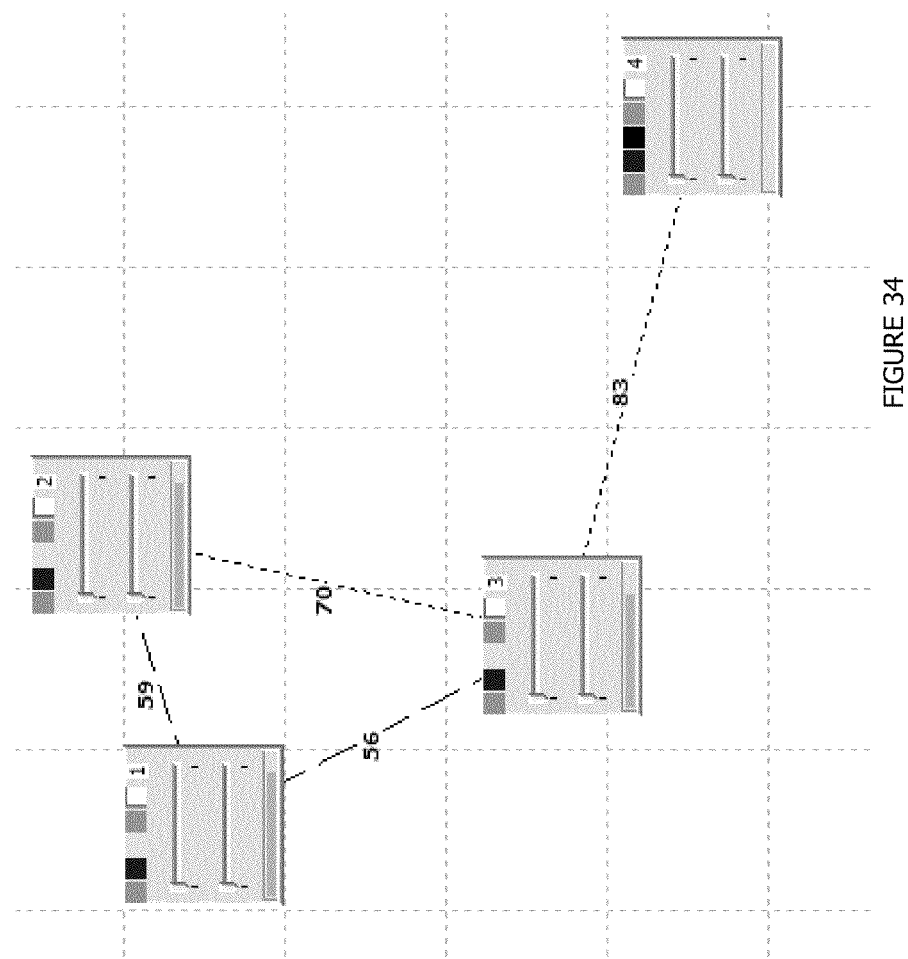

FIG. 34 depicts a node network.

Figure 35:
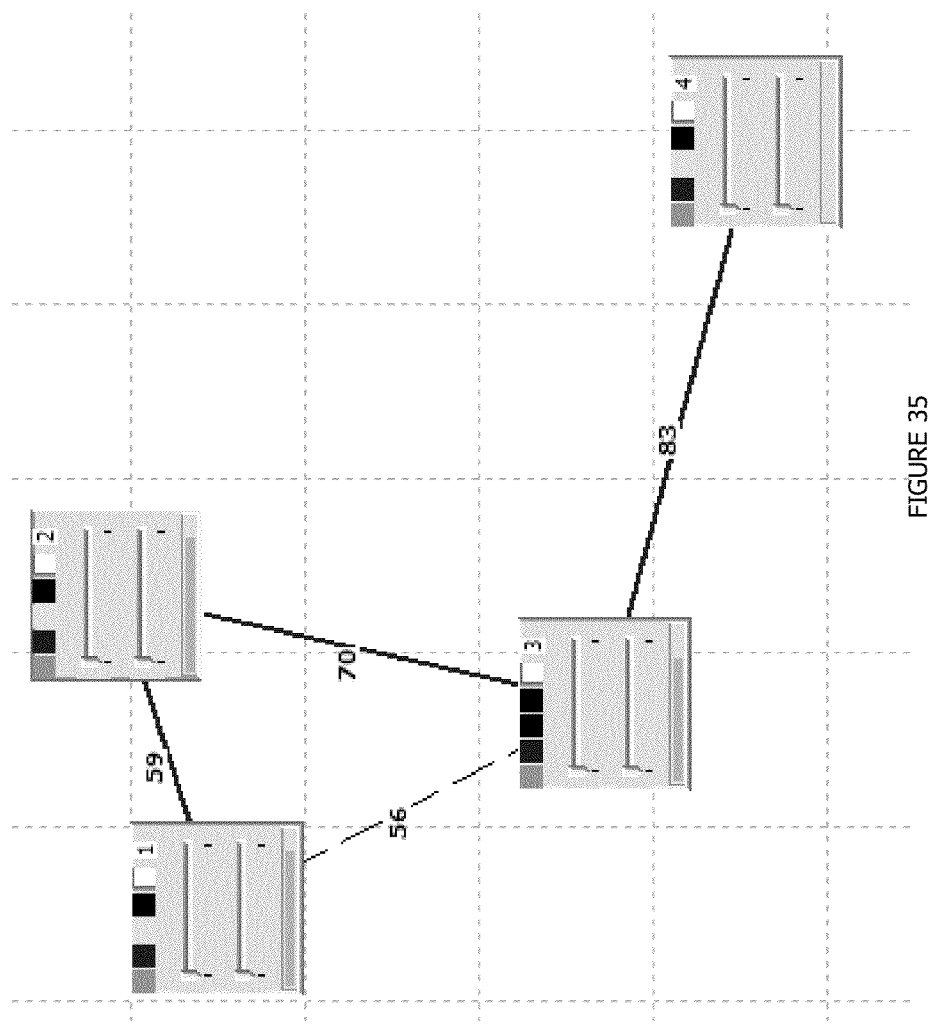

FIG. 35 depicts the single source shortest path of the node network of FIG. 34.

Figure 36:
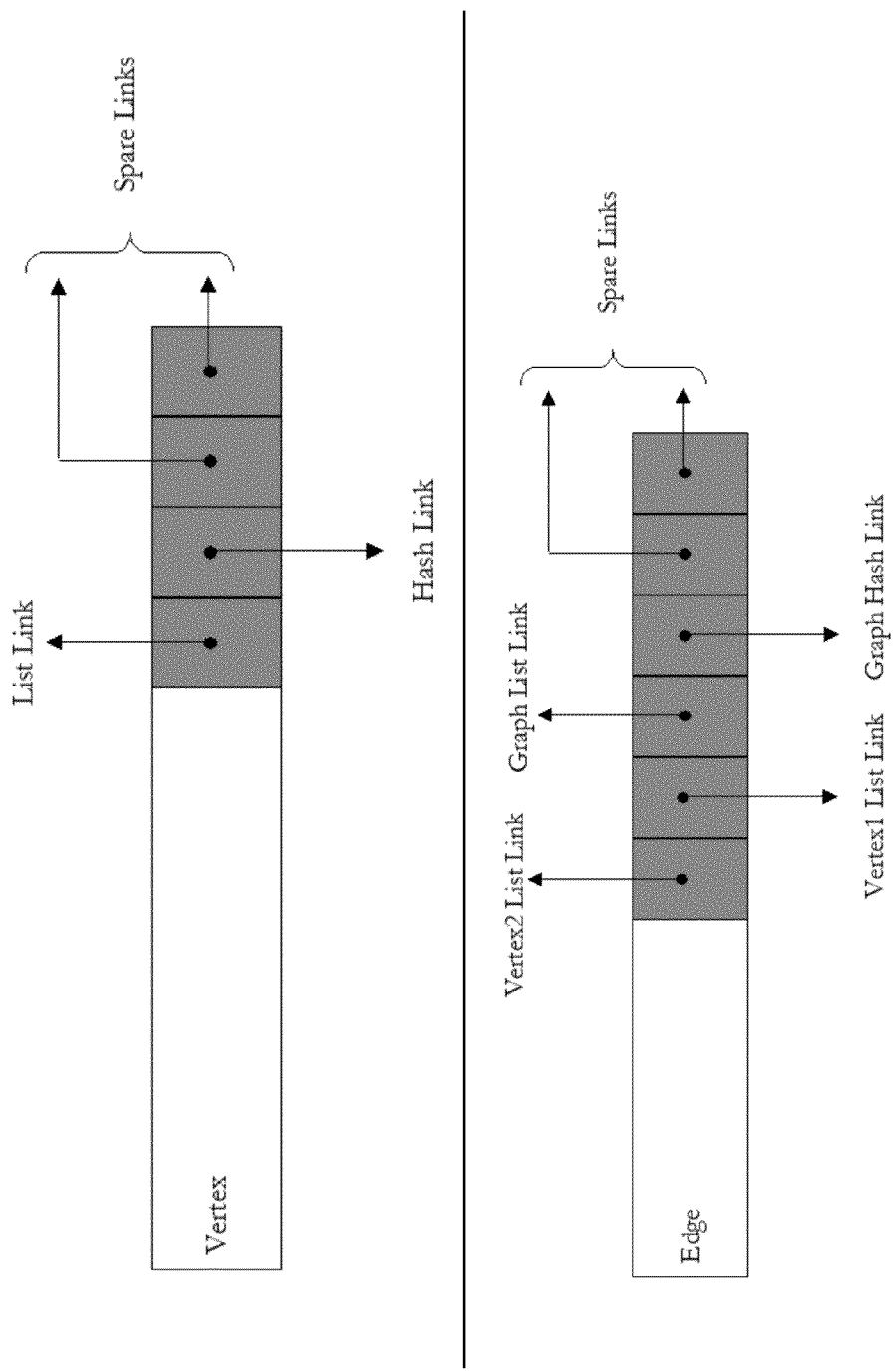

FIG. 36 depicts a graph algorithm.

Figure 37:
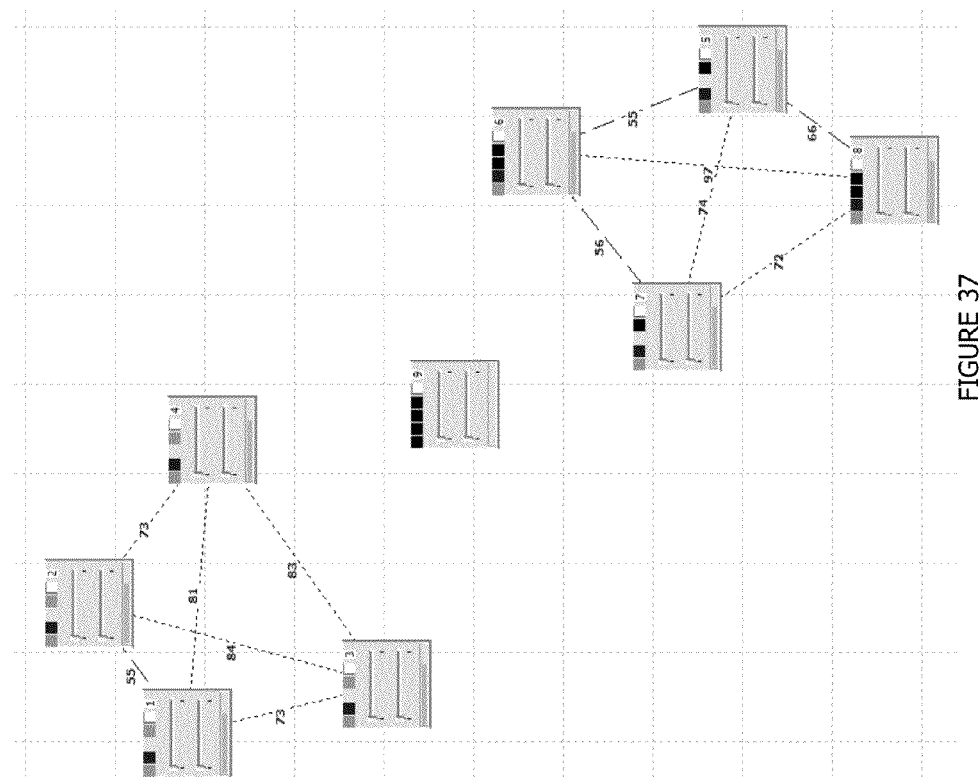

FIG. 37 depicts a common device approach utilizing two pico-nets.

Figure 38:
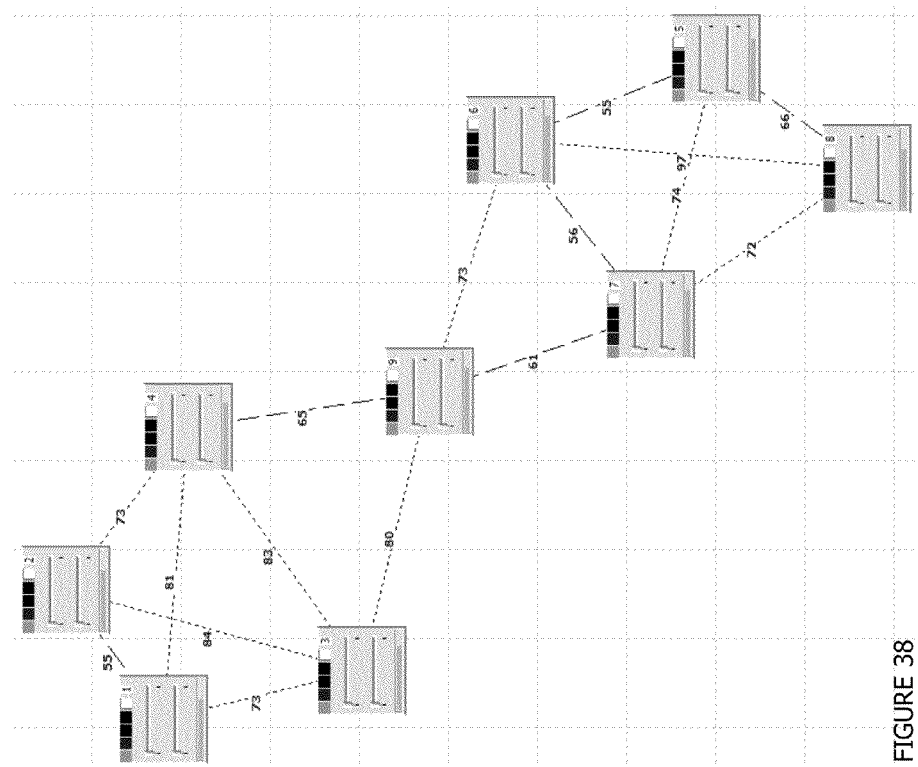

FIG. 38 depicts the pico-nets of FIG. 37 operating independently.

Figure 39:
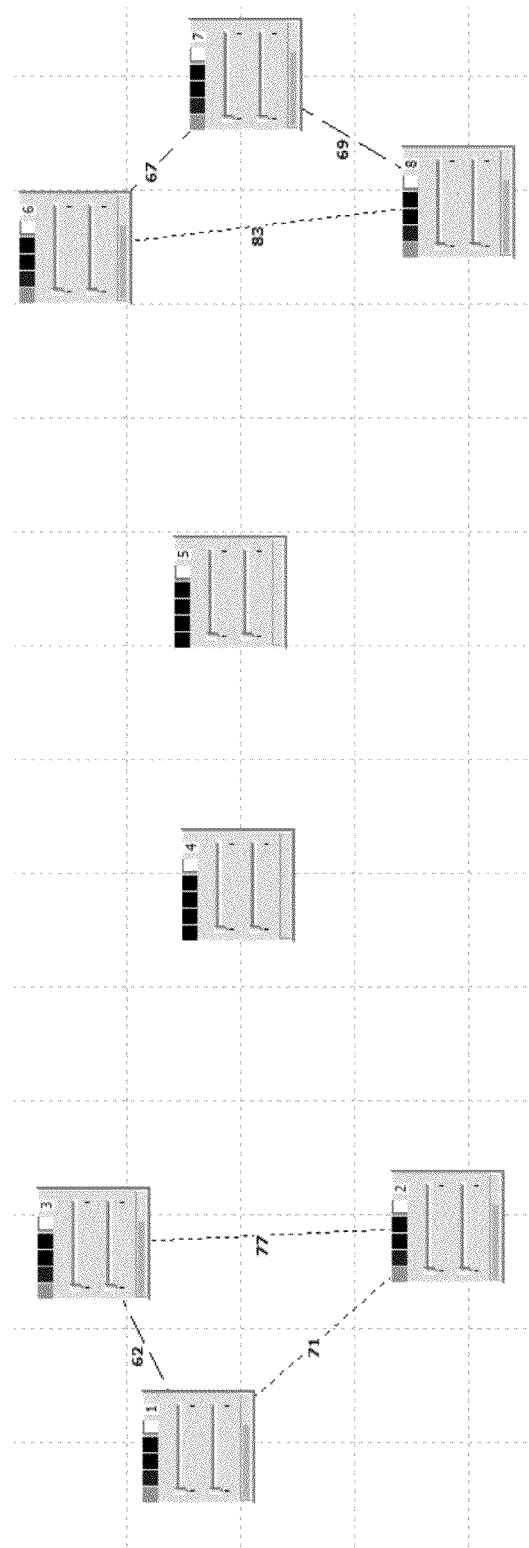

FIG. 39 depicts two pico-nets wherein two nodes are designated common routers.

Figure 40:
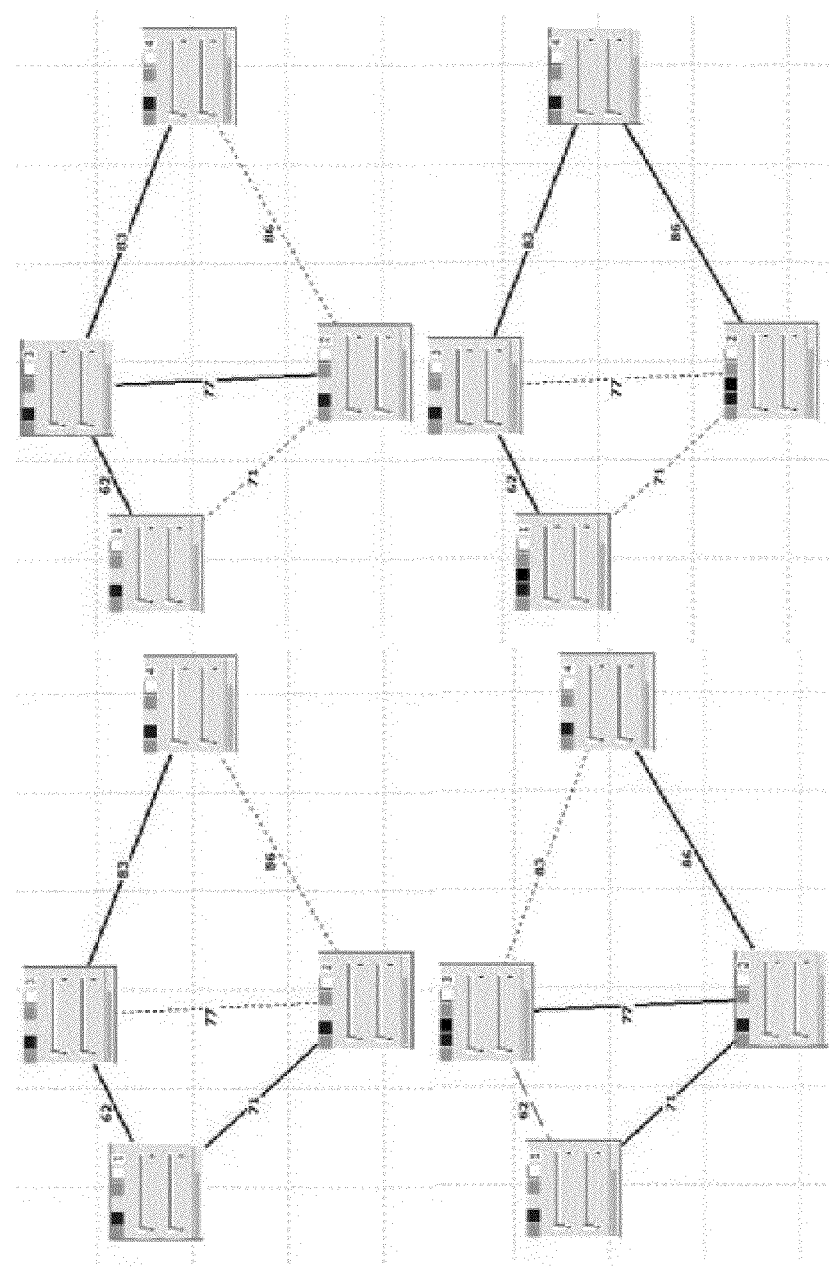

FIG. 40 depicts the intra pico-net single source shortest path trees for nodes 1 through 4.

Figure 41:
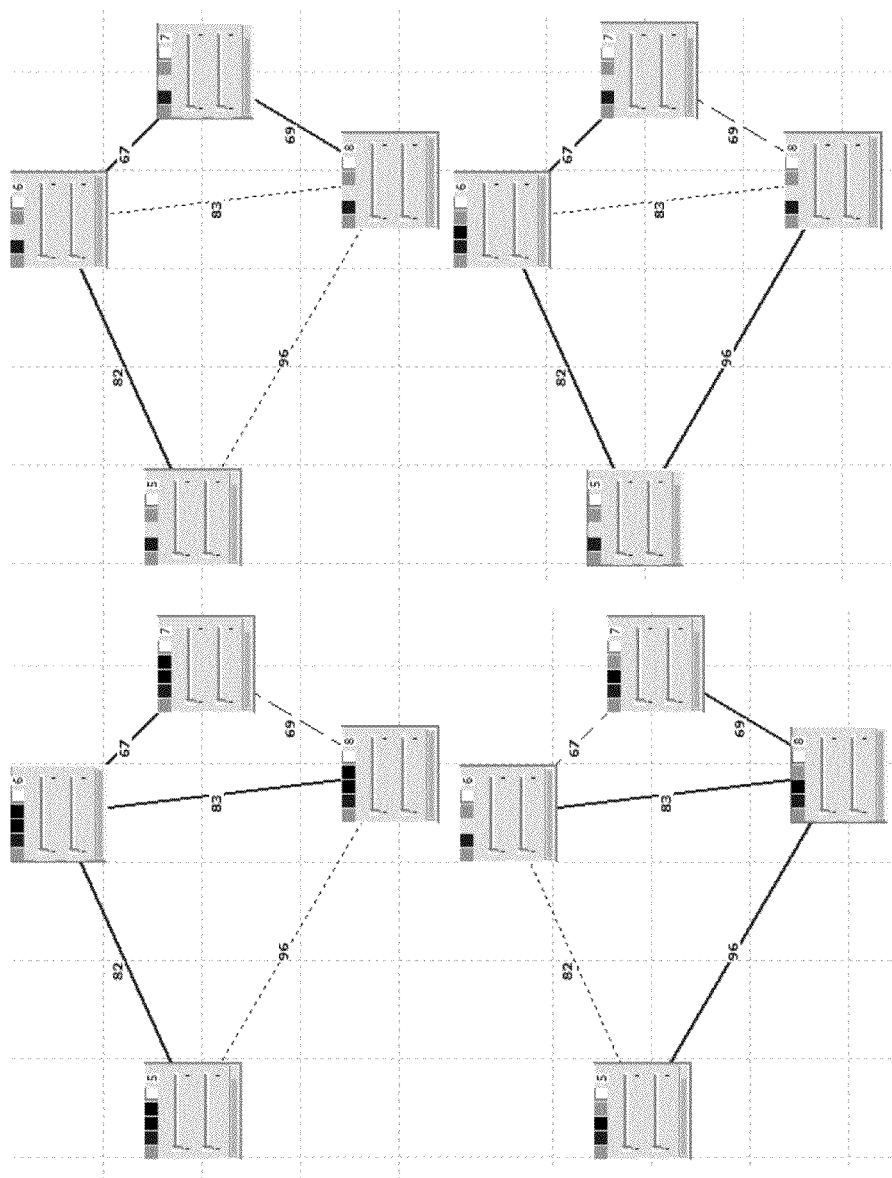

FIG. 41 depicts the intra pico-net single source shortest path trees for nodes 5 through 8.

Figure 42:
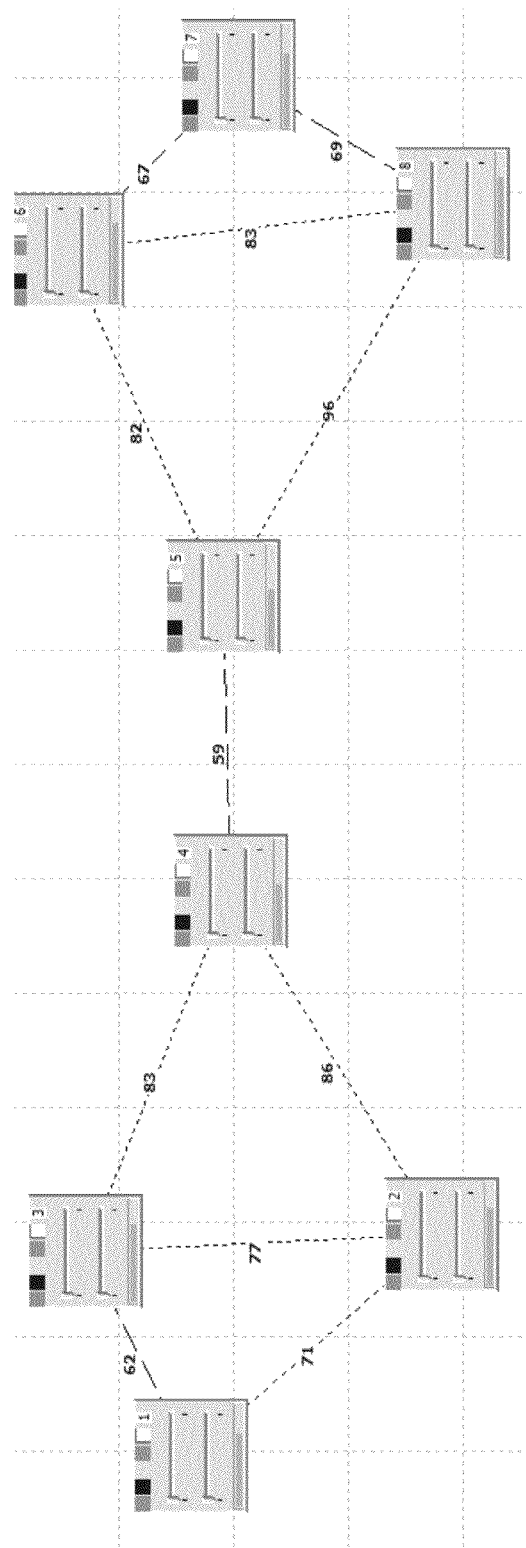

FIG. 42 depicts the entire topology for the nodes 1 through 8.

DETAILED DESCRIPTION OF SPECIFIC EMBODIMENTS

The description above and below and the drawings of the present document focus on one or more currently embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

Radio is a shared medium where only one device or person can be "talking" at a time. As networks grow, performance degrades rapidly as more clients are serviced by the same AP. The AP's Basic Service Set (BSS) becomes unmanageable. The need to split up the network into smaller groups is essential to the health of a network.

The problem is exacerbated in multi-hop topologies using one-radio systems. With one-radio units everyone is on the same BSS—bandwidth is reduced to half with each successive hop in the network. The reason is that radio is a shared medium—every one has to stay silent when a re-transmission from one hop to another hop (within the same BSS) occurs. One radio networking solutions cannot meet all the high performance requirements of enterprise infrastructure networks.

In one embodiment a solution is to split up the wireless network into smaller groups (BSS), each of which is operating on a non-interfering channel with other groups (BSS). Simultaneous "conversations" are now possible. Each BSS discussed herein is not interfering with other transmission channels allocated to neighboring BSSs. But to do this and provide bridging across the individual sub networks, requires two radios as shown in the embodiment of FIG. 4 (label 020)

Figure 3:
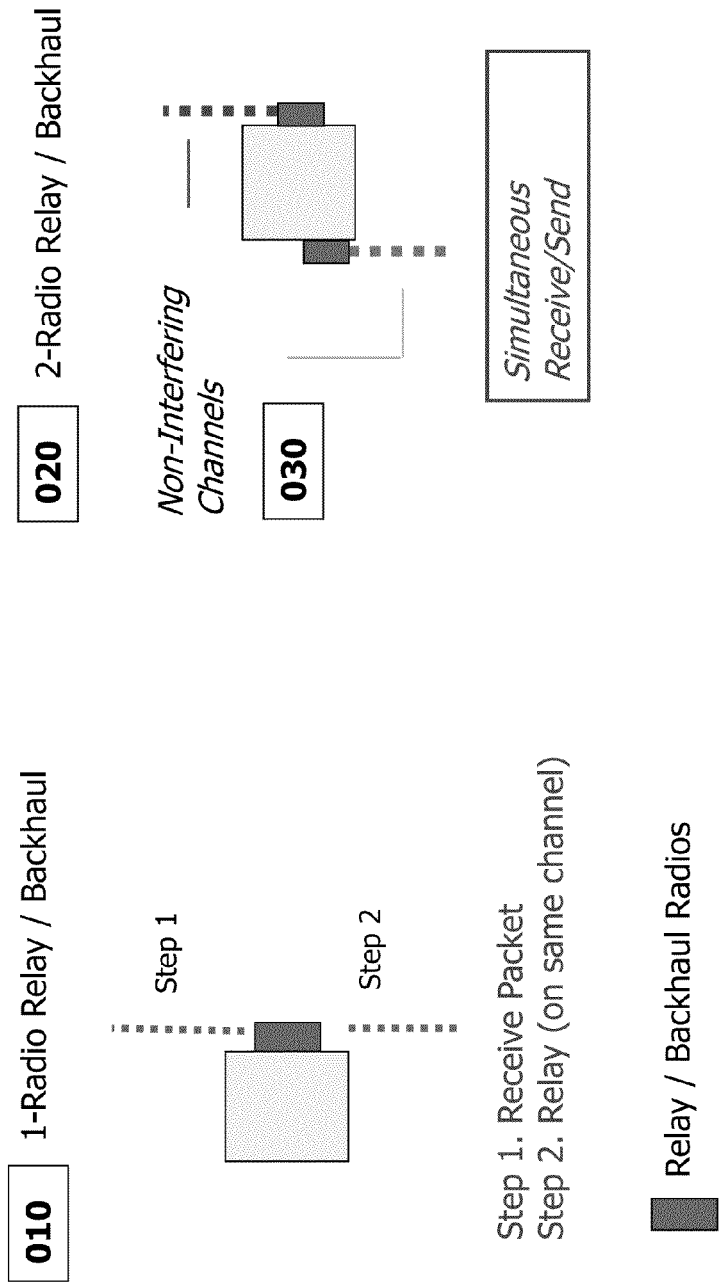
FIG. 3 compares the two step process of a single radio relay to a two-radio relay. On the left side, (010) a single radio relay is shown. Every packet received has to be re-transmitted on the same radio. Thus the bandwidth with every hop in a single radio mesh network is reduced by approximately 50%. After three hops, the Bandwidth would be ⅛ of what is available at the Ethernet backhaul. On the RHS (020) a two-radio backhaul is shown, where packets received on one radio are re-transmitted on another radio operating on a non-interfering channel. Now there is no bandwidth reduction with every hop and bandwidth is preserved with every hop. Two radio mesh backhauls are thus scalable while single radio backhauls are not.

FIG. 3 compares the performance of a single radio relay (or backhaul) to that of a 2-radio relay (or backhaul) On the LHS, (010) a single radio relay is shown. Every packet received has to be re-transmitted on the same radio. Thus the bandwidth with every hop in a single radio mesh network is reduced by approximately 50%. After 3 hops, the Bandwidth would be ⅛ of what is available at the Ethernet backhaul. In contrast On the RHS (020) a two-radio backhaul is shown, where packets received on one radio, are re-transmitted on another radio operating on a non-interfering channel. This is depicted as the different color for the dashed lines emanating from the radios. (030)

Since the radios operate on different channels, they are now part of separate sub-networks. Transmissions from one do not affect the other and both can transmit/receive freely. With the radios operating on different non-interfering channels, there is now no bandwidth reduction with every hop. Bandwidth is preserved with every hop. Two radio mesh backhauls are thus scalable while single radio backhauls are not. This is in essence the power of the 2-Radio concept: separating the uplink and down link radios in a mesh network.

Figure 4:
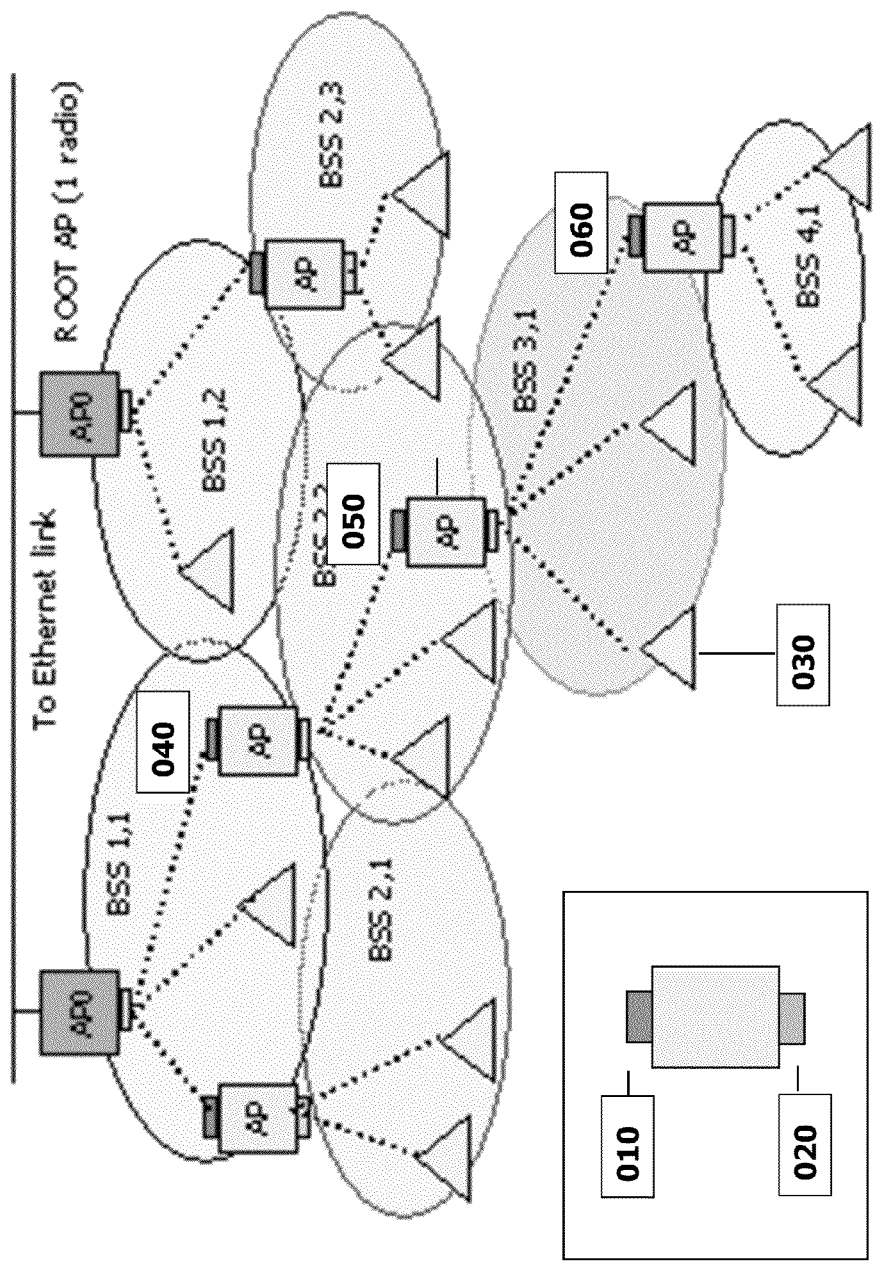
FIG. 4 shows how the structure of two-radio multiple hop mesh network where each two radio unit services a Basic Service Set (B SS) by configuring one of the two radios to serve as an AP to its clients. Clients may include the second radio of another two radio system, with this radio configured to run in station mode, providing the backhaul path back to the Ethernet link. In the insert, the uplink radio (labeled 010) connects to the parent mesh node while the downlink radio (labeled 020) acts like an Access Point to client radios, including other mesh nodes that connect to it through their uplink radio. Note that all service radios (020) operate on different non-interfering channels, depicted by different color ovals.

FIG. 4 shows the infrastructure mesh in a topology with a two-radio unit in a multiple hop wireless network. The rectangular icons in this figure represent the APs, which have formed a mesh in order to support clients. The triangular icons represent these clients. At the top of the figure are the root Access Points or APs (two, in this example) that have a direct connection to the wired backbone. Each of these APs creates a separate BSS using a separate RF channel.

The BSSs (Basic Service Sets) are labeled as BSS [hops], [index], so BSS 1,1 indicates that this is the first BSS for which one hop is needed to reach the wired backbone. For the non-root APs, one radio serves as an AP to its clients; the other radio acts as a backhaul.

The radio interface colored green—labeled 010—acts as a connection to the "Parent"—the backhaul. It operates in station mode: it appears as a client, no different from other clients shown as triangles. The backhaul and AP radio, colored gray—labeled 020—operates in AP mode: it services clients, including other Access Points accessing it as clients, through their second radio operating in station mode. In the lower layers, a description such as BSS 2,3 means that this is the third AP for which two hops are required to reach the wire. Triangles denote client radios (see Label 030).

In one embodiment, in order to accommodate different types of transmissions (such as voice versus data), a classic solution is to split up the wireless network into smaller groups (BSS), each of which is operating on a non-interfering channel with other groups (BSS). Simultaneous "conversations" are now possible in each BSS. This solution, however, is not available in an ad-hoc (peer-to-peer) mesh solution, because such a solution must, by definition, create a single, large, BSS.

Each BSS shown in the infrastructure mesh of FIG. 4, however, is not interfering with other transmission channels allocated to neighboring BSSs. Channel Interference is contained and spatial re-use is possible. Two-radio solutions are therefore more impervious to noise than their one-radio counterparts. Channels can automatically be re-allocated to avoid unpredictable sources of interference such as radar or unauthorized transmissions that may be present in emergency or military situations.

The Logical 2-Radio Concept is Distinct from Conventional Mesh

The Logical Two-Radio concept must not be confused with other mesh approaches that may also use two (or more) physical radios. This is referred to as a "Dual-radio" mesh and shown on the LHS of FIG. 2.

Figure 2:
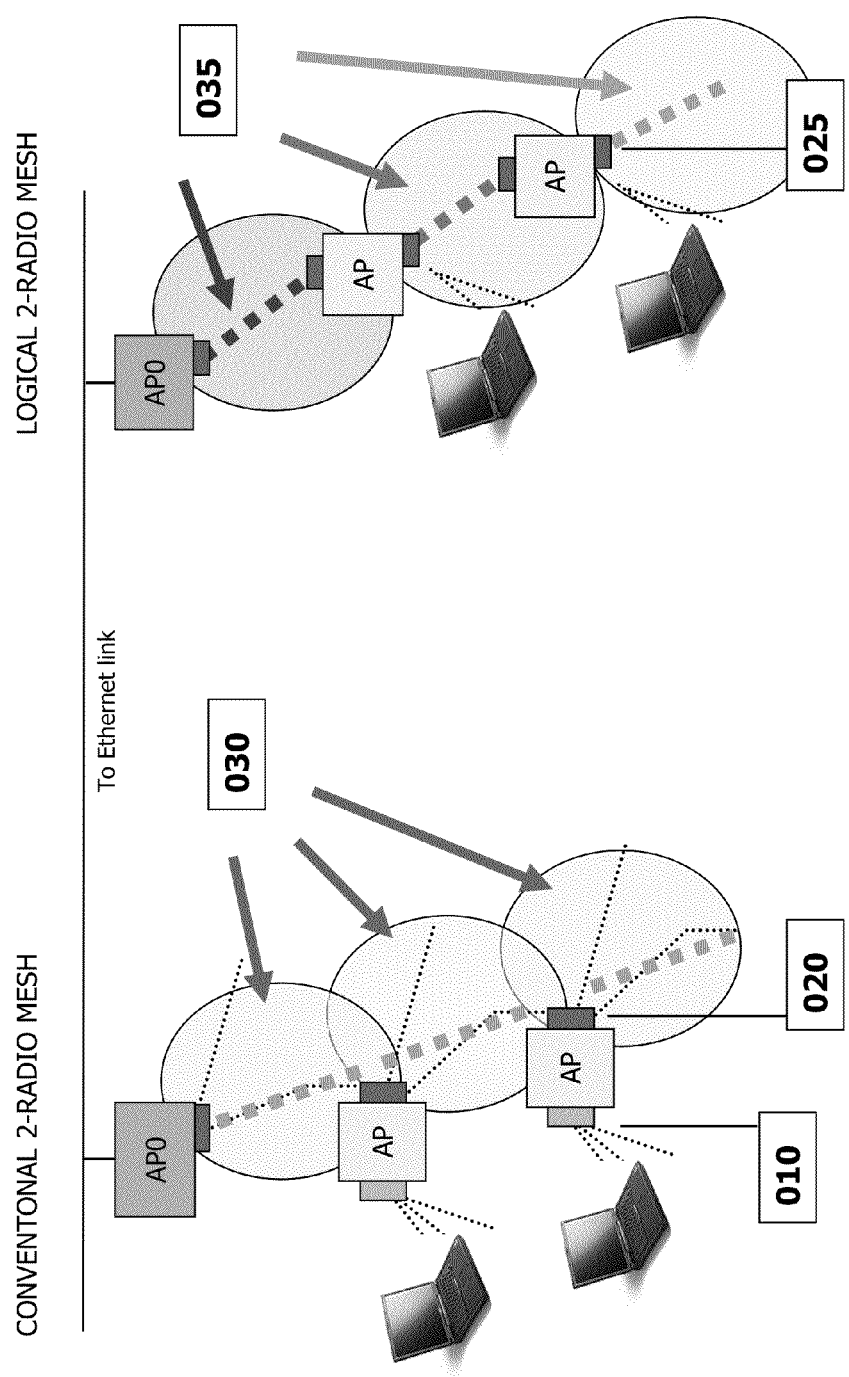
FIG. 2 contrasts the conventional "Dual Radio" mesh with the Logical Two-Radio Mesh. On the LHS of FIG. 2, 2 radios labeled 010 and 020 provide client connectivity and ad hoc mesh backhaul functionality, respectively. All the mesh backhaul radios (020) are on the same channel depicted by the clouds of coverage of the same color (030). There are all part of the same sub-network. In contrast, on the RHS of FIG. 2, the same radio (025) provides service to clients and also backhaul functionality but operates in different sub domains depicted by different color clouds of coverage (035). The LHS resembles a "hub", the RHS a "switch". Hubs are not scalable.

FIG. 2, LHS shows that one radio services client while the other forms an ad hoc mesh. Separating the service from the backhaul improves performance when compared with conventional ad hoc mesh networks. But a single radio ad hoc mesh is still servicing the backhaul—since only one radio communicates as part of the mesh. Packets traveling toward the Internet share bandwidth at each hop along the backhaul path with other interfering mesh backhauls—all-operating on the same channel.

Such systems are not scalable since the backhaul is still a single radio and suffers from the bandwidth degradation with each hop, endemic to single radio backhauls, see FIG. 2 label 010. In contrast, the Logical 2-Radio concept described in this document focuses on a multiple radio backhaul as shown in FIG. 3, Label 020.

It should also be noted that regardless of the number of radios allocated to the backhaul and those allocated in service of clients, the system resembles a wired switch stack from a logical perspective. Other mesh architectures resemble a hub.

Adding More Physical Radios

The logical two radio approach forms a tree like network as shown in FIG. 4, in one embodiment. A first radio provides the uplink to a parent radio and the second radio provides the downlink to child nodes. Thus the Two-Radio mesh node labeled 040 is a parent to mesh Node labeled 050. The mesh Node labeled 050 is a parent to mesh node labeled 060.

Mesh node labeled 050 also has two client radios, shown as triangles, one of which is labeled 030. Lack of a separate radio to service clients limits the effective backhaul bandwidth for the network, since clients are sharing bandwidth on the backhaul. It also prevents the use of proprietary but more efficient transmission protocols on the radios, since those radios also have to "talk" with client radios, that demand a non-proprietary and less efficient protocol not optimized for backhaul communications.

An extension of the logical two-radio functionality is to use an embodiment employing three radios with two separate radios for the high speed backhaul and one more radio for separate slower service to clients. One embodiment is depicted in FIG. 6, which again uses a tree-like structure. But in this embodiment, the two backhauls are dedicated radios (labels 010, 020) and there is a separate radio (025) to service clients (030) only. The chain of connectivity (040-050-060) has not changed.

Figure 5:
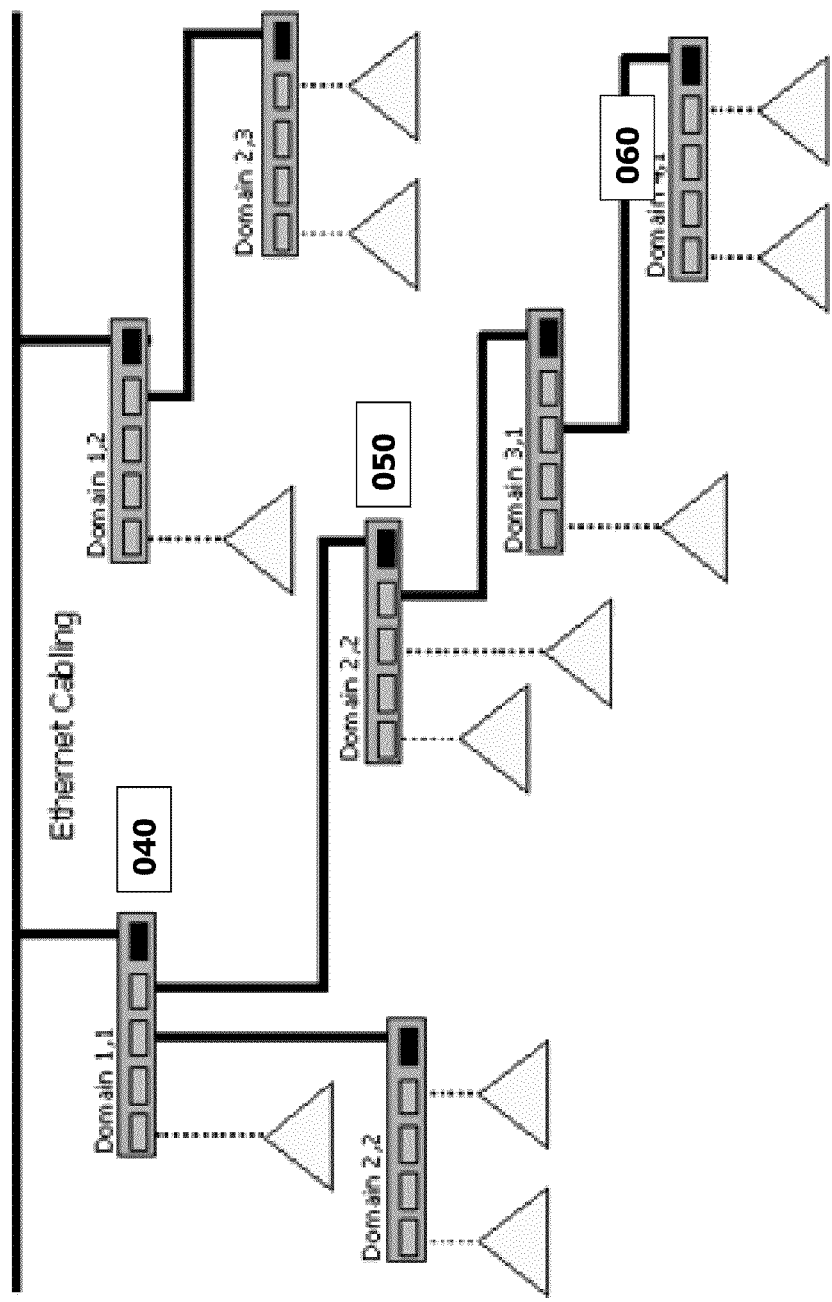
FIG. 5 shows the similarities between FIG. 4 and a wired switch stack with the same chain of connectivity 040-050-060. Both have the same tree-like structure and up link and down link connections. In both cases the units (040, 050, 060) operate on a distinct sub domain.
Figure 6:
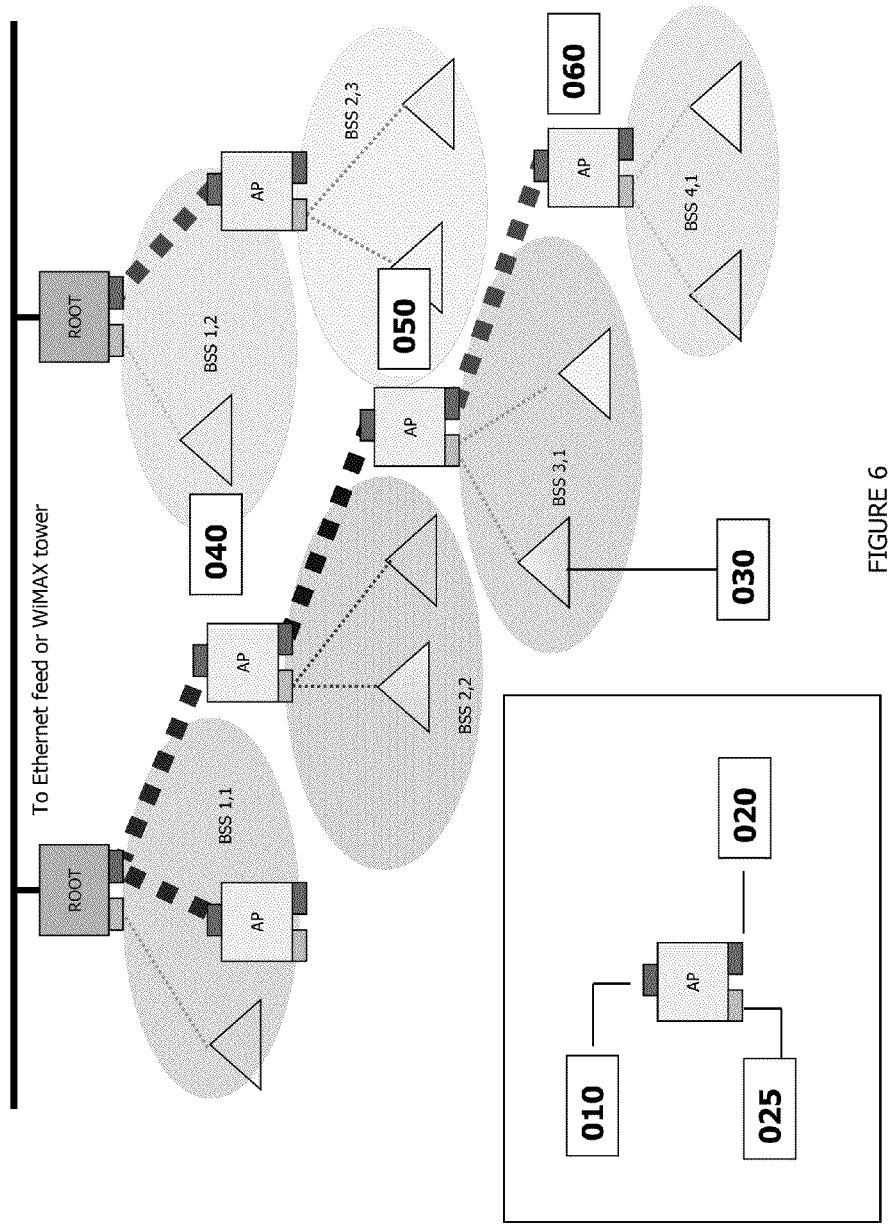
FIG. 6 illustrates one embodiment of the two logical-radio approach with three physical radios. Two radios constitute logically one radio of the two logical radio concept, while the third physical radio serves clients as the second radio of the two logical radio concept. By eliminating the sharing of physical radios for both backhaul and client services, the backhaul bandwidth has improved and also reduced the dependency to use the same type of radios for the backhaul and the client. In the insert, the uplink radio (labeled 010) connects to the parent mesh node while the downlink radio (labeled 020) connects to the uplink radio of child mesh nodes. The service radio (labeled 030) act as Access Points to client radios shown as triangles. One such is labeled 040. Note that all service radios (030) operate on different non-interfering channels, depicted by different color ovals.

Note that while more (physical) radios have been employed, FIGS. 5 and 6 are functionally identical. In both cases, one the functionality of uplink and downlink are separate. In FIG. 5, the downlink supports both client and mesh nodes. In FIG. 6, the radio (020) providing downlink connectivity is now dedicated to backhaul services while another radio (025) services clients (030). There is performance improvement of shifting the slower traffic from clients to another radio so the backhaul can operate in the "fast lane" but beyond this implementation improvement FIG. 6 and FIG. 4 are functionally identical.

Adding More Physical Radios to the Backhaul.

In the embodiment shown in FIG. 6, the logical service radio was split into two physical radios to achieve greater performance. The logical backhaul radio can also be split into multiple backhaul radios to provide better backhaul, in other embodiments. More backhaul radios provide more alternate routing paths and the ability to tune individual routing paths to support required application settings. Thus it is possible to have multiple backhauls, one that provides low latency (with fewer hops) and another that provides more throughput but using a more circuitous route with more hops and more latency.

The system would then route packets such that Voice packets traveled along the low latency backhaul and data packets would travel on the other—high throughput—backhaul. Adding more backhauls thus increases flexibility in supporting diverse performance requirements and also improves redundancy and fault tolerance. Note however, that from a logical perspective, this is still a Two Logical Radio system depicted in FIG. 5 and the software control layer that manages the multiple backhaul system is functionally the same as that for the two-radio units.

Full Duplex Backhauls

A variation of this concept, shown in another embodiment, adds more physical radios in support of better backhaul functionality is to split the incoming and outgoing traffic to two separate backhaul radios. This doubles the bandwidth and effectively reduces latency also.

Figure 7:
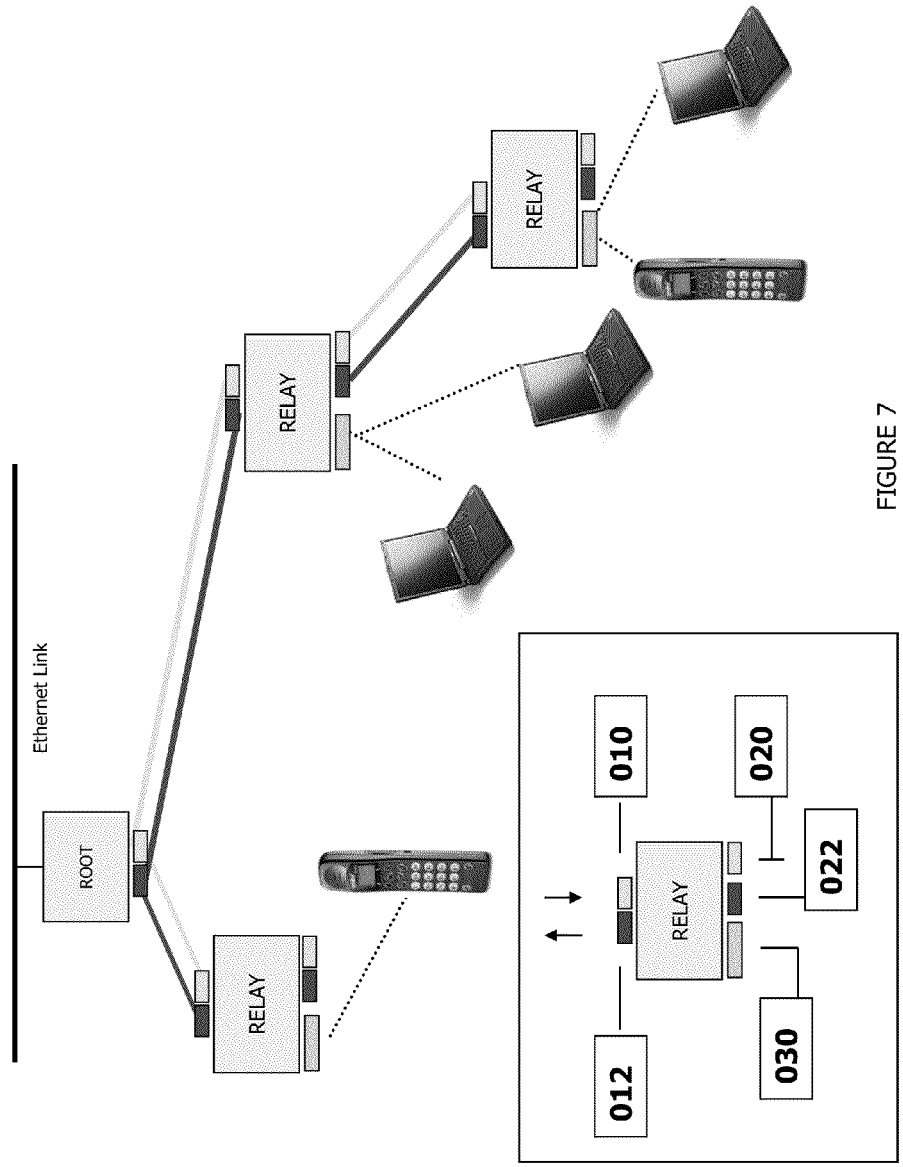
FIG. 7 illustrates another embodiment of the two logical radio approach but with five physical radios. The uplink and downlink radios (shown as one radio FIG. 6) are split into two radios, in this embodiment, with each responsible for one direction of traffic. Bandwidth is doubled and latency halved, since traffic in the opposing direction now has its own channel or logical "lane". Thus, the radio labeled 010 in FIG. 6 is now radios 012 and 010. Similarly, the radio marked 020 in FIG. 6 is now split into radios labeled 022 and 020. The radio pairs 012-010 and 022-020 provide the same functionality as the radios labeled 010 and 020 in FIG. 6 but with twice the bandwidth and approximately half the latency.

In FIG. 7 the uplink and downlink radios (shown as one radio FIG. 6) are now split into two physical radios, each responsible for one direction of traffic. Bandwidth is doubled and latency halved, since traffic in the opposing direction now has its own "lane." Thus, the radio labeled 010 in FIG. 6 is now radios 012 and 010 in FIG. 7. Similarly, the radio marked 020 in FIG. 6 is now split into radios labeled 022 and 020 in FIG. 7. The radio pairs 012-010 and 022-020 provide the same functionality as the radios labeled 010 and 020 in FIG. 6 but with twice the bandwidth and approx half the latency.

Multiple Service Radios

A single radio must service all local clients, regardless of the application requirements. Consider an Access Point servicing both Voice-over-IP (VoIP) and data clients. If a number of data devices are requesting simultaneous transfers, they will use up all available bandwidth and interfere with voice traffic, thereby adding significant latency and jitter. Latency and jitter are enemies of VoIP, and this situation rapidly results in deteriorated call quality, even if the bandwidth requirements for individual calls is much lower than the data transfers that may saturate the medium. Since radio is a shared medium, the only way to prevent this interference is at the source of the problem—the shared spectrum at the radio. By the time the data and voice traffic get to a wireless backhaul it is too late. The damage has already been done.

Figure 8:
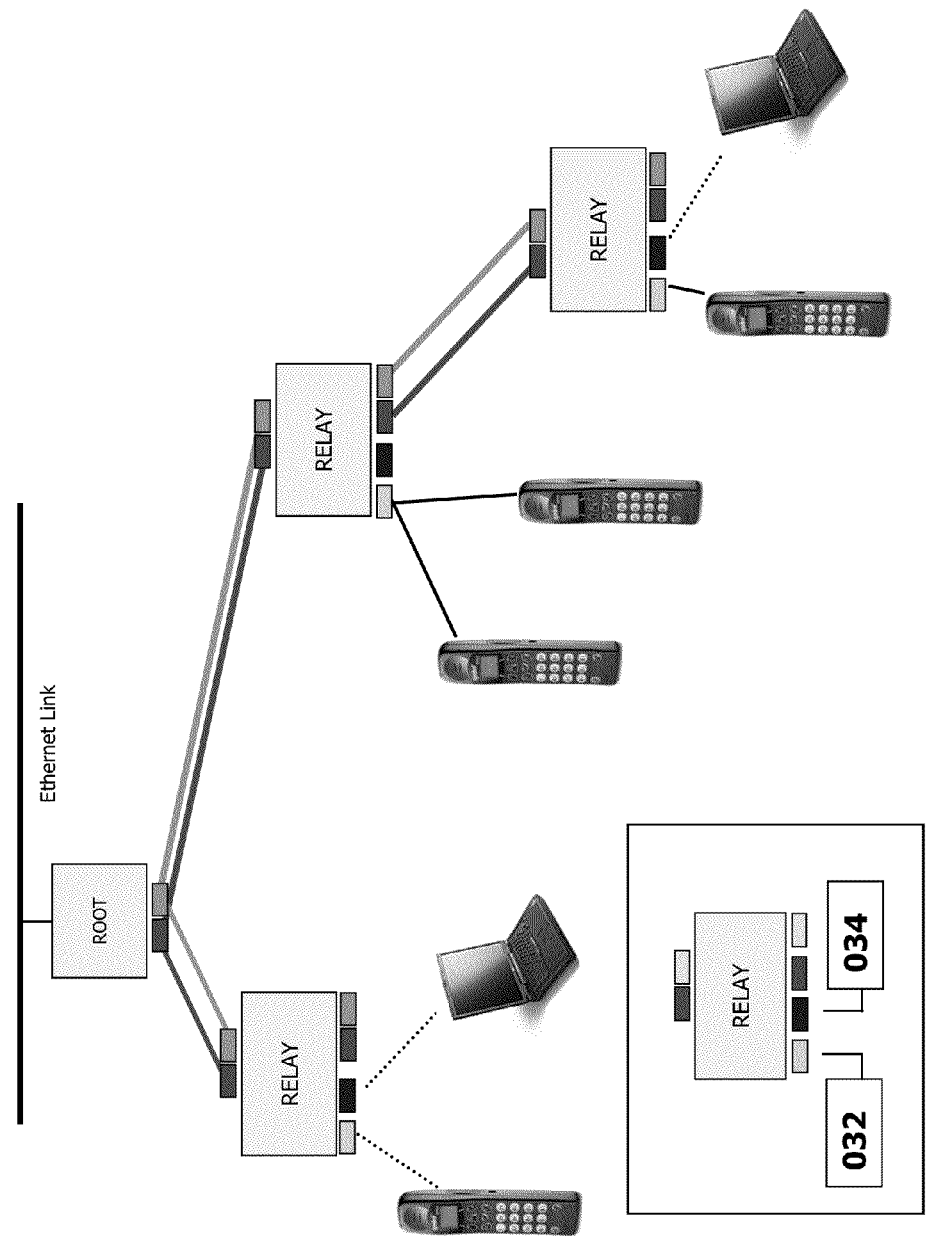
FIG. 8 is an extension of the five-radio embodiment shown in FIG. 7.

FIG. 8 is an extension of the five-radio configuration shown in FIG. 7 to separate voice and data traffic. In FIG. 7, there is one service radio to service both voice and data customers. However voice and data traffic has different performance requirements. Data requires higher bandwidth and is relatively indifferent to latency. Conversely, voice requires low bandwidth but is latency sensitive. By having different Access Point radios service the voice and data clients, the contention between voice and data packets attempting to gain access to the same medium is reduced. Also, with different radios servicing the data and voice clients, the voice and data packets can now be treated differently. For example, the radio servicing voice clients could therefore be operating in a different mode such as PCF (Point Control Function) or TDMA (time division multiple access) mode while the AP radio servicing the data clients operates in DCF (Distributed Control Function) mode.

Figure 9:
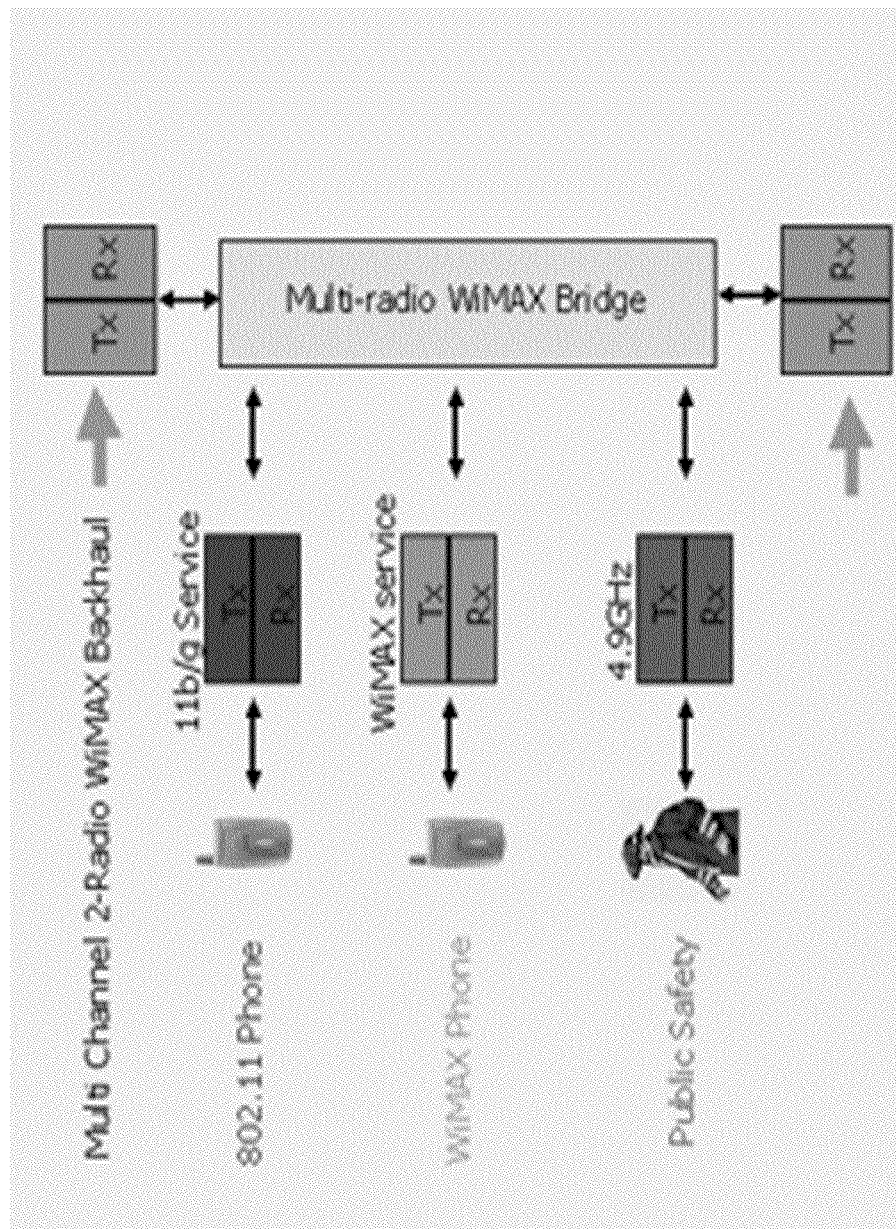
FIG. 9 is a five-radio extension of the three-radio configuration shown in FIG. 6 but with more dedicated service radios operating on different frequencies for different types of client radios.

Along the lines of multiple service radios, FIG. 9 is a five-radio extension of the three-radio embodiment shown in FIG. 6 but with more dedicated service radios operating on different frequencies for different types of clients. The backhaul is Wimax and it supports Wi-Fi, Wimax and public safety (4.9 GHZ) transmission protocols.

The Logical Two-Radio Concept Must not be Confused with "Dual Radio" Mesh.

In all the configurations outlined above, it should be noted that—regardless of the number of radios allocated to the backhaul and those allocated in servicing clients—the system is functionally identical to the logical two-radio shown in FIG. 4.

It must also be noted that the logical Two-Radio concept contrasts with what is referred to as "Dual radio" or "1+1" mesh. For example some mesh companies use what is referred to in the industry as a "1+1" mesh or "dual-radio" mesh. See FIG. 2 LHS. Here one radio services client while the other forms an ad hoc mesh. Separating the service from the backhaul improves performance when compared with conventional ad hoc mesh networks. But a single radio ad hoc mesh is still servicing the backhaul—since only one radio communicates as part of the mesh. Packets traveling toward the Internet share bandwidth at each hop along the backhaul path with other interfering mesh backhauls—all-operating on the same channel.

Such systems are not scalable since the backhaul is still as single radio and suffers from the bandwidth degradation with each hop, endemic to single radio backhauls, see FIG. 4 label 010. In contrast, the Logical Two-Radio concept described in this document focuses on a multiple radio backhaul as shown in FIG. 2 RHS.

Other distinctive benefits of the Logical 2-Radio approach (vs. other approaches) include:

Layer 2 routing is radio and protocol agnostic. The mesh control layer operates just above the MAC layer of the radio, in one embodiment. It functions as a layer 2 bridge between backhaul and service radios. Layer 3 functionality is thus unaffected. Thus Network/Security functionality is unaffected by the Layer 2 software used to create the logical two-radio embodiments. FIG. 20 shows that the Mesh Control Software sits above the Media Access Control (MAC) of the radio, in one embodiment. As such it is Radio and Protocol agnostic.

Faster Routing Updates. The tree like structure (See FIG. 5, 6, 7) engenders a faster routing mechanism than conventional ad hoc mesh. For this reason, enterprise class wired network switch stacks use an efficient tree structure for routing. Ad hoc Mesh manages a large routing table, generally Order(n2). In contrast, the tree like structure is Order (n) and both system overhead and reaction time are lower.

Manages Channel Interference: In one-radio systems, all radios on the backhaul share the same channel. They are easily affected by interference—possibly malicious—on their operating channel. With Logical two-Radio mesh, nodes can switch to other channels to avoid channel interference from near by nodes operating in another segment of the network or other sources of interference. See FIG. 21.

Dynamic Re-configurability: The logical two-radio approach requires a minimum of two physical radios (See FIG. 4) but there are no upper bounds. Thus if a radio "dies," within a node, the system automatically shifts down to a more appropriate configuration. This may affect performance, either locally or at a single node, but functionally the system architecture has not changed. This level of redundancy is impossible in conventional mesh architectures. See FIG. 2, LHS. The radios 010 and 020 are serving distinct purposes and are generally of different types. For example the radio servicing clients (010) is typically a 802.11b/g radio while the radio part of the backhaul (020) is generally an 802.11a radio. If one radio dies, the other cannot be easily re-configured to support the dead radio functionality without compromising its original purpose. Such is not the case with the Logical two-Radio approach because both radios are of the same time in order to form the chain link 040-050-060 shown in FIG. 4, 5, 6.

Figure 10:
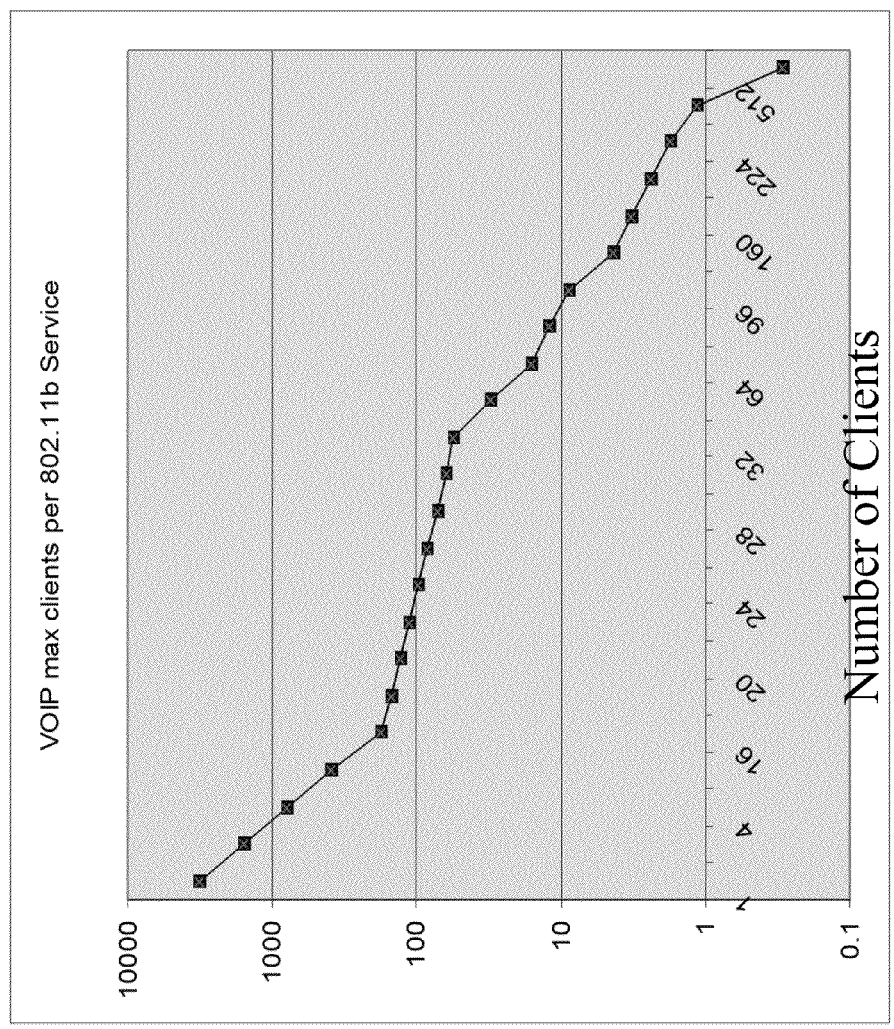
FIG. 10 shows the maximum VOIP bandwidth available per client, using 802.11 radios, as the number of clients increase. This is the size of the packet that each client can send every 20 ms. As the number of clients increase the size of the packet—and the associated voice quality—drops dramatically. In one embodiment, to achieve 64 Kbps voice quality, a 802.11b radio can support around 25 clients.

VOIP Extension for Mesh Backhauls. FIG. 10 shows the maximum VOIP bandwidth available per client, using 802.11 radios, as the number of clients increase. This is the size of the packet that each client can send every 20 ms. As the number of clients increase the size of the packet—and the associated voice quality—drops dramatically. For a 64 Kbps voice quality, a 802.11b radio can support around 25 clients, in the depicted embodiment.

Figure 11:
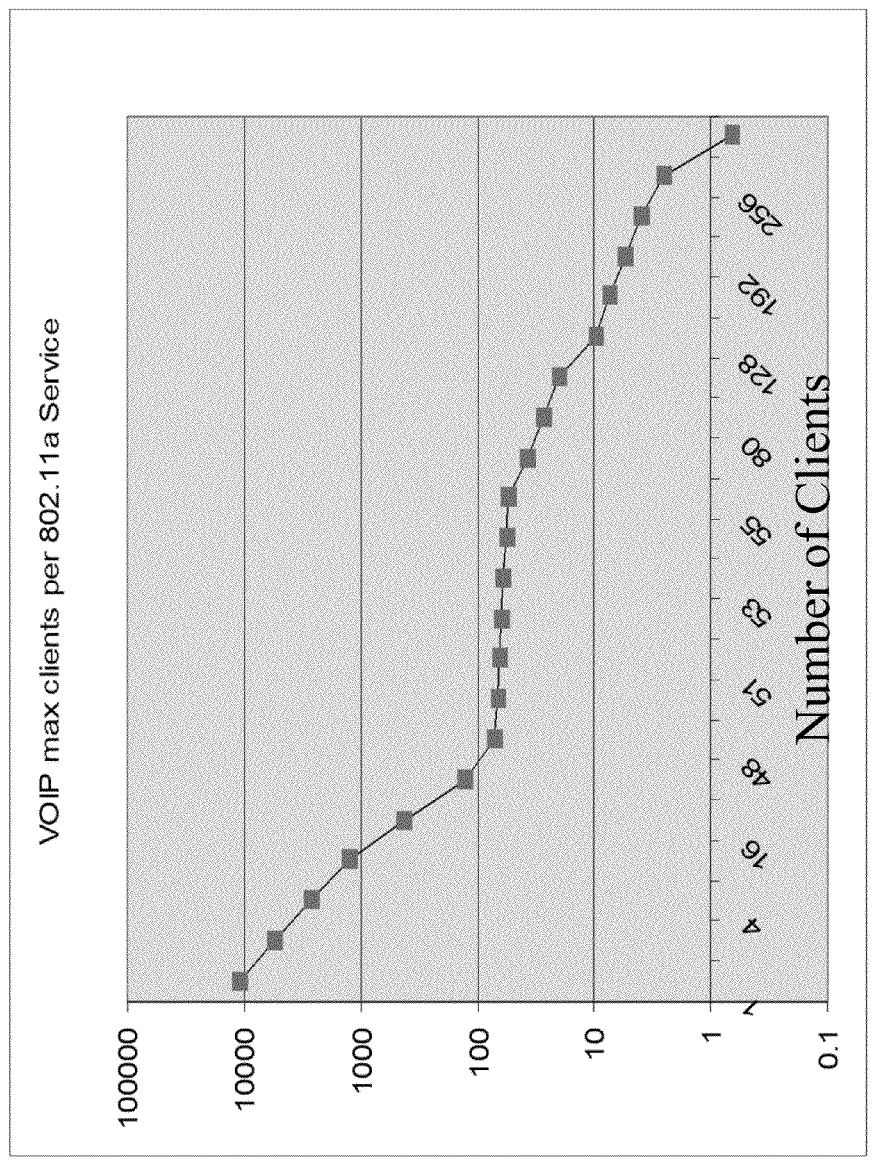
FIG. 11 shows the maximum VOIP bandwidth available per client, using 802.11a radios, as the number of clients increase. This is the size of the packet that each client can send every 20 ms. As the number of clients increase the size of the packet—and the associated voice quality—drops dramatically. In one embodiment, to maintain 64 Kbps voice quality, an 802.11a radio can support around 55 clients.

FIG. 11 shows the maximum VOIP bandwidth available per client, using 802.11a radios, as the number of clients increase. This is the size of the packet that each client can send every 20 ms. As the number of clients increase the size of the packet—and the associated voice quality—drops dramatically. For a 64 Kbps voice quality, an 802.11a radio can support around 55 clients, in the depicted embodiment.

The point is that, regardless of the type of service radio selected, the maximum clients that can be supported per radio are around 50. That implies that in the case of the chain 040-050-060 shown in the embodiment of FIG. 6, the total number of VOIP clients to be supported by the backhaul would be around 150. Since the radio cannot support more than 50, other steps must be taken so that the relay/backhaul radios are not the bottleneck.

The inefficiencies of transmitting voice packets are largely due to their small size and frequency of transmission. The Radio protocol commonly employed is CSMA/CA based (Collision Sense Multiple Access/Collision Avoidance) and it becomes increasingly inefficient as the size of the packet reduces. The challenge, therefore, is to container-ize the packets so voice packets become part of large container (for more efficient transportation) but at the same time not delay sending the packets in order to "fill" the container.

As an analogy, the bus can wait a little while longer at a bus station or stop to pick up more passengers but if it waits too long, it will miss its scheduled arrival that the next stop—to the chagrin of passengers expects to disembark there.

Figure 12:
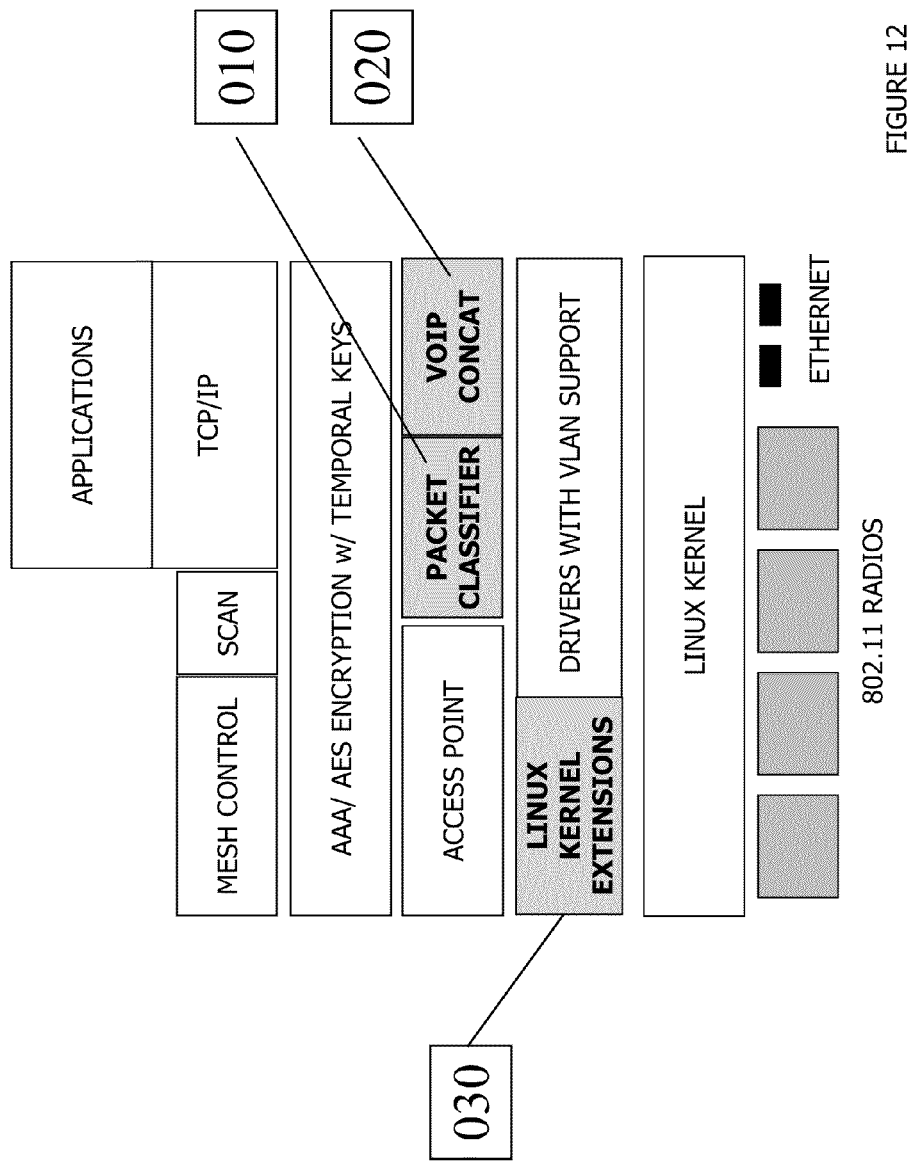
FIG. 12 shows extensions developed and implemented in the mesh network stack to provide an efficient backhaul for voice. The small voice packets are concatenated into larger packets and sent (as one packet) at regular intervals to the backhaul radios. At each mesh node voice packets intended for that destination are removed and the rest sent back (as one large packet).

FIG. 12 shows extensions developed and implemented in the mesh network stack to provide an efficient—yet time sensitive—backhaul for voice. The small voice packets are concatenated into larger packets and sent (as one packet) at regular intervals to the backhaul radios. At each mesh node voice packets intended for that destination are removed and the rest sent back (as one large packet). The real time extensions (030) ensure that the delivery is made according to regular intervals—regardless of what else the operating system is doing at the time. Salient portions include the Packet classifier (labeled 010) that recognizes voice packets based on size and regularity of transmissions, the VOIP concatenation engine (labeled 020) that "container-izes" small voice packets into a larger "container" packet for more efficient transportation, Real time extensions (labeled 030) to the Linux kernel enable the system to provide near real time performance regarding sending and receiving the latency sensitive VOIP container packets through the network—regardless of what the Operating System is doing at the time.

Hybrid Mesh Networks.

One-radio mesh networking solutions are inferior to multiple radio solutions in multi-hop situations. In the case of one radio systems available bandwidth is reduced by 50% with each hop: the bandwidth available at the 3rd hop is ⅛ of the available capacity. Conversely, two-radio infrastructure mesh solutions are ideal for multi-hop situations—with no restrictions on the number of hops. They are also more reliable since the AP is intended to be stationary and therefore provide dependable service in its coverage area. But they are not intended for peer-to-peer connectivity in standard 802.11 modes of operation. In standard 802.11, radios are either configured to act as an AP, a STA or in ad hoc mode.

Mission critical applications (e.g. emergency response) need high bandwidth—regardless of how many hops you are away from the backbone- to be able to use high bandwidth applications on multiple client devices simultaneously, with multiple first responders downloading maps or uploading video. They must also be assured of connectivity at all times—every node must be able to route traffic to all other nodes in the network.

Infrastructure Backhaul Addresses Robust Connectivity.

Infrastructure backhaul is also needed to support (single radio) ad-hoc mesh networking. In FIG. 13, the ad hoc wireless link between E2 and E3 has been lost due, say, to excessive distance or an intervening obstruction—typical of dynamic, uncertain or hostile environments. With no two-radio backhaul support, Nodes E2 and E3 are stranded, that is, they have no way of communicating with the other mobile radio units, at least in ad-hoc mode. The 2-radio backhaul link now becomes their lifeline. Two-radio portable backhauls are thus essential in emergency response systems where the team may be scattered over large areas, and yet not made up of a very high number of actual devices.

A single radio ad hoc mesh is not always sufficient, since all E nodes are intended to be mobile, their movement cannot be restricted to operate within coverage from another E unit. Further, redundant routing configurations (E7-E8-E9) cannot be assured, and the string of pearls pattern (E3-E4-E5-E6-E7) is too tenuous a connectivity chain for mission critical applications.

Hybrid mesh topologies are for situations where one radio mobile ad hoc network connectivity (for peer-to-peer connectivity) combined with two radio infrastructure backhaul support provides the best of both worlds: ubiquitous connectivity with multiple levels of redundancy. In one embodiment, to simplify production issues, the two-radio portable backhaul and mobile units can be the same hardware but dynamically configured to operate differently.

The backhaul radios can be dynamically configured to have one radio in AP mode and the other is STA mode. The two-radio mobile units are configured to have one radio in STA mode (to talk to the backhaul) with another radio in ad hoc mode to talk with peers. Either unit can fill in for the other—changes are software based and dynamically configurable. This favors economies of scale—the same hardware services both peer-to-peer and infrastructure requirements. Also, in the general case, most nodes would be of the two-radio configuration shown in FIG. 4. In the event the node reaches the edge of a network and has to support ad hoc mesh (E1-E2-E3-E4) it dynamically reconfigures itself to become a Hybrid node, in one embodiment. Thus Node E1 could have been a two-radio unit but it would dynamically reconfigure itself to support the connectivity requirements of E2 that has been stranded because of a broken link with E3 (label 060, FIG. 13).

FIG. 14 is an application of the Hybrid Mesh concept to Public Safety. The node labeled 010 is a Stationary node on top of a light pole. A mobile version shown as labeled 020 is entering the building (arrow). These mobile units are also called "breadcrumb" routers. The Mobile Mesh nodes provide connectivity to two-radio portable units worn by the firefighters in this picture. All firefighters are thus connected to themselves through a peer-to-peer mesh network shown as a thin line. They are also connected to the infrastructure mesh backhaul through one or more connect points, in one embodiment. This ensures redundancy in network connectivity. The broken link (labeled 060, FIG. 13) is avoided. FIG. 15 is a similar application of the Hybrid Mesh concept but related to an embodiment applied in Battle Force Protection.

Mobility Extensions for Moving Mesh Nodes.

An enhancement to the three-radio module is to add a fourth radio as a scanning radio. The scanning radio monitors the environment and the other radios on the mesh node to ensure that the radio-antenna subsystems are functioning correctly. They also monitor the performance of neighboring mesh nodes and when a node malfunctions, scanning radios provide diagnostic information to the Network Management System (NMS).

Recall that in the Two-Logical Radio concept, all radios are operating on non-interfering frequencies to preserve bandwidth (see FIGS. 2, 3) and thus cannot monitor each other. An external scanning radio is also needed to gauge the signal strength of a prospective parent node before the backhaul/relay path can decide that that node could provide better service. In one embodiment, the load level determines whether the scanning radio is used. In lightly loaded situations, the radios can perform this scanning themselves with no loss in performance. In heavily loaded situations or in the event of a disaster, scanning would result in loss in performance.

In an embodiment without a separate scanning radio, the NMS and adjoining nodes still know when a node goes down because control system heartbeats (sent on one channel and re-transmitted on another by a parent node) are not received. However only an external sensing radio can determine if there has been a mechanical failure—as a break in the cable. In the event of such malfunctions, scanning radios can dynamically reconfigure themselves to assume the functionality of the damaged unit. In short, scanning radios mesh form "buddy" relationships (as in police teams) to monitor and "cover" each other. Scanning radios are critical in dynamic environments—where mesh nodes are mounted on cars and the mesh topology is rapidly changing. These include public safety and battlefield scenarios.

Additionally scanning radios can provide information on client movement. If two mesh nodes are both in the vicinity of a moving client radio, then scanning radios on both nodes will pick up signals from the moving client radio. Now, as the client moves, its signal strength as received by one scanning radio will differ from that received by another. Based on the vector of motion, one mesh node will be better suited to servicing the client and a hand off from one mesh node to another may now be initiated in a proactive manner. Without the scanning radio, the hand off will still occur—but it will be because the client has lost connectivity and has to scan to find another mesh node to connect to. With some software on the client this break in connectivity may be avoided by informing the client when to switch to the next node. For a short while packets for the client will be sent to both nodes. Once the client shifts to the new node, the old node is informed. It then ceases to send packets and updates its routing table to delete the entry of the client as one of its clients.

Field Upgradeable Modular Design.

A key advantage of the embodiments described herein and radio and protocol agnostic approach is that additional physical radios can be added to the system easily. The mesh control software emulates multiple port bridges and supports multiple input and output interfaces. There are no software limitations on the number of service radios or the number of backhaul radios supported. This ensures a cost effective long-term migration strategy supporting needs for more performance later.

FIG. 16 shows a production version of the two-logical radio system with support for up to four physical radios that can support a variety of configurations in a modular fashion, in one embodiment. One radio is mounted (Label 010). There are a total of four such slots, two on top, two on the bottom. There are also two Ethernet ports (Label 020) with Power over Ethernet on one. Radios connect to one of 4 N-Female antenna connections (labeled 030).

FIG. 17 depicts some of the configurations possible in an embodiment with a four physical radio unit such as shown in FIG. 16. Based on the number of radio slots occupied, the system automatically configures itself to be a Two-Radio (FIG. 5), Three-Radio (FIG. 6) or a Full Duplex Backhaul (FIG. 7). The system is extensible. Through the Ethernet port, another four radio modular units may be added. Label 010 refers to the two-radio configuration shown in FIG. 5. The label 020 refers to the three-radio shown in FIG. 6. Label 030 refers to an extension of the three-radio system and discussed in more detail in this application. Label 040 refers to the Full Duplex four Radio system also shown in FIG. 7.

Theft Protection of Mesh Nodes

Mesh nodes are mounted in public spaces and open air locations; there must be means to dissuade theft. Theft is effectively controlled if the software on the mesh node cannot be copied and used on another mesh node. For that, the software running on the mesh node needs to have some unique, (copy proof) feature.

FIG. 18 shows the process developed and implemented for generating software tagged to the current radios and board characteristics. It shows a serial line connected to load the boot loader program, after which the Ethernet port is used to complete the software installation and branding process. Compiling the install program on the board it is intended to run on does this, thus creating a unique software image.

FIG. 19 is a screen dump of the Flash Deployment software developed and implemented to ensure that software generated for the install of this board cannot be used by another mesh node. When the software installation process begins, the software is compiled on the board it is intended for and the compilation process is unique since it is based on a number of unique factors. The software is generated on the board—that it is intended to run on—to ensure that the software image cannot be used to run on another board, thus preventing both software privacy and dissuading theft of the mesh nodes.

Chirp Device Extensions

Raison D'être for Chirp/Pollen Networks

This section is an elaboration of methods taught in earlier applications, including applications discussing the two-logical radio concept, VoIP data containerization, and software management. Specifically, the following concepts are applied in the embodiments discussed herein:

1. N Logical, Physical device abstracted wireless transceivers, FIGS. 7-9, 13-17, 22

2. The wire-less Radio and Protocol Agnostic Mesh Control Layer, FIG. 20.

3. Bridging across Wireless communications media, FIGS. 9, 22.

4. The scalability of tree based logical network and mesh architectures, FIGS. 4-8, 24-26.

5. Efficient use of wireless bandwidth by sending bulk or containerized packets, FIGS. 10-12. 24-25

6. Community mail boxes for intermittent connectivity (e.g. Emergency Response, Ser. No. 11/084,330)

Figure 1:
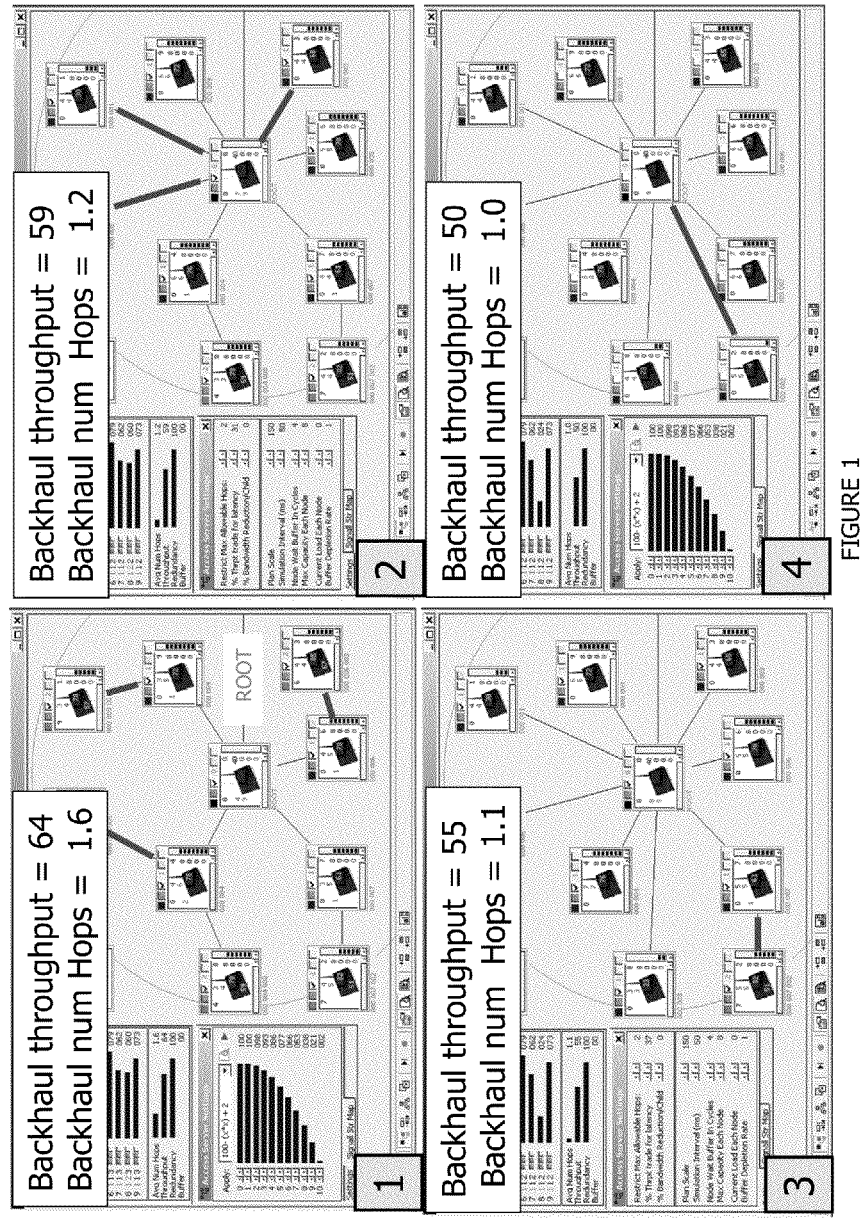
FIG. 1 illustrates how the network topology is changed by selecting a different backhaul in a two-radio system, with one link to the backhaul AP and the other link servicing the child AP. It depicts four network topologies. Each of the four network topologies provides a different set of performance in terms of latency and throughput. The mesh control software adjusts the latency and throughput parameters to meet voice/ video or data performance requirements in terms of latency and bandwidth.

7. Dynamic Mesh Topologies based on Aggregate Latency/Throughput tradeoffs (FIG. 1)

This section applies those methods to transport "chirp" broadcasts akin to VoIP packets from "chirp" device networks to co-existent and incumbent IP based network devices and protocols.

Why Chirp Protocols are Needed.

Traditional networking protocols/techniques, and specifically IP-based protocols, originated from sender-oriented communications. They emulated legacy frameworks of human-human networks to support human-to-human correspondence. Thus the methods of routing postal mail resulted in email. Emails are sender oriented. Sender oriented communications are intended to be read by stated intended recipients only. It is not lightweight: it contains destination addresses and encryption so they are not tampered by hackers. They were historically point to point communications.

With all this overhead in place, on every packet basis, IP based Routing protocols favor economies of scale in moving large packets, preferably with best effort only. When QoS is required (latency/jitter/assured delivery) IP protocols extract a premium. Small packets are also charged a premium because the "standard" minimum packet size was not designed with them in mind. Traveling inside the minimum size, they have to pay the same price in transmission time and bandwidth requirements as the "standard" minimum.

This adversely affects the delivery schedule: of lightweight packets (e.g. VOIP) that now travel no faster than large packets, through no fault of theirs, other being smaller than the standard packet size. Hence container based transport for VOIP, FIGS. 10-12 and discussed in earlier applications. Filling the packet container reduces the "price" per VOIP packet and also ensures reliable (assured latency/jitter) delivery. Without containerization, client capacity rapidly deteriorates, FIGS. 10-11. The IP highway is not suited for short chirp like devices, whether they are VOIP packets or other types of small-payload transmissions.

In addition to favoring larger packet sizes, retries (as in birds chirping repetitively) are frowned upon. Resending large packets increases traffic and TCP/IP overhead costs are based on a low number of retries. Further, retries are discouraged because they may flood the network e.g. broadcast storms. Retries are the exception, not the de facto modus operandi. Hence various forms to "virus" checks on email, file transports etc. Since small packets are treated as one large packet, any device that begins to "chirp" like birds who chirp blindly and repetitively are costly especially when these chirp-like packets are travelling solo, FIGS. 10-11 and hence concatenation FIG. 12.

In contrast with legacy networks, communications that uses retries and over provisioning/broadcast storms are common in Nature. For instance, pollen distribution by plants is not sender oriented. Instead, as many messages are sent as possible, in all directions. Note that these storms (e.g. pollen, monsoons) are seasonal, their time to live functions are encoded in their design. They do not have to be explicitly stated in each packet header. Pollen has its time-to-live function genetically encoded in it. Beyond that time it is ineffective. No network flooding can occur, despite over provisioning.

Further, Nature's "packets" are receiver oriented. Pollen is promiscuously propagated, witness the temporary broadcast storms called allergy season. It is the receiver that has the (genetically encoded) secret handshake to unlock the pollen packet data. Sender data need not be encrypted.

In Nature, receiver oriented security enables pollen to be lightweight (terse) and carried far by even small low power winds. Further, pollen is reasonably patient or latency indifferent. As long as winds appear within pollen season, spring will occur. Light weight chirps/pollen are thus secure and lower Total Cost of Ownership (TCO) based on their lightness and "patience."

In the world of Internet of Things (IoT), there is a need to be able to support lightweight chirp-like data without unduly taxing either the incumbent IP based networking protocols or the "chirp" device. This network protocol would support economical and effective transport of small, terse, repetitive "chirps.". In many cases the chirps are latency indifferent. Further, they would allow varieties of subscriber driven (receiver oriented) temporary broadcast storms without adverse effects, Collaborative Coexistence is key since some chirp packets have subscribers reachable only through the incumbent IP network, e.g. VOIP chirp-like packets for an overseas subscriber. These networks and protocols must also conform to the existing frameworks and mediation layers e.g. FIGS. 12, 20.

Further, if chirp devices intend to operate in the same frequency spectrum as IP devices, then both dance partners need to share the dance floor without constantly stubbing each others toes (e.g. collision → causing interference → some causing retries → possibly network flooding). Coexistence requires chirp devices not habitually create collisions or accidents on the IP based highways, like bad drivers. Methods taught with legacy chirp like devices (VOIP) are described in Ser. Nos. 11/266,884 and 11/084,330, see FIGS. 10-12, 24-25. These methods ensure both types of transmission dance well together.

In general, IP based routing services require customers to choose their "value" between extremes:

1. Guarantee of Delivery vs. Best effort (lower cost)
2. Maximum acceptable Latency (pay more for low latency)
3. Maximum acceptable Jitter
4. Cost tradeoffs between Throughput and Latency (see Fig and Appendix A)
5. Level of usage: unlimited versus bandwidth throttled (adversely affects latency)

On IP networks, the lowest cost is bulk mailing, latency indifferent traffic. Since pollen is reasonably latency indifferent, it makes sense to send bulk mailings. FIGS. 10-12 teach methods related to which packets need to leave on which bus and how often those buses need to visit the bus station (polling frequency). FIG. 24-25 focus on what would be the best times for pollen to "arrive" at the bus station or other "wind" transport for onward routing.

Collaborative Coexistence with IP Devices

As the name suggests, "Chirps" are short duration and terse commands/status messages, primarily for machine to machine ("M2M") communications. Contention is low because the Chirps are short bursts, by design.

Chirps are primarily intended for machine to machine communications (M2M), in home, factory or outdoor enterprise networks. M2M communications are purpose built and terse. Chirps from a TV remote to a TV, for example, has a limited but adequate word vocabulary to be able to control the complicated communications sources used by the television to change channels.

Using diverse wireless media (e.g. sonar, audio, Wi-Fi) reduces "channel" interference between concurrently active multiple radios, FIG. 6-9, 13-15, 22-23. However core issues of dynamic channel interference remain: there are still limits to the number of available "channels" despite extending the usable channel list. The challenges addressed by previous work, still remain real and relevant.

There is a need to devise means for coexistent, preferably non-interfering, independent and alternate communication devices/protocols that operate in the same frequency spectrum but with minimal interference with existing, incumbent and/or "standard" protocols.

IP based devices operate on CSMA/CA protocols. Using random back off, radios "sense" collisions and, in decentralized manner, avoid collisions. As an analogy, there can still be two or more people talking at the same time but it is minimized because most people are being polite and waiting their turn. In the event a packet did not go through, it is retried but this is the exception not the rule. The protocol is robust, scalable and ubiquitous for IP based wired and wire-less traffic. Thus an "agile" and "polite" competent networking protocol already exists.

Listening and avoiding interference in proactive manner is also referred to as "agile" and/or "polite" systems. Agile is analogous to one dance partner compensating for the (random) clumsiness of the other. Polite refers to listening and then avoiding interrupting others (collisions) in conversations.

Chirp devices and protocols leverage this politeness/agility to coexist. If Chirp durations are very small, many that occur during IP protocol enforced silent periods have no adverse effect. In one embodiment, the chirp devices employ the silent period to transmit the messages to the external network in a polite manner. Further, chirps transmitted at the same time as active radios, may also not significantly affect IP based traffic—provided they are so short that radios can adaptively manage the chirps as noise.

Low cost chirp devices can be very simple, in one embodiment. Some simple chirp device, like birds, chirp "blindly," with no consideration or verification of whether the chirps are heard or not. Multiple such blindly chirping devices can be chirping at the same time, resulting in retries and interference. These (repetitive) deadly embraces are avoided by randomly scheduling "blind" chirps by the device transceivers. This is a simple fix, used in one embodiment. More sophisticated chirp devices, with listen/see capability are directed by the chirp router embodiments to select transmission times and channels, see embodiments in FIGS. 22-23. Advanced chirp-aware devices and routers, with chirp equivalent of scanning radios, as shown in FIG. 17 are sufficiently agile and polite and choose appropriate channels and/or schedule themselves to avoid or cluster with other concurrent transmitters and also to optimize the short chirps with other transmissions within the system, such as the transmissions to the external IP based network.

Further, Ser. No. 11/266,884 teaches methods so custom VOIP phones and advanced chirp inside (chirp aware) device equivalents, which schedule their chirps to avoid collisions with each other and downstream bulk broadcasts from the AP, as shown in the embodiment of FIG. 24. Chirp aware devices are capable, therefore, of being agile and polite within the network environment or on the dance floor. Instead of random blind chirps, these proactive devices are listening and timing transmissions to be collision free with bulk transmissions back from the bridge router, FIG. 23, or other, collaborating chirp inside devices (e.g. TV, camera etc), FIG. 22. Collaborative ant like agents schedule small chirps to avoid each other or to cluster in dynamic alignment with resource stacks taught in Ser. No. 13/571,294.

In general, the combination of short duration and random transmission may suffice in this un-orchestrated and decentralized framework, as in a park, with multiple birds, all chirping blindly.

Note this is "blind" randomness—there is no sensing component in the device. Hence it is not entirely fool proof. But, neither is CSMA/CA—e.g. "hidden node" problems. Further, not all chirp devices need be blind. Some capable of "listening" may adaptively time their broadcast per methods taught in application Ser. No. 11/266,884 and FIGS. 24-25.

In one embodiment, it is possible for IP protocol based wireless transceivers operate in the same frequency domains as chirp devices. For Wi-Fi radios, for example, these chirps are treated as random and transient noise. It is adaptively filtered out using Automatic Gain Control, Error Correction, Noise cancellation, and other methods, while the Wi-Fi radios are sending messages other than chirp communications.

As more chirp devices join the network, their random chirps are like white noise for the IP based wire-less or wired transceivers. These adaptive IP transceivers adjust. It is their modus operandi.

Such wired and wireless agile and polite transceivers are currently commodity items, supported by Apple, Atheros, Broadcom, Cisco, GE, Google, Intel, Motorola, Samsung, Sony, Qualcomm, etc. Chirp protocols require no modifications to existing de facto standards wire-less (IP based) devices. At the worst case, one or two IP based packets may be retried, but IP throughput is not appreciably affected. It is certainly no less affected than having a nearby Access Point (AP) producing channel interference. This is because chirp transmissions are short, by design. Thus, short random chirps, are inherently capable of coexisting with legacy incumbent wire-less (or wired) transmission protocols.

Further, Chirps are small and repetitive, analogous to small VOIP packets. IP favors larger packet sizes, see FIGS. 7-9 that are repeated/retried only when essential (e.g. TCP/IP retry request). Like VOIP packets, chirp packets will be repackaged for bulk transmission when bridged from Chirp networks to IP networks, FIG. 22-23. Small Chirp packets, like small VOIP packets, will be routed/distributed efficiently using pruned broadcasting methods as described in Ser. Nos. 12/352,457 and 11/266,884. In one embodiment, Chirps transmitted to IP based networks are containerized and under router management: they cannot individually create broadcast storms.

FIGS. 14-17 depict embodiments using interference agile, scalable wireless mesh networks using Wi-Fi transceivers ("radios") and IP based protocol. FIG. 9 depicts bridging across multiple wireless networks operating on non-interfering frequency bands and/or protocols (e.g. Wi-Fi, Wimax, VOIP). FIG. 22 indicates bridging to other wireless media on different types of frequency bands (e.g. infrared, Wi-Fi). Other wireless media include any form of electromagnetic communication, such as sonar, audio, light flashes. The Mesh Control layer, shown in FIG. 20, is common to all.

Note that the mesh control layer provides "radio" and "protocol" agnostic mediation. These words were not restricted to either Wi-Fi radios or IP protocols, as indicated above.

In one embodiment, the system provides a common mediation layer for all disparate forms of mesh networks that are bridged together to form one logical meshed and scalable network topology, FIG. 22. Only then can a logical mesh network exist, across multiple frequency and protocol domains. The wire-less radio and protocol agnostic mesh control layer (FIG. 20) includes mesh networks different from IP based protocols as shown in FIG. 9. A new protocol is "chirp" based. It is specifically designed to minimize interference with existent and incumbent network protocols. The mediation layer supports it, in one embodiment.

The mediation layer and the logical radio concept are interrelated. In FIG. 7-8, two radios are shown, for backhaul, which together form one logical radio. That logical radio connects to another logical radio, also consisting of corresponding physical radios, see FIGS. 7-8. Note the chirp-like devices (such as VOIP) are not sharing their physical radio with other devices. Thus, in the logical radio concept, both chirp-like devices and others are supported, in radio and protocol agnostic fashion. Thus the embodiment shown in FIG. 22 corresponds to FIG. 9, and the disclosure of application Ser. No. 11/084,330.

With the mediation layer in place, chirps may be efficiently and reliably transported up/down the (bridged) logical network tree, comprising of both IP and chirp networks, see FIG. 22.

Chirp Scheduled Bus Service

Methods, taught previously, enable chirp broadcasts from chirp device networks to be efficiently repackaged to travel on existent and incumbent prior art IP based Network devices and protocols.

Further efficiencies are possible by engineering the broadcast "beam" direction and spread angle.

Nature uses undirected beams—as in no preferred direction. That covers a wide region. Less pollen directed to the intended recipients would represent a more directed and smaller "market" focus.

Two embodiments featuring different options exist. On the one extreme, scatter shot (undirected) seasonal broadcast storms are prevalent in Nature and tolerated because they are temporary (seasonal), they are necessary (for the flow of nature), and they are robust. (because they are over provisioned).

A temporary broadcast storm, despite the unwanted effects of allergy season, is tolerated. It is the only time-proven method of ensuring sufficient pollen is "heard" in Nature's chaos based ecosystem. The storm is intentional and over provisioned but effective. It is undirected, so it covers all bases.

Pollen is lightweight. That works in its favor. Small gusts of wind appearing randomly move it along. It may need multiple gusts of wind, like multiple relay hops in a mesh network. Nature does not know where 'subscribers" are. Scatter shot approaches cover large unknown subscriber regions.

When you do know your subscriber base, directed winds of chirps/pollen is more efficient. But chirps are light weight and receiver oriented. They do not have destination addresses. Like school children boarding a school bus, they must be directed to get on the "yellow" bus/wind. In one embodiment, at each bus stop along the way, they need to be told which next bus to board. The edge router FIG. 12, 23, manages bus arrival and departure times and also getting the chirp/pollen bulk containerized and ready for each bus trip. Where containers go is driven by the "clients": it is directing pollen to interested parties only. This is a more directed beam vs. scatter shot. The yellow bus routes mark pockets of subscriber interests.

Using the combination of VOIP like containerization and collaborative scheduling, pollen/chirps are delivered to the subscribers interested in them/waiting for them, in a timely manner. The chirp routers manage pollen/chirps getting on the correct "yellow" buses and bus departure schedules etc.

Buses leave at regular intervals to help schedule when a container of chirps arrives and leaves at each bus station. They are a part of the mesh network support infrastructure for chirp travel. Their frequency of arrival is driven by the polling frequency (e.g. 20 ms for VOIP phones). It will vary depending on the chirp device nature and urgency per methods taught previously, FIGS. 12, 24-25. Scanning and polling frequency is adaptive, per methods taught for mobile nodes, Ser. No. 11/818,899.

Additionally, subscribers, in one embodiment, awaiting specific pollen delivery, may also request sooner or later delivery. Pollen bus drivers (the routers) schedule bus size and frequency of departure (polling), as well as time spent waiting for data to collect (minimum queue), and other variables in certain embodiments. Collaborative scheduling agents, in some embodiments, ensure global supply chain alignment of supply/demand using simple concepts like "avoid" and "cluster" to ensure appropriate use of bandwidth resources and prevent "stacking". Ser. No. 13/571,294 et al. teaches scheduling collaborative agents in control systems.

Thus, QoS equivalent services are dynamically managed in a receiver oriented network. This is a departure from Prior Art, when sender oriented IP packets must declare their QoS requirements a priori, and QoS requirements are blindly enforced along the network path at significant added cost.

Subscribers are stationary and mobile. Mobile intermittent connectivity (not "always-on") is supported, FIGS. 27-28. Hence routing for the containers is a moving target. In some cases, like mobile phones, the client is currently unavailable and messages are delivered to a trusted community mailbox. In other cases, the client may request temporary mail holds or re-directs, as in when people relocate or move residence. Chirp routers are made aware of updated subscriber locations, by secure authenticated means, in one embodiment. They maintain a community mail box and support addresses for otherwise anonymous but authenticated subscribers. Thus chirp routers serve as post offices, part of a meshed postal service network infrastructure, with coexisting IP and Chirp publishers and subscribers, see FIG. 22.

In addition to routing, providing mail boxes, holding and forwarding mail, chirp routers may also be requested to manage a family of devices. For example, in one embodiment, all kitchen appliances must send their chirps to the kitchen router, which is a night light in one embodiment. The kitchen router is authenticated to communicate with a smart phone using IP based networks in one example. When new devices are added to the kitchen community, the smart phone is informed by the router/nightlight which processes chirps incoming from the new devices. Thus, if needed, there is a human in the loop authorizing device "pairing" with the router. Further, if settings on the device need changing, then it is only night lights and their fellow routers that can provide the best non interfering channels to use, since only they know which channels they are using, to avoid conflicts with other routers operating on different channels but sharing the frequency bands. Further devices that are roaming within the chirp or IP local network are automatically pre-authenticated. Methods that were taught in Ser. No. 12/352,457, for VOIP self-forming networks are used in one embodiment of this invention.

Chirp routers perform these routing based services based on chirp signatures, described herein. These routers recognize chirp "colors"/signatures. Also, they know where (authenticated) subscriber destinations are. Hence, only they have the means to connect the two pieces of data and to direct chirp/pollen containers to authorized consumers and/or their agents/mail boxes. The polling frequency and dwell times are adaptively controlled. Also see Chirp Capable Routers.

Subscriber Based Winds (of Change)

Multiple options exist between the two extremes styles of broadcast e.g. scattered vs. directed. From the perspective of device transceiver firmware, the product and its target market drives device vocabulary and device transceiver competence.

Dynamic Blobs of Interest/Trends.

In a receiver oriented world, pollen/chirp "publishers" are directed to "subscribers" with potential broad interests in multiple types of pollen/chirps. In the trivial case these interests maps to multiple individual active subscribers IP mail box addresses. Efficient, pruned broadcasting taught in Ser. Nos. 11/266,884 and 11/084,330, addresses those specific needs. In the less trivial case, the "destination" address is a movable target, both literally and figuratively.

In the literal sense, mobile mesh networks are needed to support mobile clients, see FIGS. 13-16, where the soldiers and firefighters now carry chirp devices. Chirps are consumed within the Chirp network and "outside" by bridging, as per the embodiment in FIG. 22. Publishers and subscribers may both be mobile.

In the figurative sense, communications are a movable target because of dynamic consumer needs. Demographics of the communication network, comprising of both human and machines, is in flux at all times, as shown in the embodiments of FIGS. 13-16 and FIG. 26. Thus the "winds" and yellow buses being engineered by edge routers embodiments FIG. 23, to move pollen/chirps efficiently, are also in flux. A distributed control system monitors the environment, in one embodiment.

Dynamic Load Balancing taught in Ser. No. 10/434,948 included switching data paths to less congested parent nodes. This in effect also changed mesh topology. This was needed because latency and throughput tradeoffs were being made. In the event that the traffic is (reasonably) latency indifferent, store and forward community mail boxes provide some relief to the deluge bound to a congested node in transient congestion situations. Thus, through the heart beat (Appendix A), node congestion levels may be communicated to adjacent "buddy" nodes, who then "hold the mail" until toll costs are lower, see Appendix A.

In other cases subscribers may request redirection. For example, chirps from all Sony TVs in San Francisco, received between 8 am and 9 am today have been containerized. They are scheduled to be sent to a customer service center in Japan. The largest subscriber "blob" is in Japan. However, network connectivity is interrupted due to a natural disaster which has hit Japan. Those containers now need to be routed to the Customer service center in India.

One may argue that this is already handled—the Japanese Service center simply has to redirect all traffic to its "buddy" counterparts in India (as part of fail-over "buddy" system policies). Buddy systems may work for policemen, but not global supply chains. A simple redirect is not always possible. Enterprise global supply chains have multiple layers to their collaboration, as discussed in FIG. 26 and Ser. No. 13/571, 294. There are many "redirects" that need to be plugged in but they are dynamic. Supply chain topologies are increasingly more dynamic. There are no fixed corresponding failover sites for every element within the supply chain. There are also many level/tiers of suppliers and consumers. Likewise, devices themselves are more complex. A machine may chirp multiple messages, involving diverse service requests. In one embodiment, the present system determines who should get these requests, and does so on the basis of several variables—it is situation dependent. There are associated costs with different options. Finally, the device or machine has an owner with his preferences and overrides. One-to-one correspondence systems are too simplistic.

Rather than build complex buddy/failover systems, the receiver oriented approach presents is a simple solution—chirps or pollen is simply redirected at each bus station/router. The chirp routers and the control system stays aligned with shifts in subscriber needs. In this embodiment, dynamic publish subscribe is scalable. For example, radio stations have no upper limit on subscribers.

Supporting Big Data Trends:

Subscriber driven "winds of change" are engineered and coordinated: convoys of buses, carrying bulk pollen and their engineered clones, thus concurrently supporting multiple subscriber requests. They are like VOIP packets bound for multiple destination phones, like walkie-talkie phones. One publisher is simultaneously received by all listeners. Thus pollen and clones of them, expressly created to cover multiple consumers, board multiple buses, on different schedules and routes. The chirp routers engineer these winds and collaboratively manage their flow.

Dynamic Destination Addressing:

In one embodiment there are "default" destination directions for pollen of specific signature types and which types of bus are designated to carry them to half-way houses at each bus stop. This is the equivalent of bus station transit hubs. Here, pollen transport is rescheduled and redirected, with community mail boxes acting as temporary buffers, if needed for performance or connectivity issues. Note that this is form of rerouting is on a need to know basis, in one embodiment. The sending router only knows enough to send the school children to first bus station address. It may not have knowledge of final destinations, which may be dynamic. The hierarchical architecture is similar to a post office hierarchy (county, city, country are the hub levels), but unlike the post office, the direction or "default" address does not convert the communication into addressed and sender-oriented transmissions. The mailing address is being inspected and changed, based on the current situation at each router/bus station, a departure from the prior art.

In one embodiment, using the bus stations as decision points breaks up routing decision to hops between logistics hubs. The current active subscriber demographics and demand may be reevaluated at these hub points. Re-routing may be needed. For example, in one embodiment, routing policies may be specified. One "policy" is in place that all GE refrigerators provide a daily health status short "chirp" "color" (e.g. red, orange, blue, purple) forwarded to GE appliance service centers/subscribers. There are four such appliance region centers e.g. North, South, East and West. Based on the chirp signature and device location, directives running in edge routers "know" which bus load this pollen/chirp has to be part of There may be multiple subscribers so it also needs to track and route multiple concurrent buses to multiple subscriber locations. Further, at each bus stop, at each mesh node, the routers must "know" enough to "sort" pollen, at varied levels of granularity for most effective onward directions. All of this is simplified by using logistics hubs.

In one embodiment, packages are bulk shipped to one central logistics hub, which manages the dispatches to other logistic centers. If packets need to be cloned to support multiple subscribers, they are, at forks along the path, in this embodiment. Further, VOIP like chirp packet cloning is managed by the router on a need basis, where forks occur—e.g. the container was traveling north, now is split into eastward and westward "half" containers and combined with other fellow "half" eastward and westward bound containers to form a more efficient whole container. Some chirp packets are cloned because it has both east and west subscribers. Thus, efficient repackaging and pruning of routing paths, as described in FIGS. 12, 24-25 and 27-28 address multiple scenarios including mobile devices, temporal mesh network clusters and VOIP like schedulable periodicity.

These embodiments are different from the prior art post office approach that manages IP packet routing. This routing circumvents the static address schemes used in traditional mail and email routing. It incorporates support for dynamic winds of change at each stop along the route.

In these embodiments, the destination of the bus is dynamic and so is its routing path. This is analogous to not just changing bus routing (e.g. an accident) but also end destination (e.g. hospital) based on the current situation and nature of containerized load. If the load is no longer needed, it is discarded mid journey. Round tripping, caused by static destination addresses, is avoided. Further Cloning at forking junctions ensures concurrent, low latency deliveries. The schedules for convoys of buses are adaptively managed by collaborative scheduling agents see Ser. No. 13/571,294 et al.

Further, like school children, some pollen may only board secure "yellow" buses. At each routing point, like bus logistic hubs, the containerized chirp packets, or passengers, like VOIP packets, are steered in the right directions, as part of the bulking/routing process. Thus, the process automatically ensures that birds of the same feather flock together. The hubs are like bus stops, but the bus schedules are demand driven and the packing of the bus based on current subscriber demands.

The demand and supply is thus in dynamic alignment, despite the inherent "change" in the system.

Creating and Managing Broadcast Storms

Winds, in nature are seemingly undirected broadcast storms. As in nature, seasonal, undirected and sporadic broadcasts are tolerable if time-to-live functions are adaptively managed at the control system level. This is more than just preset time-to-live or maximum hop count values instilled in IP packet header data. Macro level system control is needed so broadcast storms cannot perpetuate.

Hence virus and spam filtering software for email services. The control system should monitor and modulate "decay" function and its PID control parameters and make changes to network topology accordingly, see FIG. 1. An embodiment of the invention has implemented inherent Distributed Decay Functions that include time-to-live, heartbeat sequences, max number of relay hops, stop at "root" nodes etc. PID parameters and mesh topology change dynamically, to ensure network scalability and stability.

Buses are scheduled departures. Winds are a more amorphous concept. They are closer to broad agency announcement to address an Emergency Response involving sharing of diverse resources e.g. Joint Armed Forces embarking on a common mission. Convoys of chirp buses emanating from multiple locations are merging, dispersing and coalescing, driven by both publisher type and subscriber demands. They are generally directed to a concentrated location (e.g. New Orleans post Hurricane Katrina). Note that multiple such "Hurricanes" can be occurring concurrently. Clustering and dispersal in mobile mesh networks was taught in Ser. No. 11/818,899, FIGS. 27-28.

In one embodiment, known subscriber requests are handled by scheduled deliveries, with varying level of urgency, latency, QoS etc. Winds serve a different purpose. They provide the capability to support coordinated efforts in sharing communication. One of many lessons learnt in New Orleans was the inability to get different agency wireless devices to "talk" with one another. Winds address this.

An example is called for at this point. The wireless communication devices used by different agencies use different protocols and security. Information flow from entity A to entity B needed to go up to a common point C, be decoded, interpreted and then encoded again for B to receive it. For example, in the embodiment shown in FIG. 27, contiguous devices 518, 519 cannot communicate via mesh node 510. They need to send their messages all the way to the top, the SIP server, see 514. This is untenable. It is worse when the devices are on different networks. "Round Tripping" from Device A to its root node equivalents then to Device B via its root node equivalents is expensive and results in latency/jitter.

Multiple solutions have been proposed involving secure middleware for interpretation of data from sender/publisher A and repackaging it for consumption by receiver/subscriber B. Then Machine to Machine (M2M) translation occurs closer to the devices. But IP packet security is of concern Chirp routers have access to the link that connects Chirp/pollen publishers to their subscribers. As explained, since chirp device naming is not unique, like IP addresses, only chirp routers know how to provide the routing needed. The system described in these embodiments is inherently secure. There is but a single point to secure in these embodiments—the chirp router mapping/routing table must be protected from hacking. Routing table access may be reachable via IP only and therefore leverages existing security methods. Chirp routing security is virtually unbreakable, in these embodiments.

Inasmuch as chirp routers are secure in these embodiments, then Interpreters may be safely installed in chirp routers. These are software/hardware/firmware. They can also be cards that fit in either the front or back slots of nightlight embodiments FIG. 22, 26. Event bound inter agency communication is thus supported by these embodiments. The inter-agency communication ends when the interpreter card is removed. Winds and other temporal relationships are now manageable. This is relevant to secure remote diagnostics and repair.

FIG. 27, from Ser. No. 12/352,457, depicts an embodiment using a real time communications network with VOIP phones. It has clear parallels to chirp devices, which send packets of data just as small as VOIP packets. Further hybrid routers are both chirp aware and IP protocol aware and support transceiver slots for both, FIG. 22, in one embodiment.

Such routers may then, with appropriate interpreters installed, provide secure lingua franca capabilities between all types of devices in the network. The routers are capable of real time communication and translation between IP based devices and chirp based devices. The chirp birdsong is now comprehensible to existing IP based system diagnostics and repair tools. No reinvention is needed. Chirp versions of machine independent programming languages like Java and Machine Esperanto will engender Human to Machine interaction as well as M2M communication.

Application specific graphical programming for chirp devices may make it easy to teach chirp devices and/or create new variants, FIG. 31, Light weight OS-less chips, FIG. 30 may be directly loaded on a card, from a USB or SIM slot in computers et al. The card is inserted in the chirp device to activate it. Removing it disables it. Disabling errant devices and/or isolating machine failures and zone management are thus simplified, in some embodiments.

Pollen Signatures

Like birdsong, Chirp signatures define the broad property of the pollen/chirp. They do not have to be unique, just characteristic of a category of "bird," some bird watchers (subscribers) are currently interested in. Chirp signatures provide one piece of the routing puzzle. Chirp routers are aggregate subscriber aware, on a real time basis. This provides the other piece to the puzzle. For example, the chirp router, in one embodiment, includes a data stores of how many (redundancy), how often (frequency) and suitable directions to engineer the buses needed to move current inventory of chirps. Scheduling buses is a collaborative supply and demand logistics exercise with dynamic alignment to prevent stacking, per methods taught in Ser. Nos. 11/266,884, 13/571,294 et al, FIG. 26.

Chirps may be parallel and/or sequential transmissions. They form signature patterns and payload patterns. The signature patterns are needed by the edge routers to categorize the type of pollen/chirp and route it to appropriate subscribers. Subscribers exist on both chirp and IP based networks.

For example, the diesel generators in a community network wish to schedule a mass repair visit. They need to share information. They can certainly send their data to the IP based customer service center in India. However, for each diesel generator that is a round trip from chirp network to service center and back. If instead, an embodiment of the invention is used and the generators are capable to chirping over a meshed chirp network, FIG. 22, then based on chirp signatures, diesel generators can recognize each other and use collaborative agents internally to perform needed scheduling for repairs. This was also discussed in Ser. No. 13/571,294.

Signatures are thus key to both intra-network and inter-network chirp payload propagation and routing, in one embodiment. Further, chirps are also temporarily stored in community mailboxes, in transit in times of congestion or network non-availability. To get a sense of the "demographic" of passengers awaiting transit services, chirp routers inspect signatures and accordingly arrange appropriate transit services (e.g. small bus or convoy of buses).

Using phone audio "chirps" in one embodiment, signatures are a distinctive pattern of ringtones. Each chirp/ringtone is based on multiple variables e.g.:

1. Chirp transmitter type (e.g. infrared, audio, Wi-Fi)
2. Its selected frequency channel
3. Its selected Power level
4. Other parameters specific to transmitter type A two chirp/ringtone signature has two chirps/ringtones in sequence. Each ring tone can include one or more transmitters. Even in the simplest case of on/off power levels, the two chirp signature has four distinct states (0-0, 0-1, 1-0, 1-1). The device is therefore capable of three distinct non trivial (not all zero, or silence) states for each transmitter. ($2^2-1$). In general, the number of possible signature sequences for simple on/off transmitters is ($2^M-1$), where M is the number of ring tones in the sequence. Hence a three ring tone signature sequence has 7 distinct non zero variations ($2^3-1$).

In general, for P total distinct (as seen by receivers) power levels, including the trivial case P=0, M number of chirp sequences, there are ($P^M-1$) non trivial signatures per transceiver. Further, if each chirp also has F frequency channels/tones/chirps to choose from, then the number of distinctive, non trivial, signatures/states per transceiver t are:

$$S_t = (F_t * P_t) - 1)^M \text{ Where:}$$

$S_t$: number of distinct signatures/states for transceiver t $F_t$: number of frequencies/channels/ringtones/light colors available to transceiver pair t $P_t$: Number of distinct (as seen by receiver) power levels available for transceiver pair t M: number of ring tone/chirps in sequence.

In an N-Logical wireless transceiver ("radio") framework, with multiple simultaneously operating transceivers (see FIGS. 7-9), there are a total of $$S_{total} = S_1 * S_2 * S_3 \ldots * S_t$$

Where:

$S_{total}$: Total nontrivial unique signature "tunes available with t active transceiver pairs.

Thus a smart phone ringtone sequence of three, each of which has 10 ringtones can generate $((2*^{10})-1)^3=6859$ unique non trivial signatures/words. Adding another form of radio frequency communication in the system, a smart phone with camera flash, operating simultaneously as a single on/off complement, doubles that number, in one embodiment.

Further, a restriction may be placed that the sequence contains no silent chirps. Even with just 1 power level ("on") there are $(1*10)^3-0=1000$ unique, non-zero, 3-ringtone signatures available. If each signature denotes a "name" then a smart phone is capable to addressing 1000 unique, audio ringtone aware, chirp devices in its "network."

The ringtone concept may be applied to other non-audio frequency domains. The ringtones may also include multiple simultaneous send/receive on diverse "channels" (e.g. infra-red and audio), in some embodiments.

The composite ringtone is analogous to a musical chord: it's a "richer" tone. The chord carries more information for multiple uses e.g. redundancy, error correction and multi-level security, denoted by number of chords and receiver capability to receive them some or all the tones.

They may also be used to provide "hidden meanings", like secret handshakes, nods or winks. The "public" message may be simulcast with a "private" message decipherable only by devices with capable receivers. Thus, enhanced services may be provided to select customers, by providing them the appropriate chirp equivalent of a TV cable decoder that, with installed firmware, provides access to more TV channels in the "bulk" broadcast.

Different parts of the complete message may also be emanating from multiple chirp devices. For example, in one embodiment, ring tone chords from different devices provide two-level authentication system capabilities. Thus a police car will not start unless the policeman and his partner are safe in the car, determined by synchronized chirps from both their smart phones. Further the phones are secure in that only the authorized users have the correct access codes so stealing the phones renders them ineffective. Thus, the equivalent effect of multiple signatures on a two signature check is supported, before the car will cooperate. Chording thus provides multiple security layers.

Chirps are a Generic Concept.

Ringtones are one example, easily available on smart phones. Another could be color LEDs e.g. traffic lights have 4 states e.g red, orange, green and black (off). Complex hues of a color (e.g red+blue=purple) may be chirped across from devices to smart phones. Thus, like musical chords, chirps can be "rich" in information even if it is a short, unobtrusive burst. With the appropriate image or sound processing software, smart phones and other computers are thus multi-lingual devices, capable of translating chirp chords from Wi-Fi, Infrared, Audio (ringtone) and light patterns (camera flashes and photo image analysis).

In one embodiment the smartphone software consists of one or more apps. The apps are loaded on these computing devices also provide translation mechanisms to understand what was said in chirp languages and what to do with the payload data. The chirp signature, like a bird chirp, is essential for this translation and categorization—it tells us what type of bird is speaking. Note that the apps were downloaded through secure and authenticated sources via standard IP.

If it is useful to have birds of a feather flock together, then chirp signatures may also share some chirps common to the flock. Thus, based on the signatures, higher level systems, such as the embodiment of FIG. 26, know where the chirp devices of type "Yellow bird" are and their states. Demographic data is readily available.

Decentralized Naming with Inherent Conflict Resolution

Chirp routers employ in one embodiment the chirp equivalent of the distributed DHCP server based IP addressing scheme with inherent conflict resolution, as shown in the embodiment in FIG. 29. Using those methods, instead of IP based device addresses, devices are given names, randomly chosen, but with inherent conflict resolution. These names can be changed frequently by the router for all but the simplest "blind" (no listening) chirp devices. Blind devices, in one embodiment, like garage door openers, have simple means for identification variation, such as DIP switch settings so their timing and/or channel are modifiable by the user, as directed by the routers governing the devices.

Lineage Based Uniqueness.

In the chirp network of one embodiment, there are no pre-assigned unique "names" or "signatures" as existent in the IP world of MAC-IDs or IP addresses. Those approaches require a central authority to manage conflicts resolution is address values. Sender-oriented communication packets need unique destination addresses. In contrast chirp device names, related to their chirp signatures, are assigned or modified from factory default, if needed, when the device or "thing" first joins the local network governed by a router. In the event two devices have the same factory default signature, for example, one will be changed, remotely or manually, as described in the garage door opener analogy. Thus devices and its siblings have unique names or "addresses", as seen by the chirp "access point" they are connected to, in one embodiment.

Sibling names must be distinct but need not be unique, in one embodiment. If a device name is distinct, amongst its siblings, then tree based logical routing is sound. As an analogy, Eric, child of Paul, child of James is distinct in a tree based topology from Eric, child of James, child of Paul. The routing table entries and routing paths for the two Eric's are distinct: James→Paul→Eric and Paul→James→Eric. Note that in this approach, the "lineage" is exploited to provide context/delineation between two devices of the same name and in the same network. This form of identification, not needing unique names/addresses and using lineage to provide distinctions, is a departure from conventional IP based networking, where each MAC-ID "name" or IP "address" is expected to be unique. Methods taught in Appendix A, however, still apply and are equally relevant for route path management. Lineage based device naming are inherently secure because only routers know which Eric is being addressed.

Small Names:

With non unique names, the number of "ringtones" in a signature sequence can be small since we are no longer striving for uniqueness. The same three ring tone sequences may be used repeatedly in different, non adjacent sub trees of the network, with no adverse effect, as long as lineages are distinct. When they are not, in one embodiment, chirp routers will either first attempt to change the name (for embodiments where the chirp device name is programmable) and otherwise will notify the user to change device signatures, (e.g. dip switches for garage doors) or move them to another chirp access point/router.

Name and Signature Swapping

Many not-blind chirp devices take direction, in one embodiment. That direction comes from routers and tune directives from trusted "mother" agencies. When a chirp signature or chirp language/protocol has been compromised, the device may be taught different birdsong. "Mother" chirp directives may rename a device and switch from one language to another. The languages may be closely equivalent e.g. dialects of a purpose built machine Esperanto. Changing names and word "look up tables" thus provides additional enterprise security.

Chirp Devices are Inherently Secure

Receiver Oriented:

Only routers can provide the link that connects Chirp/pollen publishers to their subscribers. Further chirp device naming is not unique, like IP addresses. Therefore names can be changed, for many listen-capable devices. This receiver oriented system is inherently secure, in one embodiment.

Further, in the case of a bulk broadcast, application Ser. No. 11/266,884 teaches methods for VOIP aware phones capable of deciphering the message for them and discarding the rest. As such, the bulk container is like mixed and jumbled bag of pollen. Each flower/subscriber takes what it needs and ignores the rest. Thus, multiple messages for multiple devices may be sent but only the device it is intended for can decipher it. Chirp transmissions are inherently closer to pollen in that they may also be widely broadcast without sender side security layers. This reduces encryption overhead significantly since the "secret" is known only to the intended flower/recipient. For example, in one embodiment, a chirp of an error code is not encrypted inasmuch as it is meaningless without access to the secure routing table.

In another example, humans have multiple forms of secret data in handshakes, nods and winks intended for specific audiences. Certain groups have a secret handshake that provides intended recipients with additional information. Neither party shaking hands may have prior knowledge of the other. They are shaking hands in broadcast mode, visible to everyone. In fact the person initiating the handshake may not even be aware that he is communicating special information—it is simply the way he always shakes hands. Like pollen, the security is "genetically encoded." The onus shifts to the recipient to decode the message, based on secret signatures they were taught to look for. Thus security infrastructure requiring encryption at the source is no longer essential, since the message signature is already encrypted and only intended recipients can decode it. In other words, the publish/subscribe broadcast may be "open" and hence lightweight.

Hidden Meanings:

In one embodiment, how communications are understood may depend on multiple levels of security. Adding more transceivers, operating in diverse frequency bands, is an effective way of sending partial messages, and is used in one embodiment of the system.

Consider three sibling devices in a network. The first has infrared capability. The second has a microphone. The third has both. A three element ringtone sequence is simultaneously sent from a fourth dual transceiver device, which has both infrared and sound transceivers. It is interpreted differently by all the three receiver devices. The first two will get only partial messages. Hence, with multiple transceivers, messages with multiple layers of meaning may be transmitted concisely. Further, messages being sent on independent channels may be syncopated in time, making it harder to decipher. Lastly, both signature and payload are "tunes" and flow into the other in continuous transmission. Only the receiver knows where one ends and the other starts. The secret handshake is recognizable only by intended recipients.

Further, assume the intent is to deliberately obfuscate the "signature" being transmitted. Hence decoy signals are be sent on one or both "channels," in one embodiment, that are being watched. Only devices that know the secret handshake, can piece the "real" message together, removing the decoy components of the transmission.

This is different from frequency hopping techniques. In frequency hopping, sequences are on different frequencies and the receiver knows when to change frequencies based on a mutually known sequence order. Here, each "tone" in the ringtone sequence consists of involving multiple transmitters in simultaneously providing layers of signature security. Thus different devices receive different messages and meaning. These chirp equivalents of musical chords are hard to decipher fully unless you know the entire "tune" being sent on different transceivers. Further, syncopations in time—so multiple tunes can be sent, then silence, then another set of tunes, adds complexity. Decoders put it all together, taking note of silence. Silence durations also are cues, like nods/winks/inflexions.

Some Decoders can access the entire information, others have limited access. Thus, despite their simplicity, even smart phone ring tone chirps are difficult to decode, especially when there are multiple concurrent independent transmissions. See embodiments shown in FIGS. 7-8, 23, which are the equivalent of musical chords.

Existing temporal key management schemes used by some embodiments further improve signature and payload security. Multiple existent means for encryption and security exist and are applicable. However, recall that some chirp devices are intentionally simple and have relegated storage and computation elements to chirp aware routers (e.g. night lights, smart phones, etc). Hence their ability to decode is maintained to be non-computationally intensive in one embodiment, the chirp equivalent of a short ringtone pattern which can be deciphered or transmitted easily. For example, a simple three tone ringtone and a three bit Boolean bit mask suffice in one embodiment.

Changing the bit mask, using "dip switches", for example, can change the bit mask and therefore signature "tunes" that the chirp device will listen for. In the example of changing dip switches for the garage door opener, the owner changed the signature "tune" for his chirp device.

There are no limits to the complexity of chirp signatures. In mission critical or enterprise level security, three ringtones may not suffice. Sophisticated decoding software solutions and integrated circuits are supported in this framework for some embodiments. The night light (or other devices) have a removable insert that contain security chip decoders, in one embodiment. See FIG. 22. Ser. No. 10/434,948 teaches methods to build secure, OS free chips, FIG. 30-31.

Chirp broadcasts emanating from chirp routers contain multiple signatures and payloads. Chirp routers may send them as single tunes, intended for one device, or a container, intended for multiple clients of the chirp network, akin to the VOIP container described in Ser. Nos. 11/266,884, 11/088, 330, FIG. 12.

Consider security in these typical scenarios supported by embodiments of the instant invention.

1. Single tune for single chirp device: In one embodiment there are three chirp devices on a local network (wireless or wired). They both have three ring tone signatures and five tones for payload data for a total of eight ring tones. It is unclear to snoopers, which machine is being addressed when a single eight ring tone tune is sent.

2. Bulk container for multiple chirp devices. Note that signature ring tones and payload ring tones are indistinguishable without some knowledge of the devices communication needs. Further, the order in which the tunes are concatenated to produce a "bulk container" is immaterial to the devices. They take what they need and throw away the rest (like pollen). But it is obfuscating to snoopers. Hence randomizing the order in which tunes are assembled into the bulk container is a simple yet effective security measure. Further, in one embodiment the entire (IP based) container is be encrypted by temporal keys using well known IP based encryption methods.

3. Obfuscated Mode: In another embodiment, a third chirp device is added, a five ringtone, fifteen ringtone device (a total of 20 ringtones). It is clearly distinguishable from the 8 ringtone devices. However, like pollen, devices take what they need and throw away the rest. Hence the chirp router, as a decoy mechanism may send out 24 ringtones, with irrelevant packing at the end of the 20 ring tone data. Now, it is unclear whether it is a bulk mode transfer for three eight ringtone devices (3*8=24) or one 20 ringtone device with padding. Even if the snooper knows the types of chirp clients in the network, the secret handshake in the "pollen" remains secret, decipherable only to the initiated.

More complex forms of encryption are possible by using the ASIE in the IP based wire-less radio beacons, in other embodiments. There are embodiments using both an IP layer encryption and Chirp layer encryption. In different embodiments each of the layers has temporal keys which are periodically reissued. The chirp layer is not burdened by a preexisting, public protocol. Transmission encryption and other security are arbitrarily simple, complex or nonexistent, in different embodiments. FIGS. 19-20, 30-31 relate to methods previously taught to remotely manage secure devices.

Where Chirp devices reside inside a local network is not public knowledge. Their routing is a function of both the IP address of their parent chirp node/router and chirp device signature.

Chirp Signature, protocols, internal routing information is accessible only within the local area network and restricted access to authenticated members only, typically router embodiments that manage the devices e.g. night light, smart phones et al.

Temporal Names

In one embodiment, routers may employ a distributed DHCP IP addressing scheme with inherent conflict resolution, FIG. 29. They are capable of autonomously changing their current IP addresses and privately communicating this way within their local IP networks. They are also internally capable of changing IP addresses for their IP clients and those IP to chirp tunnels that connect chirp devices to IP addresses. Finally, they may also request listen-capable chirp devices to change their "names" and even teach them a new equivalent vocabulary, in one embodiment. Thus a traffic light swaps "green" for "red"—only the router or its agents knows that red now means go.

If an IP based tunnel/socket needs to be established for real time interaction with a chirp device, it is the router, using DCHP, that makes a temporary IP connection available, per methods taught for temporary and mobile mesh networks, see Ser. No. 12/352,457. Thus all "contact" is router managed and the router is secure in several embodiments of the invention.

Pollen is moved based on its chirp signature. Where it goes is managed by the router. Only the router has both pieces of the puzzle (sender "color" and subscribers for those "colors"). Further, in a receiver oriented world, only the destination address need be known to the router. It cannot decipher the contents. Only subscribers at the final destination know how to unlock the pollen's message.

Unauthorized entry into the router also changes very little, unless you can permanently change where it gets its subscriber base map. But this is periodically supplied by the Enterprise, heavily encrypted from the IP side of the chirp router/bridge. "Dongles" are inserted in "back" slots of routers, FIG. 22 in embodiments that are highly sensitive to security.

For enterprise level chirp security there are multiple alternatives. Temporal ring tone sequences, generated by the routers, may be added to chirp signatures. At each hop they may be replaced by another (thus only adjacent routers know each others keys). Or network level keys are distributed, by IP, from the Enterprise and their agents. They are known only to those in the trusted network and are periodically changed. Without this additional key, all chirp communication is unintelligible. A simple 2 or 3 light flash or ring tone sequence, sent by the routers, thus suffices in one embodiment. If the routers are using beacons to inform chirp devices of their presence, then this data could be in the beacon chirp. Since it is a temporal key, hacking it has limited value. Further, the chirps do not need to be encrypted on a packet basis. Container level encryption is sufficient, for those embodiments, thus reducing security key distribution complexity. This reduces the complexities of large scale security key distribution and its management.

In one embodiment, secure software upgrades to chirp devices and the router follow the same method taught in Ser. No. 11/088,330, see FIG. 18, 19 and in Ser. No. 10/434,948, see FIG. 30, 31.

Secure interpreter cards offer a portable form of device security for one embodiment. Machines chirp terse status and error codes. These are received by a meshed network of night light routers or their agents. Based on where interpreter cards are installed in the slots, FIG. 22, 26. Chirps can be interpreted and translated at multiple levels of the logical mesh network tree, including at the router itself.

An interpreter card, in one embodiment, is inserted in one of the many slots (front and back) of the night light or router, FIG. 23. When leaving the home, the end user removes the cards. Note that in one embodiment the "card" could also be a proximity chirp from an authorized device e.g. smart phone or dongle on the end user's key chain. When that chirp is heard, chirp routers are active.

In one embodiment, the same security card is used at a second location, such as at the end user's office, to perform similar interpreter functions. Thus secure communication is portable across home and work environments. And, in some cases, the smart phone suffices as the "card." Note that chirps may use both chirp and IP protocols. Hybrid router embodiments and Interpreter "cards" perform the multi-lingual translation. Both types of devices are accessible with the card, as is inter-device communication.

In effect the interpreter cards are used as a common home/office entry key in these embodiments. Further, the same card may have a separate section that filters out chirps from unfamiliar or unauthorized devices. It is then also acting as a firewall for both chirp and IP devices. Multiple cards, working together, can support complex collaborative efforts, involving both humans and machines, FIG. 26.

Extensible Chirp Vocabulary

Humans generate generic concepts, based on words strung together to form sentences. Concepts are complex and to communicate them human conversations can be tediously verbose—hence the adage: a picture is worth a thousand words. Machines, in contrast, are purpose built. Their "vocabulary" is limited. What they wish to convey is purposeful and terse. For example, automated traffic lights can effectively communicate with just four states (red, orange, green and black for inactive/malfunction). Chirp device transmissions are also designed to be terse. They are intended for purpose-driven communications e.g. Machine-to-Machine (M2M) communications.

The stringing together of complex concepts is a sequential process. Hitherto, prior art in networking has focused on Human-Machine communications. They were designed to support verbose (large packet) communication, but at the price of inefficiencies for small packet transfer (e.g. VOIP). At an abstract level, all IP based communication is essentially faster Morse code.

Machines, in contrast, may also have a lot of data to report—like a core dump—but this is the exception, not the rule. Most of the time simple red, green or orange "chirps" suffice. Further, since machine states are limited, small vocabularies are adequate. For example a color based language can concisely communicate many shades/hues/meanings tersely: complex shades of red sent from a single LED can communicate a lot tersely/swiftly, without lots of words.

Thus Chirp device communication may be short (for coexistence) but rich in meaning. In some embodiments, the devices are also capable of faster parallel communication. A data byte is a sequential ordering of 8 bits of data. A serial port transmits 8 pulses sequentially. An 8 LED parallel port, on the other hand, "chirps" once. Advanced LEDs or audio devices therefore transmit, in parallel, large packets of data in one chirp. The chirp bandwidth is dependent on the resolution of transceiver to send and decode the "parallel" port data.

On major drawback of quick parallelized data flow is it can be easily missed. TCP/IP like protocols may be implemented to resend data but it defeats the objective of coexistence with verbose (sequential data) IP dance partners also operating in the same spectrum. Instead, like birds, repetitive chirps ensure that at least a few chirps are heard. Also, like pollen, the embodiments of this system err of the side of sending more repetitions in the hope that at least that a few bear seed. This implies, like Allergy season, a timed broadcast "storm." Further, like pollen, the data is receiver oriented, so, like bird chirps, everyone can hear it but only intended receivers can decode it. Pollen can travel light.

Chirp vocabulary is driven by what the devices wish to convey and since it is receiver oriented, it can be as simple or complex as needed. However, if chirps are using the same frequency spectrum, these chirping "radios" must broadcast short bursts, repetitively and randomly. "Chirp aware" devices, like their advanced Wi-Fi and Bluetooth cousins, emulate limited agile/polite behavior.

"Small" Data Feeds Big Data

Chirp sequences (in parallel or serial flow) form "tunes". Tunes are used as signature patterns and data payload. Or a concatenated and encrypted version of both, where encryption includes delayed transmission as in syncopation. In one embodiment, two tunes are really a jumbled version of one secret handshake, where even the silence may have meaning, known only to intended receivers.

While humans can hear birdsong, the chirp sequence "meaning" is known only to the birds. We can draw conjectures but since signatures and payload are both tunes, it is unclear where one sort of tune melds into another. Hence humans can hear all the myriad bird conversation in the park and yet understand none. We have not been provided the secret handshakes.

Bird chirps respond to changes in the environment. For example, a cat walks through the park. Our eyes follow it. Our ears notice how the chirps follow the cat's motion as it moves from one tree to another. Chirp tunes will change both in the sequence of tones and their intensity. We therefore, as snoopers, may be able to discern activities common to the same consensual domain because we are matching patterns in two different sensor domains (eyes and ear). We are putting two and two together. Multiple sensor fusion drives our inference engine.

Over a month, the cat may visit different parts of the neighborhood. There are trend indicators there but the sampling duration may need to be months to accurately pin point "affected" regions. The quantity of data to be analyzed is considerable. Some may need to be stored and reviewed later by the big data analysis engines that are predicting trends based on past history.

Over time, it is noted that these "small" data pattern repeats itself around dusk most nights. "Big" data engines may then infer that a nocturnal animal (e.g. cat) is causing "disturbance" in the "reference signal Thus "small" data, un-intelligible to us, is processed into more coherent form, which in turn is used to draw conclusions about the environment not transmitted per se in each "small" data transmission.

Putting small events together to infer a complex event or trend is difficult. It may require a control system component, Bayesian reasoning, to filter out the noise from reference signal disruption. This is taught in collaborative framework, see FIG. 26, Ser. No. 13/571,294 et al. Further, 61/615,802 teaches techniques for detecting deviations from reference signal patterns and reporting them for further processing to higher layer functions. "Small" data events, based on observation, are thus recorded and sent "up" for "big" data analysis and action. In embodiments of this system, small events feed complex event analysis.

The night light routers of one embodiment of this invention are like node branches in a park of other trees and birds. The router hears chirps of birds in its network of branches. At one level the router simply has to know which subscribers care about which chirp signatures and arrange for buses "winds" to carry the chirps to them. However, it is also a hub for its bird subscribers. Further, it provides disembodied intelligence and storage for these simple devices—like holes in its trunk for nests. Each tree and its branches form a root and relay mesh network. Each node in the chirp network mesh tree is a logical first level filter for interpreting small data birdsong.

In one embodiment, Chirps include signature (e.g. like device names) and payload. Payload and signatures are melded to form tunes, in one embodiment. Tune payload may include short directives (scripts) sent as series/parallel pattern of chirps e.g. encryption, security signatures, data payloads, commands, data requests, software upgrades or real time diagnostic conversations. Like VOIP phones, chirp devices and remote customer support centers establish a real time tunnel to talk in secure chirp languages, in on embodiment. In other embodiments, they even switch languages and continue the conversation easily—recall that machine states are terse and purpose built—their vocabularies are concise and therefore can be remapped to other "colors" or ringtones easily.

Chirp directives are called tunes because in a receiver oriented world, only specific devices can "dance" to the "tune"—those that know the secret handshake. Tunes are (secure) bird speak. Further, end devices are purpose built and OS-less, FIG. 30-31, in one embodiment. They dance only to specific tunes from "mother." In some embodiments, the system components may be capable of "changing their tune" (e.g., mode of operation) based on directives from the "mother" or "mothers." At any point in time, however, these tunes are ant-like collaborations: simple robust stimulus-response pairs. Like traditional get-set protocols, each tune has a specific dance partner.

Tunes thus perform simple tasks. They are ant like in abilities—a tune is not complex construct like a song. However, working together, they perform complex tasks, or complete songs, like super organism e.g. ant hills.

These tunes, intelligible only to authenticated chirp routers, may also contain application specific inference engines as described in Ser. No. 13/571,294. In one embodiment, they are interpreters for encrypted "short hand."

For example, in one embodiment, the kitchen night light router is directed to forward only exceptions: no news is good news. An installed tune states that, as long as at least one chirp is heard and it is not a red flag, the router does not forward it. Another installed tune/ant, for another subscriber, states that, at midnight, 24 stored chirps should be sent, so it may "plot" the hourly pattern. This "tune" requires local storage and time stamping, heart beat sequence numbers etc., see Appendix A.

Other ant-like tunes, in other embodiments, may include post office like services: hold some mail for a period of days but forward others, discard others etc. A variety of conditional transport mechanisms are thus supported. QoS equivalent tunes may drive bus schedules and polling frequency, based on pollen types (chirp signatures) and their subscriber size, urgency and interests. Note that all the heavy lifting is at the router—the end devices are still thin client.

At a more macro level, in other embodiments using distributed collaborations, FIG. 26, may include collaboration from ant-like tunes operating on other routers. For example, the a router having a battery backup, the kitchen night light notes no chirps were received from kitchen appliances in the last 24 hours. In this embodiment, the router is aware that it is running on battery backup and that chirps were expected at regular intervals. Before filing multiple repair request reports, a collaboration tune request that the kitchen night light confer with the living room night light embodiment, a Samsung TV via the power line network. The Samsung TV confirms that its devices are fine. Bayesian Inference and causal reasoning engines, correctly infer that the kitchen fuse has blown. If so, further causal reasoning indicates that perishables in the GE refrigerator are suspect. The home owner is informed via his smart phone. No repair reports are made, other than to notify of a potential overload condition. Thus, application specific intelligence at the chirp router level reduces customer support overhead and false alarms. Simple ant-like collaborative agents, working together engender complex reasoning from simple messages or even the absence of simple messages.

Multiple tunes thus support dynamic and diverse needs of multiple subscribers, without unduly burdening the network, since only requested exception packets and/or clones of packets are sent.

Further, packet cloning along a route is managed by each router on a need to know basis, in one embodiment. Where a fork is needed is event based, since the publisher-subscriber relationship is dynamic and transient. Subscribers may direct a Mother (root) node to remove some of its publishers from the "follow" list. Some, en route, will be removed at the next bus stop. Thus a dynamic bus schedule based supply and demand alignment is constantly taking place—e.g. containers traveling north as one convoy, now split into eastward and westward containers and combined with other fellow eastward and westward bound containers to form a more efficient bus convoy. Thus, efficient repackaging and pruning of routing paths, as described in FIGS. 12, 24-25 and 27-28 address multiple scenarios including periodic chirps, mobile device communication and temporal mesh network clusters.

In a subscriber driven supply chain, QoS etc is dynamically defined by the subscriber and their agents (e.g. Tunes) Recall there is no static QoS value inherent in chirps, vs. for IP packets. Chirp pollen are simply directed to the appropriate "yellow" buses, from one bus station to another along their route to subscribers, Only Chirp routers within a local network know bus schedules and/or if a chirp packet was placed on a bus. Further, this type of data may be accessible only via secure IP based protocols, Malicious or malfunctioning devices, either chirp or IP, cannot manipulate device routings because these are event driven and dynamic. Rule driven event based systems are hard to "crack"—explicitly stated bus schedules don't exist, so cannot be "stolen" or manipulated.

Rich Chirp Streams:

Routers are intermediaries between "small" data publishers and their "big" data consumers (machines and humans). In addition to routing, authenticated routers serve as distributed "big" data agents. Interpreter "tunes" correlate patterns and map different types of "events". Big Data tunes, resident on the routers, monitor chirps and correlate "cat events" to corresponding birdsongs/tunes in their tune pattern library.

In one embodiment, The same small event feeds multiple complex event analysis and prediction engines. no one single small event is significant (and can be missed), but a swarm of them is a noticeable trend. The interpreters at the router nodes are data sieves/filters and in effect are also virtual "rich" chirp publishers to subscribers above it in the information food chain—feeds on data to generate actionable intelligence e.g. trending.

The multiple small event chirps may feed into an interpreter that chirps a simple yes or no, terse but rich" in content. This data "richness" is possible with interpreters residing at edge routers (both root and relay nodes). Inference Intelligence is distributed with collaboration between the layers, all the way from edge routers up to core routers—big data analysis systems. A hierarchical, distributed tree based collaborative control system emerges, as the embodiment shown in FIG. 26.

Communication can thus be both terse and rich throughput the collaborative ecosystem. It can be sporadic, intermittent or periodic. All of this drives control signals in an adaptive distributed communications and control network, FIG. 1, 26.

Some chirp devices, in one embodiment, use rich chirp shorthand, periodically, like VOIP packets, to communicate periodic updates or participate in a remote diagnostics session. Sometimes the time delay between transmissions matters (e.g. why a Mars rover needs onboard intelligence). Moving number crunching and interpretation closer to the source also ensures that context is not lost in translation in a rich chirp to its interpretations along the tree. There is less traffic on the IP highway and also more "relevance" and context to a chirp closer to its source. Given that in embodiments of this system, intelligence is clustered in routers—end devices are a thin client or even an OS-less one. This is win-win at multiple levels (e.g. lower costs, collaboration ease).

Consider video surveillance. Today, IP based cameras forward raw feeds to a central location. This is thin client but the data is not "rich." In an embodiment of the invented system a video surveillance systems include smarter cameras connected through a chirp mesh network. Each camera has been taught what an intruder pattern looks like, from its own chirps and those of its adjacent mesh nodes. When any camera detects an intruder, it sends out a broadcast chirp. All cameras in the community network are alerted and "follow" the intruder, based on taught entry and exit paths in the building and their locations. Finally, a night light embodiment receives the salient footage from each camera, from their mail boxes, in one example. The router contains the substantial software and hardware to assemble these simple messages and present the information to the alarm system or to the human operator. The end result is a pieced together video that takes up where the last camera left off. This is forwarded to subscribers (e.g. Police).

Thus rich surveillance chirp stream overhead is significantly less than central monitoring of multiple "dumb" cameras requiring the capacity to support raw IP video feeds sent centrally.

Further, only exception handling is being sent over IP, all internal communication is chirp based, local and contained, in the present embodiment. If a broadcast storm does occur, it stops at the mesh tree nodes (routers) which containerize the chirps.

Thus turning off errant zone of "things" is managed at the nightlight parent node for client chirp device relays and device sub trees in the logical mesh network tree, FIGS. 9, 22. Note that the nightlight is multi-lingual and messages to turn off/on chirp devices are not decipherable by those "rebel" chirp devices—IP based encryption is foreign to them, they have no IP stack. They also have no access to IP transport except through the night light.

In one embodiment, these chirp streams are stored in community mail boxes on routers. There, they await the next bus for their journey to subscribers. The chirp is terse e.g. yes, the cat has entered my region and this is the cats current location. Big Data systems take that "rich" chirp stream, of small "events" and interpret it to make sense of complex events. This is made easier when Big Data agents have defined the "tunes" directives that end devices are dancing to. They know exactly what is being said.

Thus rich chirp streams, periodic, or sporadic, are sent to multiple subscribers, each of which has different and possibly very diverse interests and "tunes" Further, demographics are complex—GE or Samsung refrigerator chirps are international. Over the IP network, chirps are available for consumption and complex analysis, anywhere.

In a collaborative ecosystem of one embodiment, FIG. 26, multiple "rich" chirp events are concurrently feeding multiple big data analysis engines providing layers of intelligent analysis. Further, in a trusted network of one embodiment they are also privy to each others findings and interpreters to arrive to larger trends that affect them both. Symbiosis is mutually beneficial. Thus, it may be discovered that GE refrigerators are being bought by people who own Samsung TVs—perhaps a common customer support center is mutually advantageous. Further GE and Samsung may collaborate so their chirp signatures and vocabulary/tunes do not overlap—thus reducing the need to change frequencies (e.g. the garage door opener dip switch setting changes). This would improve Customer Satisfaction, a shared objective.

Returning to the video surveillance embodiment, with distributed intelligence, weak points in the perimeter security are identified for future repairs at the same time that the police department is notified. Thus rich chirps, in this embodiment, drive complex events and result in multiple responses. Supply chain logistics efficiencies are extended by interpreting rich chirp streams running closer to the sources. The Nightlight embodiments are logical hubs.

Centralizing intelligence at hubs reduces the cost of purpose built chirp like devices yet together, device and nightlight provide the same functionality as more expensive general purpose devices. Thus an infra-red camera, purpose built to cover a perimeter, is lower cost than a generic purpose raw video camera. The purpose-built camera is ant like, but with collaborative agents, equally competent.

Returning to the birds in the park analogy, consider one bird atop each tree, responsible for reporting intrusions in assigned regions. The infra-red birds chirp periodically, a heart beat, stating they are alive. It is low power, sufficient only to be heard by a "buddy" bird, charged with reporting an exception error in case its buddy dies. Thus co-channel interference is curtailed. Adaptive Power Control methods are described in Ser. No. 10/434,948 FIG. 1. Chirps are local and "contained."

Continuing the example, An intruder is detected. Like birds in the park, chirp volume and chirp effective range increase. It is propagated by repeater relay nodes and reaches router/hub, FIG. 22, Tunes convert chirps to English and inform humans. Thus low cost, purpose built ant like rich chirp devices can provide zone based security at a fraction of the hardware cost of more generic IP based devices. Further, like buddy systems, one device can watch over another's domain and provide sleep and wake-up tunes. Thus changing of the guard is also supported in a not "always-on" world. Purpose built chirp devices, like ants, can provide ant hill like complexity, at costs lower than their generic, IP based cousins.

Managing Blind Chirp Contention

Using methods taught in Ser. No. 13/571,294 et al, in one embodiment, the routers are like school teachers, managing the unruly chatter of school children. Some are "chirp aware" and self-directed to be more polite and agile. They need less "retries." Other simpler devices are chirping blindly. Being random ensures that deadly embraces are avoided by two devices chirping at the same time. However, blind chirpers, like unruly school children, may cause temporary contention with others, sharing the same classroom.

Randomness reduces the chances of the blind chirpers creating habitual noise during periodic bulk transmissions, as shown in the embodiment of FIG. 24. Further Improvements to reduce blind chirp interference include the following approaches in some embodiments:

1. Move blind devices to another "band" e.g. from Wi-Fi to Infra-Red, FIG. 22. This reduces blind interference but requires that chirp based mesh nodes and routers also support multiple "bands" This improves versatility regarding device support. It also increases capacity and bandwidth. Duplex communications are also now possible on the two separate channels see FIG. 7, 8, 9.

2. Upgrade some chirp devices to "listen/see" capabilities so they are less clumsy on the transmissions dance floor. App Ser. No. 11/266,884, for example, teaches methods related to listening for beacon prior to transmission. These beacons contain Application Specific Information Elements (ASIE). ASIE provide cues for when best to chirp, for example in one embodiment. Further, chirp routers and access point equivalents can tell their clients when they are available to listen to them and/or request silence them in the interim. Like police car sirens, they send a "silence" command, requesting that devices be silent till a mission critical transport has completed. Chirp routers may also request clients to "sleep" and then provide a persistent wake up clarion call when they are ready to receive their data. Variations on these themes are taught in Ser. Nos. 11/266,884, 11/088,330, 11/818,899.

3. Provide simple accessible settings. Garage door openers in cookie cutter neighborhoods occasionally can open other homes unintentionally. The owner changes the dip switch settings on their controller, thereby reducing this unintentional interference. In one embodiment, Chirp routers direct human to modify factory default settings on chirp devices, if needed. This was addressed in Ser. No. 13/571,294 and its references.

Thus, devices, like school children, need not all be polite/ agile "chirp aware." If they are capable of receiving simple "stop" or "go" instructions, the edge router school teacher is capable to managing the interference environment proactively. Scheduling the interactions may be as simple as round robin scanning techniques described in Ser. Nos. 11/818,899 and 11/088,330, see FIGS. 13-17. Further, a chirp aware device, like a good student, take charge of an unruly one, in one embodiment. Adaptive Power control is used in one embodiment so blind chirpers "whisper" their chirp/states to more sophisticated neighbors, who, like good neighbors, propagate their chirps in timely fashion, potentially bundling it with their own. Thus buddy systems between polite and unruly chirp devices help maintain decorum in the classroom.

Chirp Aware Devices

Very simple chirping devices, like Infrared LED based TV remotes, don't need to chirp constantly-their human is closing the loop for them. One short burst of chirps is sufficient for a button press.

More complex chirp devices may pack more data into each short chirp. Consider an 8 LED parallel chirp, conveying 8 bits each chirp. Chirps may thus be short and yet "rich" (e.g. parallel 8 LED chirp has 8× more data in a single flash than a single LED flash).

These "rich" chirps eventually need to be converted to digital sequential bit based data packets, to travel on the IP based section of the logical network tree, There are tradeoffs between using one 8 LED chirp flash (fast and less obtrusive or collision prone) or a laborious sequence of 8 one LED flashes (slower, more obtrusive or collision prone but uses simpler firmware). If Serial Chirp devices chirp often, they should be polite: more collision or chirp aware, choosing chirp times wisely.

As an analogy, sparrows chirp frequently and blindly. Wiser birds, like owls, listen and wait till "winds" are in their favor and there is less "noise" or collisions from other birds. This improves their signal to noise ratio, reduces transmit power, increases effective range. Fewer repeats are needed. A few owl hoots, in the collision free silence of the night, propagate effectively because the "Chirp Aware" device times its chirps intelligently to occur in collision free time zones.

Further, in embodiments where chirp devices can listen and be directed, the parent router may direct them when to chirp, thus supporting reservation time slots. Lastly, devices chirp may be assigned sequence numbers so broadcasting is limited. Appendix A teaches relevant methods to improve chirp propagation using heart beats sequences. Thus as long as chirp devices, like school children, can follow direction, they do not need to be intelligent or aware of the transmission status of the entire system.

Some embodiments use pollen chirps which have a finite relevant "life." Working backwards from how urgent timely delivery is to the aggregate subscriber, the logical mesh tree topology is aligned, FIG. 1 as is the bus size and frequency of departure, FIG. 12, 24. In this logistics supply chain between suppliers and demanders. aggregate demand is calling the shots at each bus stop. The system is attempting to stay in dynamic alignment at each router along the path. Aggregate Supply/Demand Alignment and the arbitration and auctioning mechanism, employing collaborative scheduling, is taught in FIG. 26 and 61/615,802.

Thus, since the pollen is being containerized and repacked at each bus stop, changing subscriber demands are incorporated in real time. The bus journey may seem more meandering, like searcher ants, than a more directed and predictable path of an IP packet with static and preset destination. But this approach, with stops along the way, at each bus stop, ensures that both routing and subscriber interests are in alignment. Routing issues related to congestion along the IP highway (e.g. accident) is addressed by adaptive mesh network topology, dynamic load balancing et al, taught in Ser. No. 10/434,948.

Changing destinations of entire bus loads (e.g. hospital, now, not the school), is an extension to IP based networking. Next generation IP protocols may allow senders to include both a specific IP address (default setting) and a more "fuzzy" suitable wind direction to aid pollen to:

a. travel more efficiently (fewer hops, low latency) and/or
b. travel more cost effectively (bulk, latency-indifferent delivery) and/or
c. travel more reliably (e.g. TCP/IP like services ensure packet delivery)

Wind carrying pollen change directions based on demand. Publish-subscribe "demographics" is reviewed by "big" data inference and analytics subscribers. They predict trends that may feed back into the alignment driven control system. Collaboration topologies, FIG. 26, change accordingly. The logical meshed network trees FIG. 1, 9, 22 changes connectivity in response. The radio and protocol agnostic mediation layers, FIG. 20 at each network node, enable scalable distributed control.

Chirp Aware Routers

Chirp Routers include chirp-to-chirp routing and also bridging across chirp and IP based devices. The bridging includes wire-less (e.g. Infrared, Sonar, Wi-Fi, Bluetooth, Audio et. al) and wired connectivity devices (e.g. power line, Ethernet, serial/parallel cables et. al).

Logical Radios:

FIG. 22 shows an embodiment using a bridge provided by an edge router that is both Chirp and IP protocol aware. The bridge 2216 transports chirp devices operating with low cost infrared LED transceivers, transporting data through the nightlight embodiment, via Wi-Fi into a wired network 2212.

Some devices in the bottom "infrared" layer of FIG. 22 have Wi-Fi radios (e.g. laptops, TV). They use the same physical Wi-Fi radios for logical radio chirp and IP transmissions, in one embodiment. One physical radio supports diverse media access protocols (MAC) concurrently. Logical radios FIGS. 7-9 and protocol agnostic control layers, FIG. 20 enable this. Hence, Wi-Fi radios, "upgraded" to support both Wi-Fi and chirp protocols, can now communicate over two different protocols, for different packet sizes, latency, retry and reliability requirements. How the two coexist is a matter of collaboration. For example, the dance partners may agree to not stub each other's toes: this means that VOIP like chirps are bulk shipped and/or Chirps are directed to be sent during silent periods e.g. IFS spacing times. Alternately, chirps, being short, may be included in the Beacon ASIE section. Lastly, more Wi-Fi physical radios may be added, like more lanes on the highway. The mesh bridge device, in one embodiment, has slots for dedicated chirp only road/channel see VOIP radios FIG. 7-8. Thus multiple physical and logical radio combinations are supported in modular embodiments FIG. 9, 22, 26.

When the slots are limited, one Wi-Fi radio may be used for both chirp and IP packet flow. Both speak "foreign" tongues, unintelligible without help at the root node for the chirp networks. Further, their transmissions are being managed at the router level. Thus, next generation Wi-Fi devices, as embodiments of this system include chirp-aware features—chirps sent in the quiet times of IFS spacing, known to Wi-Fi radios and managed by the router. In another embodiment the chirp is digitally encoded in the ASIE section of router beacons. Further, the Wi-Fi radios time their chirps like smart VOIP phones, FIG. 24, in yet another embodiment. Many options exist for concurrent chirp stream and IP transmissions using one transceiver pair. Logical radios and protocol agnostic control layers support using the same physical radio but different Media Access Control (MAC).

These chirp aware routers also manage efficient bulk packaging and scheduling of buses of VOIP like chirps per methods taught in Ser. No. 11/266,884 FIGS. 24-25 and Ser. No. 11/088,330, FIG. 9. The mediation layer, FIG. 20, supports both stationary and mobile nodes, FIG. 14-17. Methods employing Chirp equivalents of SIP registries is taught in Ser. No. 12/352,457, FIG. 27.

Methods supporting persistent and temporal mesh networks are taught in Ser. No. 12/696,947, see FIGS. 28-29. These methods are relevant to both chirp and IP based chirp devices (e.g. VOIP). Mobile and intermittent connectivity devices are linked through mail boxes and persistent mesh networks, see 61/148,809, FIGS. 27-29. Routers thus provide a logical and convenient post office and local support center hub. These edge routers are also fellow collaborators in the flow of small data stream fish upstream to bigger information pools.

Beyond bridging and routing, chirp aware mesh nodes provide disembodied machine intelligence for low cost and/or blind devices. The cost of making blind devices agile/polite is avoided. Like a school teacher, the nightlight embodiments provide order in the classroom. Chirp listen-capable devices are told to stop and go so they do not interfere with important transmissions, see FIG. 24-25. With heavy lifting relegated to routers, chirp based end devices may be lower cost and "thin client". Computing and storage needs are entrusted to others in the "social network" community FIGS. 22, 26. Thus, the Apple TV box can also, with additional memory or "tune" slots, support chirp based collaborations. Note that through USB serial ports, routers service low cost chirp devices with no IP stack, in one embodiment.

Ant-like Scheduling agents e.g. "Avoid" and "Cluster" also monitor the environment and help minimize blind chirp contentions, in one embodiment. Tree based collaboration frameworks, FIG. 26, schedule bus route and departure times to "avoid" and "cluster" and manage "Stacking." Ant-like Tunes, operating through the night light embodiments are thus, collaboratively managing the activities of the ants (devices) in the ant colony (collaborative distributed network). Like ant hills, complex organisms can be built on top of collaborative simple ant like "tunes." Exceptions are addressed at multiple levels of the super organism, through distributed responsibilities but central thought process, in this case managed by the secure nightlight embodiments and/or mesh nodes.

Thus, through nightlight embodiments, both chirp and IP collisions are collaboratively managed.

Further, some chirp aware devices, like VOIP phone counterparts, are capable of timing their transmissions without supervision from the nightlight, see FIG. 25. For others, the nightlight provides stop and go signals. Note also multiple transceivers are supported FIG. 22, 2214. Such devices support wire-less 2216, and/or wired connectivity 2212 (e.g. Ethernet, Power line). Serial USB connections connect external specialized secure transceivers. Thus stop and go directives are received on different frequencies, all part of the logical radio and logical mesh tree.

Multiple Existing Devices are Night Light Possibilities.

Mobile smart phones, tablets or laptops have the transceivers needed to communicate "tunes" to and from light based, sound based and Wi-Fi and Bluetooth based purpose built chirp devices. Additionally, software "apps" provide interpretation and translation functions between chirp, IP and Hybrid Chirp and IP devices, in one embodiment.

Smart phones from Apple, Google, Samsung, HTC, et al support cellular service and/or VOIP and VOIP service (e.g. Skype, Google, Vonage). Laptops and tablet computers support IP and VOIP. Thus, they may also, serve as routers, using wireless and wired IP networking to provide real time communications between chirp devices and support agencies.

Many consumer devices already have multiple transceivers. For example, most electronics makers provide smart phones, computers, music players, Internet TV appliances. The Apple TV and Google TV have Wi-Fi, LED, Ethernet and potentially power line reception capability. They can direct traffic on both Chirp and IP roads.

They can thus manage situations where a chirp device needs an IP tunnel for diagnostics repair, Like traffic policemen, they hold IP traffic, enabling chirp ambulances collision free lanes. Collaborative Scheduling agents monitor the "Stacking". If Ambulances become more frequent, the control system topology changes to accommodate it, if needed. Thus rich real time chirp streams are viable.

Further, many chirp capable devices have Infrared and Wi-Fi. Like custom VOIP phones, they are taught as discussed in the embodiments in Ser. No. 11/266,884, FIGS. 24-25 to be more agile. Apps, loaded on night light (AP) and/or VOIP like devices, may coordinate multi-band duplex communications, FIGS. 7-8 for remote diagnostics.

Many devices have touch displays to facilitate human interaction. Situation displays, Network management system or "dashboard" views, of home/factory network and machine states etc. thus supported by these devices. Some, like Apple, Google TV set top boxes access large TV displays. There are good night light candidates, as are TVs. Large displays hide "antennas" for different frequency spectrum (e.g. 900 MHz, Wi-Fi radios, Infrared chirps for added security etc).

Further these devices also use their internal and/or external, removable SD card storage for community mail boxes as needed by one embodiment of this invention. They thus provide a base for mobile, intermittent connectivity devices.

Many such devices card slots provide portable secure storage for chirp apps, tunes, mail boxes and other payload data. The cards serve as on/off key, in one embodiment, —if removed, associated devices disconnect and/or shut down. Further, devices may insist on being "tucked in" at night. If their mother "app" does not chirp "Good Night" at a specific pre-set time, frequency or GPS location the device will sleep until awakened by a mother chirp signature.

Nightlights also provide disembodied and distributed intelligence for communities of devices. It is the logical place for community mailboxes and intra-network collaborations. These include the more sophisticated "Chirp Aware" devices that, like polite/agile students, can take care of their own collisions with each other. They look towards the night light to manage the unruly ones.

Distributed collaborations, FIG. 26, includes collaboration from ant-like tunes operating on other routers. For example, the (battery backed) Kitchen night light notes no chirps were received from kitchen appliances in the last 24 hours. Before filing multiple repair request reports, a collaboration tune request that the kitchen night light confer with the living room night light embodiment, a Samsung TV via the power line network. The Samsung TV confirms that its devices are fine. Bayesian Inference and causal reasoning engines, correctly infer that the kitchen fuse has blown. If so, further causal reasoning indicates that perishables in the GE refrigerator are suspect. The home owner is informed via his smart phone. No repair reports are made. Thus, application specific intelligence at the chirp router level reduces customer support overhead and false alarms. Simple ant like collaborative agents worked together to provide complex reasoning.

Collective Consensus

In one embodiment, Single chirps are less reliable than consensus from multiple sibling devices. Further, hypotheses are supported by corroborating evidence from independent observers e.g. the living room router information assisting in the conclusion that the fuse is blown. The combination, in a trusted network increases local inference capability.

There are multiple applications where intelligence/autonomy is needed closer to the end devices. Beyond the issues of the need to avoid "round-tripping" up to a root node and back, proactive response is engendered by providing local, application specific intelligence and decision making capabilities near the devices. Solving the "problems" at lower levels reduces what percolates to the top. Distributed collaboration methods are discussed in Ser. No. 13/571,294 et al.

Concurrent Conversations

If a chirp device needs a real time IP tunnel (e.g. remote software install) then nightlights provide DHCP based IP addresses with inherent conflict resolution for the bridging, FIG. 27-29. Further, chirp command channel and IP data channel may be separate, FIG. 7-8 but, through an interpreter layer in the mesh node, provide a human or IP packet based interface to the chirp device. Many Chirp to IP tunnels may be created with temporary DHCP address as the stub.

Chirps are being continuously broadcast, in one embodiment. The Network Management System and/or Diagnostics data is thus simulcast where machine participants such as Collaborative agents, may offer advice on scheduling etc. Thus chirp routers support their less advanced and less versatile chirp "country cousins." The relationship is symbiotic since disembodied intelligence of low cost chirp devices reduces the total cost of ownership of the entire community of devices, both chirp and IP based. Centralizing the intelligence at the routers is good, secure strategy for all.

FIG. 27, from Ser. No. 12/352,457, depicts a real time communications network with VOIP phones. In embodiments where routers are chirp aware the methods taught therein are applicable. Routers slots that are modular support chirp and IP protocol aware and support transceiver slots, FIG. 22. Hybrid routers may then, with appropriate interpreters provide cross communication between all types of devices in the network.

Night lights thus provide connectivity and interpretation layers (described as propagator and integrator layers in application Ser. No. 13/571,294). Further, chirp devices with store and forward capacity may act as relays for devices not directly reachable by routers (root nodes).

FIGS. 32-33 show a variant on FIG. 13. The devices are serving as repeaters and range extenders but use the same physical layer to service both uplink and downlink in the two-logical radio concept. Thus, in applying the two-logical radio concept, the routers listen and then repeat after a delay, like birds repeating each others songs. FIG. 32-33 thus serve as single radio repeaters in FIG. 14-15. Note that the Mesh Control Layer, FIG. 20, in active in all units shown in FIG. 32-33. Thus, Chirp aware devices serving as propagators/range extenders are also be mesh aware, in some embodiments.

FIG. 13 Label 030 depicts a two radio bridge, with one radio as an uplink and another as a single radio mesh AP, also referred to as single radio ad hoc mesh networking. Radio 040 routing is a graph, not a tree. Tree structures have no loops and complications of looping are thus eliminated. Recall that the routing table is O(n) in size. Routing updates are much faster, even with many nodes in the network. In contrast Radio 040 is a hub like structure which can involve looping. Routing table are O(n^2)—they grow exponentially. Updates are slower since graphs have loops and minimal spanning trees have to be recomputed periodically. Thus, this form of range extension is to be avoided in general. However, it is a viable and much used form of mesh networking.

FIG. 13 units 010, 020 provide bridging. If the two radios 030, 040 are also "chirp aware", then standard IP Wi-Fi radios may be used for both chirp and IP transport concurrently (e.g. chirps in the beacon or silent periods) or switch range extenders periodically, for both Chirp and IP devices. This is an example of dual mode operation: night light embodiment and device range extenders.

Thus existing products and devices, with chirp like transceivers, are capable of supporting multiple and dynamic levels of secure human-machine interaction and secure machine-machine interaction. High Security is inherent in this pollen based world. Further, through interpreters cards in the back slots of FIG. 22, terse machine-machine communication now more easily incorporate human-in-the-loop components, in a real time manner, if needed. The birdsong is now comprehensible.

Human interface is simpler with local in-circuit interpreters, close to devices and the context. System level diagnostics of large and often distributed control systems is challenging when parts of the system cannot be studied in isolation or when local events are not easily repeatable. Duplex communication and multi-lingual interactions make real time interpretation and analysis of machine chirps easier to follow. In embodiments of the system it is easier and faster to catch local "bugs" and "fix" them.

Software "Apps" also provide users with status reports on the health of their chirp devices on tablets or phone routers. These apps include collaboration agents such as "avoid" and "cluster" that collaboratively schedule repair visits, per methods are taught in 61/615,802, 61/555,400.

Multiple tunes thus support the varied and dynamic needs of multiple subscribers, without unduly burdening the network, since now only "rich" chirp exception and/or clones/relays are sent "up."

Tune capabilities span the gamut from simple relay propagation through real time interpretation all the way to completing transactions in a global supply chain scenario, in different embodiments of the system. Here devices self-order replacement parts or automatically upgrade automatically, because their human parents have opened an "account" for them. These devices are now capable of self-healing.

For example, a newly purchased chirp device is registered and software "apps" are downloaded to the owner's smart phone. The "apps" contain tunes for remote diagnostics, over the air firmware upgrades, et. al. These apps are authorized, by the user, to charge "ringtone" services to her phone service account or bank/credit card account, with usual overrides, counter signatures beyond a certain limit etc. Thus the human in the loop can step in and challenge a device replacement part request. For instance, She would rather use those funds to buy another type of device. Planned Obsolesces replacement patterns are thus supported. Notifications of death are also supported. Low cost products can chirp before they "die", reminding their owner to replace them, similar to smoke alarms chirping before their battery dies.

Devices chirp their state to nightlight "Mothers". Resident Tunes can serve as aggregation agents for Enterprise customer support and sales. When a product is purchased and registered, the chirp router may "open" a subscriber account for these chirp signatures based pollen. Thus, the enterprise has a secure IP based address through the router that patches through a chirp equivalent of a VOIP phone line for it. This simplifies remote diagnostics and repair. It also enables a centralized Enterprise Server to monitor devices and provide after sales services, thus enabling Womb to Tomb remote customer support. Intermittently connecting devices are serviced through community mail boxes at the "home" post office branch (e.g. home base router).

Womb to Tomb support may require communication over the IP bridge with varying degrees of urgency, based on the type of customer support purchased, in one embodiment. This is akin to QoS but is subscriber driven and both authorized and secure.

Multiple Levels of QoS are Supported.

Consider restaurant food delivery services as a metaphor. Their menu, like pollen, is freely broadcast over multiple subscribers "channels" e.g. Radio, TV, Web. Consumers visit (and "open accounts") at multiple restaurants on chirp signatures and their individual desires at this point in time. The pollen broadcast runs the gamut from lean and simple data (e.g. the temperature is "green") to rich and complex actionable knowledge (e.g. the cat is in the kitchen).

Some restaurants have their own delivery "buses" that they have leased or scheduled with the bus travel service provider (e.g. Chirp routers). The cost of the bus "ticket" is added to the cost of the meal delivery paid for by subscribers. Other restaurants may suggest the customer contact a trusted delivery service (e.g. Waiter-on-Wheels). They deliver the "package" per customer QoS, latency and proof of service requirements. For example, couriers assure timely delivery (e.g. Fresh-baked Pizza).

The nightlight embodiments, with chirp-to-IP and "app" based tunes support multiple QoS levels e.g. courier service, buses and bus convoys, shipping/freight containers. Recall nightlights provide disembodied intelligence for chirp devices and their IP counterparts. That intelligence includes collaborating with others to pack in as much into a container, whether the container is a special courier, bus or train/ship container. Ant-like Collaborative Scheduling agents, FIG. 26 using auctioning mechanisms, dynamically align pollen supply with subscriber demand.

Tunes, acting as advocates and agents for their owners, can also initiate a "call home" VOIP call between a "lost" or ailing device and its mother support center, through trusted router intermediaries. For example, the user may be directed to hold the smart phone close to a "lost" device. The tune then automatically calls an anonymous automated answering service. Ringtones are exchanged over an inexpensive audio transceiver on end devices. Other trusted friend tunes are part of the conference call. One is interpreting the conversation in English, using voice synthesis on the smart phone. If a decision point is reached requiring human interaction, the human is asked. Thus human in the loop and human override is optionally available through voice or touchpad etc.

Device pairing, managed by secure chirps, ensures that devices in transit cannot be tampered with. Thus, mobile chirp devices do not talk to strangers who don't sound like mother or mothers agents. Further, "lost" devices are recoverable as long they can recall their mothers chirp. Further, Publisher-subscriber relationships are multiple and varied. Chirp Devices may visit an "aunt", along the journey home and in response to her chirps, relay a message from Mother. Chirp based secure courier services are thus viable, a more modern, versatile and secure version of carrier pigeons.

Smart phone and other mobile computers thus serve dual roles as routers and couriers. They are servicing an extensible iterant chirp and IP device community network with chirp-to-IP bridging available for immediate, emergency use. And QoS is supported through IP tunneling and through trusted chirp to chirp couriers via chirp routers or other mobile chirp aware devices.

Device pairing renders stolen devices as unusable. Its chirps are not understood by unauthorized nightlight. Further, if mothers/aunts do not "tuck in" their charges at night, they may be programmed to "sleep". Nightlights may also report un-paired chirping devices to appropriate authorities.

The features stated above are embodied in the nightlight, see FIG. 22 and described in Ser. No. 13/571,294. Note however that while mobile generic purpose devices (Smart phones, tablets and laptops) can provide intermittent connectivity, static and purpose built night lights embodiments ensure "always on" connectivity for mission critical applications. Home security and surveillance is an example.

Summary

The resulting communication and collaboration ecosystem, involving both chirp and IP based extends Prior Art IP networking protocols to support "chirp" networking. Chirp packets are typically for M2M and are small, (lightweight), and subscriber oriented and inherently secure. Scalable methods to route this pollen efficiently in buses containers is revisited. Dynamic subscriber alignment is managed by routing decisions at "bus" stops, along routes marking current subscriber interests. Destinations, routes and bus frequencies are all subscriber driven. The distributed control system ensures that demand and supply are in dynamic alignment. Simple ant-like collaborative agents, sharing information, support complex reasoning and interpretation capabilities, reducing traffic "up" to unhandled exceptions. Rich chirps streams are supported, if needed, to further reduce "round tripping." The system is inherently secure because only trusted routers have both pieces needed to map publishers to subscribers. Publish-subscribe mechanisms is used because, like radio stations, they are inherently scalable. A scalable, secure, stable distributed control system emerges.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments of the foregoing description, but rather is indicated by the appended claims. All changes that come within the meaning and range of equivalents within the claims are intended to be considered as being embraced within the spirit and scope of the claims.

Core Concepts

What is the IoT? A networking challenge unprecedented in history; The birth of "small data" concepts; A machine-to-machine world which is terse.

Why Internet of Things thinking needs rethinking? Extends traditional network (human-oriented) to "things;" doesn't scale for lightweight, terse traffic; devices cost burdened by excessive overhead.

A fresh architectural start informed by nature: Natural systems such as pollen propagation and social insects; Minimal resources needed at the edges; Engineering for huge, transient, "lossy" world; Interfaces between "small data" IoT (M2M) and "big data" human interaction.

It's different out here—IoT vs. traditional Internet: The IoT is truly the frontier; Scale—it's huge. Dwarfs current man made networks; Machine-to-machine focus: terse, purposeful communications; Tiny data needs, not driven by send-response protocols; Lossy and intermittent is good enough. Traditional networking doesn't fit: Oriented toward large packets, high duty cycle, reliability; Too much overhead (data, power, computing, memory, security) Too much management/configuration/security risk; "Sender-oriented": not scalable like pollen: Communicates concepts and context for humans.

Describing a new architecture: Draw from nature—scale, autonomy, zones or neighborhoods of interest, simplicity of individual beings; Taking advantage of the characteristics of the frontier to minimize device and network overhead; "Receiver-oriented"—devices select interesting streams from a neighborhood, reject all else; Communicates only states, "gets" and "sets" for machines; Peer-to-peer is not equality—some devices need a lot of data, most devices need only a little.

Introduce components of IOT architecture: End devices; Propagator nodes; Integrator functions; Filter gateways. Introducing "the Chirp:" A relatively tiny, repetitive message; More like Get/Set than traditional IP packet—doesn't need size, services; Comparison to pollen and other signals from the natural world; Minimal structure: Name/"Arrow" of transmission/Payload/Simple checksum; Repetition and non-criticality of individual chirps—assumes lossy and intermittent connections at edge of network; Agile and Polite Chirp protocols.

Peer-to-peer, but not equal: End devices need only recognize data bound for them; End devices may send constantly; Not all devices send and receive; Networking intelligence resides in propagator nodes; Two kinds of network topology: transport and functional.

Transport network topology: Relatively little context; Propagator nodes build topology and routes from adjacencies; Broadcast pruning, directionality, redundancy, etc.; Transport is egalitarian (like wind-pollen). This must be true since the functional network topology is applied by Integrator functions.

Functional network topology: Publish/subscribe model; Defined by integrator functions building a zone of interest, zone of control, or neighborhood from many end device streams; May bear no resemblance to physical transport topology; In nature, plants select "own" pollen from hundreds of others.

Fundamental concept—the IoT is unreliable from the standpoint of a single chirp: Individual chirps uncritical (including timing); Not worth the cost of a protocol stack.

Over-provisioning by retransmitting is nearly free: Small chirps; Broadcasts (storms/pruning/bundling) handled by propagators; Filter gateways and integrator functions discard or ignore repeats; The typical device, not what you might think; Examples: moisture sensors, toaster, diesel generators, etc.; Lossy and intermittent connections are good enough; Autonomous—may operate without IoT connection for periods of time; Not generally an individual human interface; Smartphones et al, are traditional Internet, not IoT.

Run on chirps (Chirp Aware) or "Chirp Inside:" A relatively tiny message; More like Get/Set than traditional IP packet—states, not concepts; Each chirp is individually uncritical; Wide variety of wireless and wire-less: Infrared, Power line, et al; Power consumption may dictate intermittent connections.

Packaging and productization: OEM products and chips for sensors ("chirp on a chip"); The most basic "Green/Red" (OK/Alarm) functions could be built into power supplies, et al for simple integration via power line networking; Inexpensive, transient, disposable, and ad hoc end devices (motes, et al).

Connections without wires are not only via traditional wireless protocols: May include Infrared (as TV remote), visible light, sound, others; Data rates are low, so many alternatives may be more cost-effective.

Reaching end devices in an already-wireless world: Coexisting with WiFi by exploiting time/frequency domain differences; "Chording" from inputs in multiple frequency/spectrum/time domains.

New model for collisions: No need for CSMA/CD, simple back-off will suffice for wireless chirps; No detection or retransmission, most chirps are duplicates; Operating with more agile/polite dance partners.

Functional characteristics of Propagator nodes: Chirp interfaces (wireless, powerline, IR, etc.); Networking interfaces to adjacent Propagator nodes; Propagator-to-Propagator virtual trunking via traditional Internet and other networks (will require protocol stack); Gateways to traditional Internet and other networks; Protocol translation; Role in naming conventions.

Adjacency discovery, topology creation and maintenance: Routing tables and topology creation; Redundancy and failover; Creating and managing end device tables; Age-out and other maintenance functions.

Chirp broadcast pruning and consolidation: Introduction of challenges of broadcasts in a chirp-based world; Consolidation, pruning, forwarding; Managing broadcast "seasonality" and storms; Publish Subscribe is inherently scalable: Radio stations.

Forwarding to-and-from Integrator functions: Non-biased model (promiscuous propagation); Biased model (tuned for particular network); "Arrow" of transmission.

Characteristics of Integrator functions: Typically processor/memory intensive; Often connected to IoT by traditional network interface (Ethernet, IP, etc.); Internal gateway to de-trunk IoT streams from network interface; May be implemented on traditional processors.

Hub for IoT analysis and control: Chirps ("small data") streams combined into "big data" for analysis; Propagator node and end device configuration and "biasing;" Human interface and control point; Wide variety of alarms, reports, control tools; Collaborative scheduling tools; Likely programming intensive to tailor to individual applications, but open source tools possible (and needed) for basic functionality modules.

Zones of interest and "neighborhoods:" Defined by publish/subscribe model; May be extremely geographically diverse (or contained); Integrator functions may bias responsive; Propagator nodes to form zones of interest; Distributed Integrator functions: Placing integrator functions closer to end devices may reduce network traffic (example, video surveillance) Location in network must be balanced with need for broader overview.

Filter gateways: Optional additional appliance between IoT and Integrator function; Functionally a "two-armed" router filtering traffic to Integrator function; Discards non-relevant data to reduce I/O load on Integrator node; Possibly based on existing appliances and networking equipment (a la Barracuda Networks et al) Architectural opportunities and challenges; The siren song of Metcalfe's Law in the IoT; Machine-to-machine (M2M) freedom from Dunbar's Number; M2M terse, purposeful by definition; Publish/subscribe (IoT) versus point-to-point (traditional Internet).

Naming—completely different from traditional approaches: Must be primarily self-determined and organized if IoT is to scale; No protocol stack in the vast majority of IoT end devices, so no IPv6; Likely non-unique End Device names based on manufacturer, time of first use, power applied, etc., etc.; Additional location or other information may be applied/stripped by Propagator nodes.

Communications paradigm for a lossy and intermittent world: Structure of chirp (Name/Arrow/Payload/Checksum) described in detail; Over-provisioning through repetitive transmission: benefits and costs; Issues related to "not always on" realities; Power management.

Propagation: Topology building and maintenance; Topologies may be transient due to seasonality and Integrator functions "zones of interest" formation, tear-down; "Seasonality" of broadcasts; Broadcast "buses" on popular routes; "Cluster" and "avoid" concepts in route table development.

Gateways, tunneling, and protocol conversion: At Propagator node; Via Integrator function/Filter gateway.

Security in a publish/subscribe IoT environment: Lack of traditional protocol stack and minimum processing at end devices offers inherent security; Proprietary virtual IoT networks vs. open IoT; Examining security mechanisms at End Device, Propagator node and Integrator functions; Role of Filter gateway.

APPENDIX A

Distributed Adaptive Control Algorithm for Ad-Hoc Wireless Personal Area Networks Abstract Mesh networks have been around for years now, the Internet being an excellent example. Routers exchange information about each other and build up their routing tables, and use the entries in the routing table to make routing decisions. Although they work, these algorithms are sub-optimal at best and are more oriented towards wired or wire-like interfaces, which are exclusive "non-shared" communication mediums.

Wireless Personal Area Networks (WPANs) pose an entirely different set of challenges for AD-HOC networks because of the following reasons:

Shared non exclusive medium with finite communication channels

Dynamically changing environment

Shorter distances

Used by resource constrained low power devices

This appendix outlines the ACG approach to solving these sets of challenges, using a low footprint distributed adaptive control layer that is aware of the above set of problems.

Chapter 1: Technology Description

Conventional Routing Protocols

Distance-Vector Routing (DV)

Each node maintains a table of approximate distances of nodes. Nodes send the table out to nearest neighbors. The receiving nodes update their tables and recalculate routes using a shortest path algorithm. Thus routing decisions are made using sub-global approximations and are not optimal especially in a dynamically changing environment like WPANs.

Link State Routing (LS)

Each node maintains a view of the entire network and broadcasts the state of the link to its nearest neighbors. The receiving nodes update their tables and recalculate routes using a shortest path algorithm.

Pros
Widely used and commercialized
Well tested
Well documented
Cons
Well suited for static environments, not for dynamic environments
Infrastructure oriented (dedicated hosts are organized for routing)
Not suited for resource constrained, low power devices
Standard AD-HOC Routing Algorithms
The IETF Mobile Ad-Hoc Networking Standard (MANET) has proposed the following AD-HOC routing algorithms.
Destination Sequenced Distance Vector Routing (DSDV)
A version of DV adjusted for AD-HOC networks.
Power management is not considered
Does not have dynamic adaptive load balancing
Convergence times can be large
No support for QOS
No zonal/multi-channel support
AD-HOC On Demand Distance Vector Routing (AODV)
Reactive as opposed to pro-active
Uses L3, hence is shielded from the MAC and PHY layers
Supports only one route per destination
Does not have dynamic adaptive load balancing
Power management is not considered
Does not support unidirectional links
No support for QOS
No zonal/multi-channel support
Dynamic Source Routing (DS)
Reactive as opposed to pro-active. Routes are learnt on-demand and hence can slow down the performance
Does not have dynamic adaptive load balancing
Power management is not considered
Needs support from either the MAC layer or the network layer for including the route information
No support for QOS
No zonal/multi-channel support
Zone Routing Protocol (ZRP)
Divides the network into zones
Intra-zone routing is left to the implementer
Inter-zone routing uses a reactive as opposed to pro-active protocol
Does not have dynamic adaptive load balancing
Power management is not considered
No support for QOS
Algorithm Design Considerations
No Central Control
AD-HOC WPAN's typically work in environments where there cannot be any level of central intelligence as far as routing and parametric decisions are concerned. This requires the algorithm to be truly distributed and every device must be able to make decisions by itself.
Self-Configuring
AD-HOC WPAN's by definition need to be self-configuring without having the need for any network plan.

Self-Healing/Fault Tolerant
AD-HOC WPAN's need to be self-corrective and fault tolerant. Devices must be able to change their routing decisions in real-time as soon as a path gets clogged or closes down.
Dynamic Adaptive Load Balancing
The load on the network must be balanced fairly across all possible paths, and this decision must happen dynamically in an adaptive manner.
Pro-Active Routing
The routing decisions need to be made on a pro-active as opposed to an on-demand basis. This ensures that the task of routing does not interfere with the device's primary responsibility, which is to accomplish its own functionality.
Varied Bandwidth/QOS/Power Requirements
Devices have varied bandwidth requirements, some need isochronous performance (fixed latency), and some need bounded latency, and some might be power constrained and must use very low power for their transmissions.
Low Memory Footprint
The design of the algorithm must consider the fact that WPAN would typically consist of low footprint resource constrained devices.
Multi-Zone/Multi-Channel Support
The design of the algorithm must consider the support for routing between multiple Pico-cells or multiple network zones.
Network Layer Independent
The algorithm must not depend on the existence of a network layer protocol like IP. The algorithm must directly use the services provided by the MAC sub-layer.
Efficient Topology Lookup and Modification
Every device in an AD-HOC WPAN plays dual roles:
Accomplish its own functionality, which could involve sending packets either directly or via another device. (Primary Role)
Forward packets of other devices. (Secondary Role)
The design of the algorithm must consider the fact that, the primary role of every device on the network is to accomplish its own functionality, and routing of packets of other devices is secondary (unless the device is a special node that is just present for forwarding) and must not affect the performance of its primary role.
For the primary role, this means whenever the device has to send out its own data packet, to another device the routing decision must be very fast.
For the secondary role, this means whenever a device receives from another source destined to another device, it must be able to readily reference the routing decisions made by the source according to its Bandwidth/QOS/Power requirements.
When a device goes down, the topology and the routing decisions need to be modified in real-time so that network performance levels are maintained.
Chapter 2: Technology Implementation
The Algorithm uses control systems approach wherein every device sends out a broadcast heartbeat packet into the medium, at a specified frequency.
Header

```
+----+----+----+----+----+----+----+----+----+----+----+
|SQNR|    TOLL          |     HOP COST      | NC | LP |
+----+----+----+----+----+----+----+----+----+----+----+
  1            4                    4          1    1
```

Payload

```
+----+......+----+
| DEVICE ID |RSSI|
+----+......+----+
   SIZE      1
```

SQNR=1 BYTE SEQUENCE NUMBER (0-255)
TOLL=4 BYTE DEVICE TOLL COST
HOP COST=4 BYTE DEVICE HOP COST
NC=1 BYTE NEIGHBOUR COUNT (0-255)
LP=1 BYTE LOW POWER/HIGH THROUGHPUT FLAG
DEVICE ID=DEVICE IDENTIFICATION SEQUENCE (e.g. MAC ADDRESS) RSSI=1 BYTE RELATIVE SIGNAL STRENGTH INDEX
TOTAL SIZE OF HEARBEAT PACKET=HEADER SIZE+NC*PAYLOAD SIZE=11+NC*(ID SIZE+1)

Sequence Number

Sequence Number is a one-byte counter incremented upon the transmission of a heartbeat packet. This counter will wrap to 0 after it reaches a value of 255.

Whenever a device receives a heartbeat packet, it updates the sequence number for the source in its own tables. The device then retransmits the heartbeat packet so that other devices distant from the source can also receive it. If a device receives a heartbeat packet with a sequence number less than or equal to the noted sequence number for the source, the packet is discarded.

The sequence number is significant because of the shared nature of the wireless medium. Lets consider FIG. 34 and a scenario where node "2" has just come up.

When the node labeled "2" sends out its heartbeat with sequence number "1" node "1" and "3" will hear the packet and update the entry corresponding to node "2" with the value "1". Since both "1" and "3" have heard "2" for the first time, they both will retransmit the packet so that distant devices and new devices which have just come up can receive the heartbeat. Lets assume that node "1" relays the heartbeat first. Nodes "2" and "3" would hear the packet again. "2" would discard it because the original sender is itself, whereas "3" would discard it as its tables already indicate sequence number "1" for node "2".

Now "3" relays the packet and "4" receives it and updates its tables before retransmitting it. For a network with N nodes every heartbeat packet is transmitted N times for the first time.

Thus the sequence number helps prevent broadcast flooding for heartbeat packets. This mechanism is only used for the first heartbeat packet. For broadcast/multicast data packets and subsequent heartbeat packets, an optimized technique is used which is discussed below. See FIG. 35.

When the node "2" sends out the heartbeat packet with sequence number "2", both 1 and 3 hear the heartbeat and update the table entries corresponding to node "2". Both "1" and "3" would then refer to the Single Source Shortest Path (SSSP) tree corresponding to node "2" as shown by the solid blue lines in FIG. 35. According to the tree "1" does not have any "child" and hence will not forward the packet further.

"3" on the other hand has "4" as its child and hence will forward the packet to "4".

Hence subsequent heartbeat packets are sent M<=N times, where M is the number of levels in the SSSP tree for the source node, and N is the number of devices on the network. If in the mean time another node comes up and hears the heartbeat for the first time, it will retransmit the packet, but the sequence number will help other nodes discard the packet.

Multi-zone/Multi-channel support is explained later in the document for the purposes of brevity.

Device Toll Cost (DTC)

The Device Toll Cost is the value charged by the device for forwarding a packet to one of its neighbors. This value is used in determining the optimal routes. This value helps in the dynamic adaptive load balancing of the network.

Device Hop Cost (DHC)

The Device Hop Cost is the expense incurred every time a packet needs to be sent via another device. This value helps in the determining QOS requirements of the node.

Low Power/High Throughput Flag (LP)

This flag is set to "1" for devices that use a routing table optimized for low power consumption/high throughput.

Algorithm Data-Structures

Network Representation

The algorithm uses a Directed Weighted Graph (DWG) for representing the networks, which may have unidirectional links and Un-Directed Weighted Graph (UWG) for networks having bidirectional links only. The devices on the network form the set of vertices for the graph. Based on the information in the heartbeat packet, edges are added to the graph with an initial weight that is inversely proportional to the RSSI.

Graph Representation

Traditionally graphs have been represented using either adjacency matrices or adjacency lists.

Adjacency matrices offer fast O(1) edge lookup and modification, but tend to be wasteful if the number of edges in the graph is a lot less than N2, where N is the number of devices. The maximum number of edges is nP2 for a DWG and nC2 for a UWG. Practically the number of edges Ne in a WPAN would be much lesser than nP2 and hence much lesser than N2 number of edges, for N>=2, nC2<nP2, Ne<nC2<N2.

Adjacency lists on the other hand save memory, but offer O(M) worst-case edge lookup and modification, where M is the number of edges on the list, and hence tend to affect the overall routing performance.

The algorithm uses a specialized representation of a graph that offers acceptable performance and has lower runtime memory requirements.

A graph object in the algorithm has the following attributes:

A vertex hash table for fast vertex lookup and modification
An edge hash table for fast edge lookup and modification
A vertex list for vertex enumeration
An edge list for edge enumeration A vertex object exists in both the graph's vertex hash table and on the graph's vertex list. A vertex object also includes an edge list for all incident edges. In addition, a vertex object also has 2 spare link pointers through which it can exist in 2 more lists.

An edge object on the other hand exists not only on both the graph's edge hash table and the graph's edge list, but also exists on the following:

If un-directed, on the edge lists of both the vertices it is incident upon
If directed, on the edge list of the source vertex.

In addition an edge object also has 2 spare link pointers through which it can exist in 2 more lists. The 2 spare link pointers on the vertex and edge objects are helpful for algorithms that operate on graphs for sorting purposes. These algorithms can sort vertices/edges in any manner they deem without having to allocate/free additional memory.

Graph algorithms can also save custom data pointers within the vertex and edge objects, see FIG. 36.

This specialized data structure helps answer the following questions regarding the graph very quickly.

Is Vertex 'X' on the graph?
Is there an edge between Vertex 'X' and Vertex 'Y'? If yes what is the initial edge cost?
What are the edges incident upon Vertex 'Z'?
Enumeration of all the edges on the graph
Enumeration of all the vertices on the graph The edge and vertex lookup times are dependant on the bucket size of the hash tables used. The value of the bucket size can be changed as required.

Algorithm Operation

Direct Heartbeat Reception

Upon receipt of a direct heartbeat (from a source we can directly hear), the algorithm takes the following steps:

1. Lookup vertex for the source. If the vertex is not present, create a new vertex for the source and initialize its corresponding custom vertex data.
2. Lookup edge between the source and us. If an edge is not present, create a new edge between the source and us and initialize its corresponding custom edge data.
3. If the sequence number of the heartbeat is less than or equal to the sequence number noted in the custom vertex data, discard the packet. End.
4. Update the RSSI information and the last known good time in the custom edge data.
5. Update the sequence number, toll cost, hop cost, and low power flag in the custom vertex data.
6. If the source was heard for the first time (an edge was just created), then forward the packet by re-transmitting it, and go to step 8.
7. Lookup our position on the source's SSSP tree. If we have nodes below us on the tree forward the packet by re-transmitting it.
8. For every payload entry
    a. Lookup vertex and create it of not present.
    b. Lookup an edge between the source and the vertex, and create it if not present.
    c. Update the RSSI information and the last known good time in the custom edge data.

In-Direct Heartbeat Reception

Upon receipt of an in-direct heartbeat (from a source we cannot directly hear), the algorithm takes the following steps:

1. Lookup vertex for immediate transmitter. If the vertex is not present, create a new vertex for the immediate transmitter and initialize its corresponding custom vertex data.
2. Lookup edge between the immediate transmitter and us. If the edge is not present, create a new edge and initialize its corresponding custom edge data.
3. Lookup vertex for the source. If the vertex is not present, create a new vertex for the source and initialize its corresponding custom vertex data.
4. If the sequence number of the heartbeat is less than or equal to the sequence number entered in the source vertex's custom vertex data, discard the packet. End.
5. Update the RSSI information and the last known good time in the custom edge data, for the immediate sender.
6. Update the sequence number, toll cost, hop cost, and low power flag in the custom vertex data for the source.
7. If the source was heard for the first time (an edge was just created), then forward the packet by re-transmitting it, and go to step 9.
8. Lookup our position on the source's SSSP tree. If we have nodes below us on the tree forward the packet by re-transmitting it.
9. For every payload entry
    a. Lookup vertex and create it of not present.
    b. Lookup an edge between the source and the vertex, and create it if not present.
    c. Update the RSSI information and the last known good time in the custom edge data.

Heartbeat Transmission

Before transmitting the heartbeat packet, the algorithm takes the following steps:

1. Check the last known good timestamp for every edge, and delete edges whose last known good times are greater than K*U, where K>=2 is a chosen constant, and U is the heartbeat update interval chosen for the network.
2. Calculate our own Redundancy Index RI for health indication purposes. This is done as follows:
    a. Initialize Good Nodes Count GNC to 0
    b. For every vertex we can reach, using an edge incident upon us, mark the edge as closed, and try to reach the vertex using any other path. If the vertex can be reached, increment GNC.
    c. Good Nodes Ratio GNR=(GNC/TOTAL_INCIDENT_EDGES)
    d. Incidence Ratio IR=TOTAL_INCIDENT_EDGES/(TOTAL_VERTEX_COUNT−1)
    e. RI=(GNR*0.6+IR*0.4)*100
3. For every vertex compute the SSSP tree for this vertex, using the SSSP algorithm described below.
4. Add every edge incident upon us to the heartbeat packet and send out the heartbeat packet, with our DTC, DHC and sequence numbers.
5. Increment sequence number.

Single Source Shortest Path (SSSP) algorithm

The SSSP algorithm used here is a modified version of Dijkstra's SSSP algorithm. The original Dijkstra SSSP algorithm uses pre-computed edge costs, where as in this modified algorithm instead of using the edge costs, we compute the Destination Vertex Cost DVC from the RSSI information, dynamically as we proceed in the algorithm.

The modified algorithm makes use of the spare links provided by the vertex and edge objects.

1. Initialize the Vertex Cost VC to, and the Vertex Edge VE to NULL for all vertices, other than the source. For the source vertex, set VC to 0 and VE to NULL.
2. We use the two spare links provided in the vertex object, to form a doubly linked list of vertices, without having to allocate or free any additional memory. Set the source vertex as the head of this doubly linked list, set the Hop Count HC for the source vertex to be 0.
3. For every vertex in the doubly linked list
    a. We use the two spare links provided in the edge object, to form a doubly linked list of edges, without having to allocate or free any additional memory. For every edge incident on the vertex, compute the Final Edge Cost FEC using the equation given below.

$$FEC=(100-RSSI)+HC*DHC+TC$$

$$TC=0 \text{ if } HC=0, DTC \text{ if } HC<>0$$

Use insertion sort to insert the edge onto the doubly linked list sorted in ascending order of FEC. We call the vertex in context the Control Vertex, and the edge destination the Destination Vertex.

b. For every edge on the doubly linked list
i. Compute DVC using the equation given below.
For Low Power Consumption:
DVC=MAX (VC of Control Vertex, FEC)
Otherwise:
DVC=VC of Control Vertex+FEC
ii. If VC for Destination Vertex=then, set VC for Destination Vertex to DVC, VE for Destination Vertex to the current edge, HC for Destination Vertex to HC of Control Vertex+1. Go to Step iv.
iii. If VC for Destination Vertex>DVC then, set VC for Destination Vertex to DVC, VE for Destination Vertex to current edge, HC for Destination Vertex to HC of Control Vertex+1. Remove Destination Vertex from doubly linked list.
iv. Use insertion sort, to insert Destination Vertex into doubly linked list.
4. Create a new graph object for the SSSP tree.
5. Add every vertex in the original graph, to the SSSP tree and every vertex's VE to the SSSP tree.

Chapter 3: Technology Evaluation

No Central Control

The implementation of the algorithm makes it clear that it is truly distributed without the need for any central control. The implementer has to choose appropriate values for K and U depending on the physical characteristics of the network.

Self-Configuring

Any device can join the network instantly. Devices already present on the network can discover the new device after the heartbeat packet transmitted by it is propagated through the network. The device itself can report its health using the value of RI. This information can help the user choose an appropriate location for the device.

Self-Healing/Fault Tolerant

The heartbeat packets sent by the devices, make sure that the system can recover from route and device failures.

Dynamic Adaptive Load Balancing

The devices can adaptively increase or decrease the value of their DTC, so as to trigger changes in the SSSP trees of other devices. E.g. when a device detects that a lot of devices are using it for forwarding packets, it could adaptively increase its DTC so that the traffic then flows through other devices on the network. Similarly when the device detects that the traffic load through it has decreased, it could adaptively decrease its DTC.

Pro-Active Routing

The computation of the SSSP tree by every vertex, for every vertex makes the algorithm very pro-active. This means route planning times are minimized at the time of packet sending and forwarding.

Varied Bandwidth/QOS/Power Requirements

The DHC value of a device changes the way in which its SSSP tree is computed. Low latency driven devices can set DHC to a high value to make sure their SSSP trees are computed with minimum number of hops. Low Power Flag chooses edges so as to minimize the transmit power for the devices.

Low Memory Footprint

The specialized data structures used by the algorithm provided acceptable performance and use reasonably low memory. For a network with very large number of devices e.g. 10,000, the network could be divided into multiple zones, so as to provide acceptable performance using low memory. Multi-Zoning is explained in the next section.

Multi-Zone/Multi-Channel Support

A WPAN can be divided into 2 or more Pico-nets using different RF channels, so as to minimize the interference between them. Two attractive approaches are explained below.

Common Device Approach—Depicted in FIG. 37.

FIG. 37 shows two Pico-nets comprising of nodes (1, 2, 3, 4) and (5, 6, 7, 8) respectively. Both Pico-nets are operating on different RF channels so as to not interfere with each other. Node 9 is a node having two interfaces, one listening to the RF channel for the first Pico-net and the other listening to the RF channel for the second Pico-net. Hence Node 9 is designated as the Common Device. When Node 9 is turned off both Pico-nets can only operate independently—see FIG. 38. When Node 9 is turned on both Pico-nets can now not only work independently, but can also use Node 9 to route information between the Pico-nets. Node 9 ensures that the heartbeat packets generated in both Pico-nets are forwarded to the other Pico-net. Thus devices of both Pico-nets view the network as one combined Pico-net.

Common Router Approach—See FIG. 39.

FIG. 39 shows two Pico-nets comprising of Nodes (1, 2, 3, 4) and (5, 6, 7, 8) respectively. Here the Nodes 4 and 5 have been designated as Common Routers. Separate RF channels are used for the Intra Pico-net and Inter Pico-net communications. When the Common Routers are turned off, both Pico-nets can only work independently.

When the Common Routers are turned on, the FIGS. 40 and 41 below show the Intra Pico-net SSSP trees of both Pico-nets respectively, FIG. 42 shows the entire topology.

The heartbeat packets transmitted by the Common Routers are different for Inter Pico-net and Intra Pico-net communication. For Intra Pico-net communications, the Common Routers include only the Pico-net members they hear in their heartbeat packets. Hence for the first Pico-net, the Intra Pico-net heartbeat sent out by 4 would include entries for Nodes 1, 2 and 3. Even though Node 4 can also hear Node 5, the Intra Pico-net will not have an entry for Node 5.

The Inter Pico-net heartbeat transmitted by Node 4 will include entries for Nodes 1, 2, 3 and 5. Hence only the Common Routers will need to know about the entire topology, whereas individual devices will only need to know the topology of their Pico-net.

Whenever a device needs to send a packet to a device that is outside its Pico-net, the packet is sent to the Common Router for that Pico-net.

Network Layer Independent

Clearly the algorithm described does not depend on any Network Layer protocol like IP. This algorithm is also independent of the MAC sub-layer although its use is intended to be at the MAC sub-layer.

Efficient Topology Lookup and Modification

The specialized graph data structures used by the algorithm are designed for efficient topology lookup, offering acceptable performance over a reasonably large number of nodes.

The invention claimed is:

1. A tree-shaped mesh network comprising:
   a mesh of wireless nodes forming a tree shaped network with one root node having a connection to an external network; chirp clients; and wireless network clients;
   wherein chirp clients comprise low cost chirp devices wherein said low cost chirp devices transmit short duration messages wherein transmission of said short duration messages are scheduled at random intervals;
   wherein at least one wireless node of the mesh of wireless nodes is a designated chirp-aware node and said chirp-aware node further comprises a bridge between the short duration messages and IP based devices wherein said bridge includes a wireless receiver to receive the short duration messages and is connected to said external network;

wherein all remaining wireless nodes of the mesh of wireless nodes disregard the short duration messages as random and transient noise by adaptively filtering out the short duration messages using Automatic Gain Control, Error correction or noise cancellation, wherein the short duration messages are sufficiently short in duration so that said adaptive filtering by said all remaining wireless nodes disregards the short duration messages as random and transient noise;

wherein each wireless node further comprises two logical radios and a service radio wherein each wireless node uplink and downlink operates on distinct non-conflicting frequencies; and wherein said wireless network clients communicate with said wireless nodes using said service radios.

2. The tree-shaped mesh network of claim 1 wherein the designated chirp-aware node is at an edge of the tree-shaped mesh network and wherein said chirp-aware node containerizes the short duration messages into containerized packets.

3. The tree-shaped mesh network of claim 2 wherein the designated chirp-aware node assigns a target to the containerized packets.

* * * * *